US009616530B2

(12) United States Patent
Kondou et al.

(10) Patent No.: US 9,616,530 B2
(45) Date of Patent: Apr. 11, 2017

(54) HEAT EXCHANGER TUBE INSERTING APPARATUS

(71) Applicant: DAIKIN INDUSTRIES, LTD., Osaka-shi, Osaka (JP)

(72) Inventors: Takuya Kondou, Sakai (JP); Kimitoshi Satou, Sakai (JP); Tomonari Sera, Sakai (JP); Takayuki Takahashi, Sakai (JP); Yoshikazu Tanaka, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 14/764,938

(22) PCT Filed: Jan. 29, 2014

(86) PCT No.: PCT/JP2014/000465
§ 371 (c)(1),
(2) Date: Jul. 30, 2015

(87) PCT Pub. No.: WO2014/119303
PCT Pub. Date: Aug. 7, 2014

(65) Prior Publication Data
US 2015/0367461 A1    Dec. 24, 2015

(30) Foreign Application Priority Data

Jan. 31, 2013  (JP) ................................ 2013-017752

(51) Int. Cl.
*B23P 15/26* (2006.01)
*B23P 19/12* (2006.01)
(Continued)

(52) U.S. Cl.
CPC ............ *B23P 15/26* (2013.01); *B21D 53/085* (2013.01); *B23P 19/024* (2013.01); *B23P 19/12* (2013.01);
(Continued)

(58) Field of Classification Search
CPC .......... Y10T 29/53117; Y10T 29/4935; Y10T 29/4938; Y10T 29/53113; Y10T 29/49838;
(Continued)

(56) References Cited

U.S. PATENT DOCUMENTS 4,104,790 A * 8/1978 Hindrichs ............. B23P 19/022
29/282
4,392,524 A * 7/1983 Bauch ..................... F28G 15/02
165/76
(Continued)

FOREIGN PATENT DOCUMENTS

JP    59-125229 A    7/1984
JP    60-136832 U    9/1985
(Continued)

OTHER PUBLICATIONS

Human Translation of JPS60136832U, generated Mar. 2016, translated by Phoenix Translations.*
(Continued)

*Primary Examiner* — Christopher Besler
*Assistant Examiner* — Matthew P Travers
(74) *Attorney, Agent, or Firm* — Global IP Counselors, LLP

(57) ABSTRACT

A heat exchanger tube inserting apparatus includes a roller conveyor section and a pushing section. The roller conveyor section includes a roller that advances the heat exchanger tube to thereby insert the heat exchanger tube into the insertion holes of the fins and to a first position by rotation of the roller. The pushing section pushes the heat exchanger tube, which has been moved to the first position by the roller conveyor section, to a second position located further inside than the first position.

22 Claims, 25 Drawing Sheets

(51) Int. Cl.
- *B21D 53/08* (2006.01)
- *B23P 19/02* (2006.01)
- *F28D 1/04* (2006.01)
- *F28D 1/047* (2006.01)
- *F28F 1/32* (2006.01)

(52) U.S. Cl.
CPC ......... *F28D 1/0417* (2013.01); *F28D 1/0475* (2013.01); *F28F 1/32* (2013.01); *F28F 2275/10* (2013.01); *Y10T 29/4938* (2015.01); *Y10T 29/53113* (2015.01)

(58) Field of Classification Search
CPC ......... Y10T 29/49895; Y10T 29/49902; Y10T 29/53696; Y10T 29/53978; B23P 11/00; B23P 15/26; B23P 19/022; B23P 19/024; B23P 19/12; F28F 2275/10; B21D 39/06; B21D 53/02; B21D 53/06; B21D 53/08; B21D 53/085

See application file for complete search history.

(56) References Cited

U.S. PATENT DOCUMENTS 4,547,963 A * 10/1985 Ohmstede ............ B23P 19/022
29/726
2002/0104215 A1* 8/2002 Tokunaga ............... B23P 15/26
29/890.038

FOREIGN PATENT DOCUMENTS

| JP | 61-216824 A | 9/1986 |
| JP | 9-108760 A | 4/1997 |

OTHER PUBLICATIONS

Translation of JPH0647138, generated Mar. 8, 2016.*
International Search Report of corresponding PCT Application No. PCT/JP2014/000465 dated Apr. 28, 2014.
International Preliminary Report of corresponding PCT Application No. PCT/JP2014/000465 dated Aug. 4, 2015.

* cited by examiner

FIG.30

HEAT EXCHANGER TUBE INSERTING APPARATUS

CROSS-REFERENCE TO RELATED APPLICATIONS

This U.S. National stage application claims priority under 35 U.S.C. §119(a) to Japanese Patent Application No. 2013-017752, filed in Japan on Jan. 31, 2013, the entire contents of which are hereby incorporated herein by reference.

TECHNICAL FIELD

The present invention relates to a heat exchanger tube inserting apparatus for inserting a heat exchanger tube for a heat exchanger into a fin.

BACKGROUND ART

Conventionally, a heat exchanger tube inserting apparatus is used for inserting, in a process of manufacturing a heat exchanger, a heat exchanger tube successively into insertion holes formed in each of a number of fins which have laminated so that the heat exchanger tube passes through the number of fins. For example, a heat exchanger tube inserting apparatus disclosed in Japanese Unexamined Patent Publication No. HEI 9-108760 includes guide rods respectively supporting a pair of leading ends of a U-shaped heat exchanger tube, and a heat exchanger tube inserting means for inserting the heat exchanger tube into insertion holes of a fin by pushing the curved portion of the U-shaped heat exchanger tube.

Each of the guide rods has a streamlined head at its leading end and is long enough to be inserted into insertion holes of each fin so as to pass through the number of fins. The streamlined heads located at the respective leading ends of the guide rods support the pair of leading ends of a heat exchanger tube while respectively being inserted in the opening formed at each of the pair of leading ends of the heat exchanger tube. Further, the guide rods can move through insertion holes of fins. This allows the guide rods to guide a heat exchanger tube to inner insertion holes while supporting the heat exchanger tube in insertion holes of the number of fins.

The heat exchanger tube inserting means is disposed at a position opposite to the guide rods in a direction of lamination of the number of fins. The heat exchanger tube inserting means can insert a U-shaped heat exchanger tube successively into insertion holes formed in each of the number of fins by pushing the curved portion of the heat exchanger tube toward the guide rods.

In such apparatus, the guide rods are inserted into insertion holes of the number of fins, in advance. Subsequently, the pair of leading ends of a heat exchanger tube is supported on the streamlined heads located at the respective leading ends of the guide rods. In this state, the curved portion of the heat exchanger tube is pushed by the heat exchanger tube inserting means from the side opposite to the guide rods, whereby the heat exchanger tube is inserted into the insertion holes of each of the fins. At this time, the guide rods are retreated at the same speed as an advancing speed of the heat exchanger tube, thereby allowing the heat exchanger tube to be inserted into the insertion holes of each of the number of fins while being supported by the guide rods.

However, in the above-described heat exchanger tube inserting apparatus, the guide rods and the heat exchanger tube inserting means which are long are disposed respectively on the opposite sides of the assembly of the number of fins in the direction of lamination. This results in an overall large size of the apparatus. Specifically, the guide rods need to be long enough to pass through the number of fins. Further, the heat exchanger tube inserting means needs to be long (have a stroke length) enough to push a heat exchanger tube from the beginning to the end in the insertion process of the heat exchanger tube. Therefore, the total length of the heat exchanger tube inserting apparatus needs to include not only the thickness of lamination of the number of fins, but also the full length of a heat exchanger tube at each of both sides of the assembly of fins in the direction of lamination. This results in a large size of the heat exchanger tube inserting apparatus. Therefore, it is difficult to make the apparatus smaller.

Furthermore, in the above-described heat exchanger tube inserting apparatus, the length of the guide rods and the stroke length of the heat exchanger tube inserting means limit the length of a heat exchanger tube that can be inserted. Therefore, there is a problem that the apparatus is not applicable to heat exchanger tubes having different lengths. In particular, there is a problem that the apparatus cannot insert an extremely long heat exchanger tube having a length exceeding the sum of the length of the guide rods and the stroke length of the heat exchanger tube inserting means.

SUMMARY

The present invention has been made in view of the above-mentioned problems and has an object of providing a heat exchanger tube inserting apparatus which is small in size and applicable to heat exchanger tubes having different lengths.

A heat exchanger tube inserting apparatus according to the present invention is a heat exchanger tube inserting apparatus for inserting, in a process of assembling a heat exchanger including a number of fins and heat exchanger tubes passing through the number of fins, a heat exchanger tube into insertion holes formed in the fins comprising: a roller conveyor section including a roller for advancing the heat exchanger tube to thereby insert the heat exchanger tube into the insertion holes of the fins and to a first position by rotation of the roller; and a pushing section for pushing the heat exchanger tube which has been moved to the first position by the roller conveyor section to a second position located further inside than the first position.

BRIEF DESCRIPTION OF DRAWINGS

FIG. 30 is a side view showing a state in which the guide section and the roller conveyance section shown in FIG. 24 support a hairpin tube being in a horizontal state.

DESCRIPTION OF EMBODIMENTS

In the following, a heat exchanger tube inserting apparatus according to an embodiment of the present invention will be further described in detail with reference to the accompanying drawings.

First Embodiment

Figure 1:
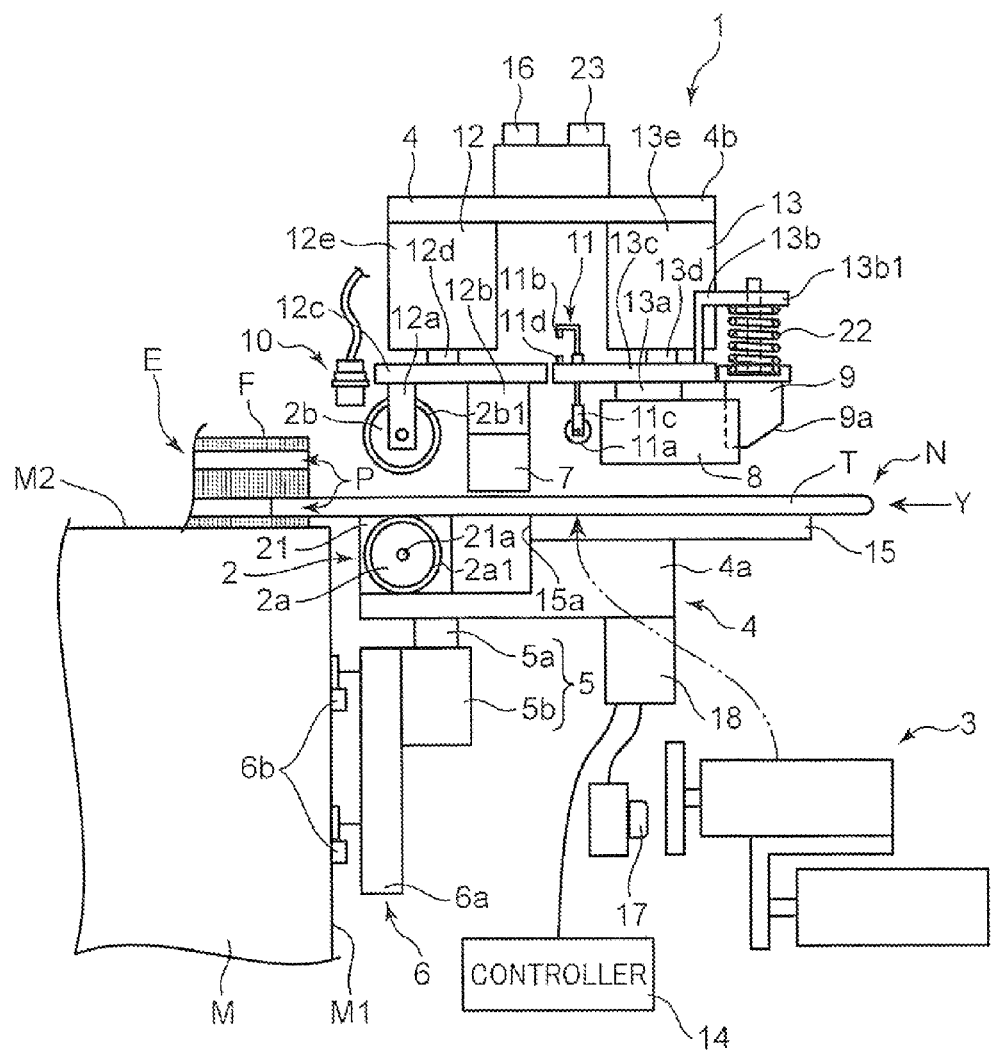
FIG. 1 is a side view of a heat exchanger tube inserting apparatus according to a first embodiment of the present invention.
Figure 2:
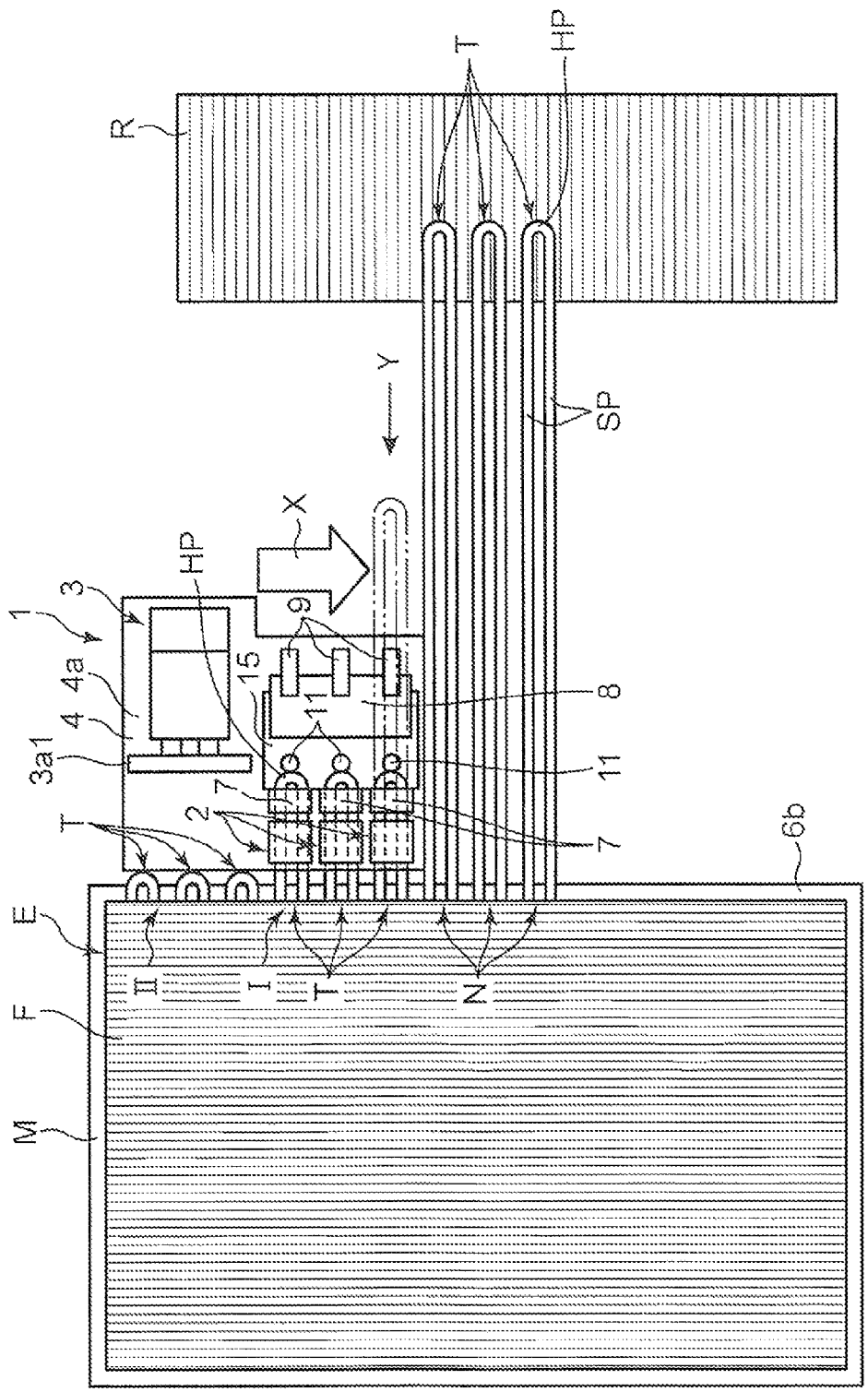
FIG. 2 is a plan view of the heat exchanger tube inserting apparatus shown in FIG. 1.

A heat exchanger tube inserting apparatus 1 according to a first embodiment inserts, in a process of assembling a heat exchanger E shown in FIGS. 1 and 2, i.e. a heat exchanger E including a number of fins F and hairpin tubes T passing through the number of fins F as heat exchanger tubes, hairpin tubes T into insertion holes P formed in each fin F. Here, the hairpin tube T refers to a pipe including a pair of straight tube portions SP extending in parallel to each other and a hairpin portion HP connecting respective one ends of the pair of straight tube portions, as shown in FIG. 2.

The heat exchanger tube inserting apparatus 1 shown in FIGS. 1 to 5 includes roller conveyor sections 2 which each insert a hairpin tube T into insertion holes P of each of fins F and to a predetermined first position I (see FIGS. 18 and 19), and a pushing cylinder 3 which inserts the hairpin tubes T which has been pushed to the predetermined first position I by the roller conveyor sections 2 further to a predetermined second position II (see FIG. 20) located further inside than the first position I. Here, the predetermined first position refers to a position of a hairpin tube T at which a rear end of the hairpin portion HP of the hairpin tube T is away from the fins F by a predetermined distance. The first position is determined based on a location of driving rollers 2a and driven rollers 2b described later.

Specifically, the heat exchanger tube inserting apparatus 1 includes the roller conveyor sections 2, the pushing cylinder 3, a main body frame 4 supporting the roller conveyor sections 2 and the pushing cylinder 3, a first vertical mover 5 for moving the entirety of the main body frame 4 vertically, and a horizontal mover 6 for moving the main body frame 4 and the first vertical mover 5 horizontally.

Further, the heat exchanger tube inserting apparatus 1 includes first guide members 7 and a second guide member 8 for guiding hairpin tubes T, entanglement eliminators 9 for eliminating entanglement of a hairpin tube T, rotation detecting sensors 10, a hairpin tube detecting sensor 11, second vertical movers 12 for moving the driven rollers 2b and the first guide members 7 vertically, a third vertical mover 13 for moving the second guide member 8 vertically, a terminal (relay box 18), a support board 15, a hand switch 16, and a foot switch 17, these components being also supported on the main body frame 4. Further, the heat exchanger tube inserting apparatus 1 includes a controller 14 such as a control panel, independently of the main body frame 4. The controller 14 controls each driving component of the heat exchanger tube inserting apparatus 1, i.e. driving of each of a motor 21 for driving the driving rollers 2a, the pushing cylinder 3, the first to third vertical movers 5, 12, and 13 and the horizontal mover 6, via the terminal box 18.

Further, as shown in FIG. 2, there is disposed a receiving table R for allowing the hairpin portions HP of hairpin tubes T to be placed thereon, at the upstream side of the heat exchanger tube inserting apparatus 1 in a conveyance direction Y of hairpin tubes T. A top portion of the receiving table is corrugated to have grooves and protrusions extending in parallel to one another in the conveyance direction Y. The hairpin portion HP of a hairpin tube T is placed on the receiving table R, whereby the hairpin tube T can be disposed to extend in the conveyance direction Y.

Further, there is disposed a working stand M for allowing an assembly of the number of fins F to be placed thereon, at the downstream side of the heat exchanger tube inserting apparatus 1 in the conveyance direction Y of hairpin tubes T. The number of fins are placed on the working stand M, in which state the heat exchanger tube inserting apparatus 1 inserts hairpin tubes T into fins.

The main body frame 4 includes a lower mounting board 4a, an upper mounting board 4b disposed above the lower mounting board 4a, and a connecting portion 4c (see FIGS. 4 and 5) connecting the lower mounting board 4a and the upper mounting board 4b.

The first vertical mover 5 includes a rod 5a extending vertically, and a cylinder 5b for driving the rod 5a to move vertically, as shown in FIG. 1. A top end of the rod 5a is connected to a bottom surface of the lower mounting board 4a. The first vertical mover 5 can vertically move the main body frame 4 and the above-mentioned structural elements supported thereon (such as the roller conveyor sections 2 and the pushing cylinder 3), by the vertical movement of the rod 5a driven by the cylinder 5b. This makes it possible, in the case of assembling the heat exchanger E including tiers each having a row of hairpin tubes T, to vertically move the main body frame 4 by the first vertical mover 5 to thereby adjust its vertical position to correspond to each of the tiers. This makes it possible to insert hairpin tubes T at each of the tiers.

Figure 3:
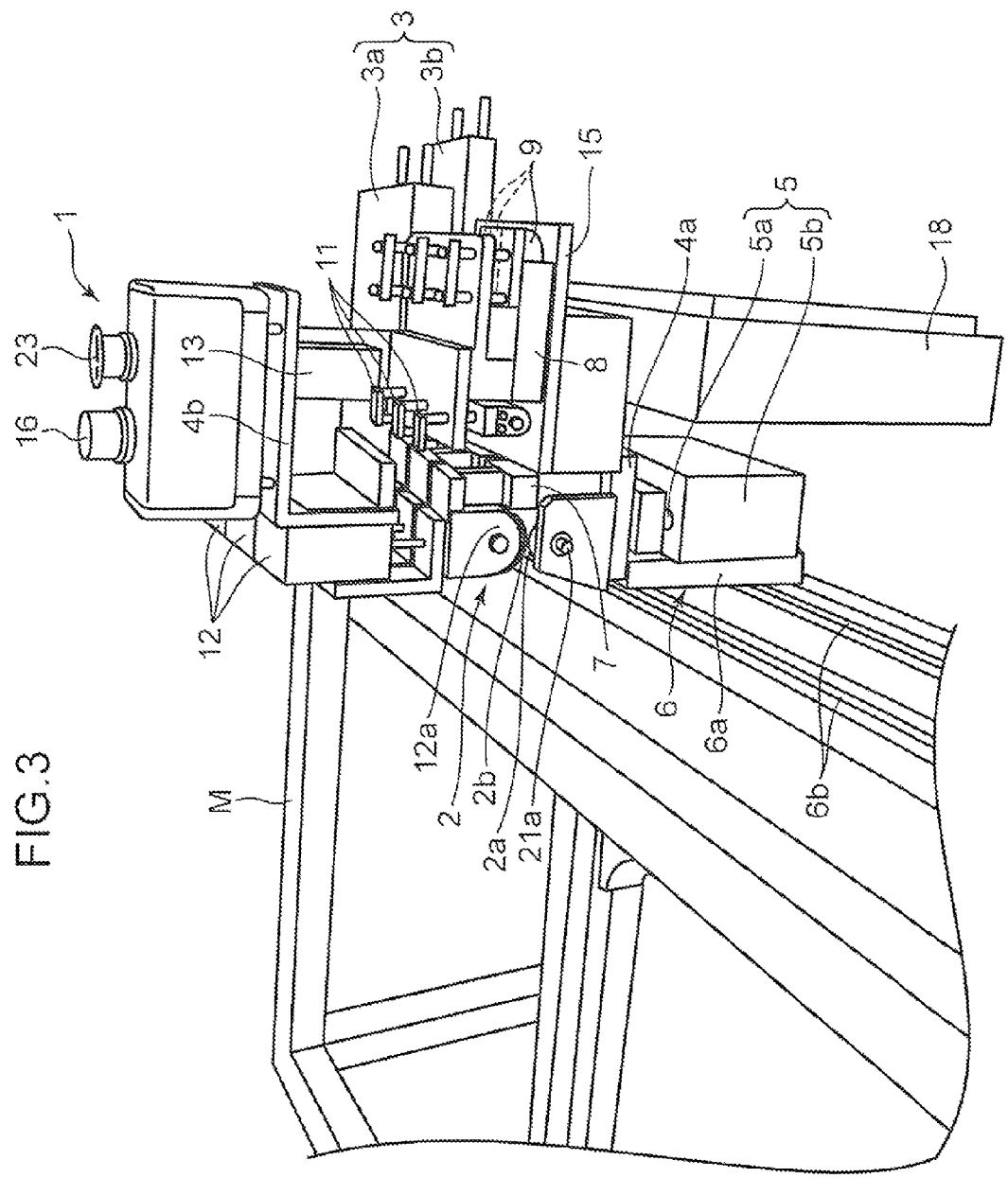
FIG. 3 is a perspective view of the heat exchanger tube inserting apparatus shown in FIG. 1 as seen from left and above obliquely.

The horizontal mover 6 includes a main body portion 6a and rails 6b, as shown in FIGS. 1 to 3. The rails 6b are two rails disposed on a perpendicular surface M1 of the working stand M and extending in parallel with a top surface M2 of the working stand M, the rails being vertically spaced from each other. The main body portion 6a moves horizontally along the rails 6b and includes, for example, a roller which comes into contact with the rails 6b and a motor for driving the roller. The main body portion 6a is connected with the cylinder 5b of the first vertical mover 5. The horizontal mover 6 can move the main body frame 4 and the first vertical mover 5 horizontally in the direction of X shown in FIG. 2 (in a direction extending in parallel to the fins F) by the movement of the main body portion 6a along the rails 6b.

The plurality of (in the first embodiment, three) roller conveyor sections 2 are disposed in parallel to one another in the conveyance direction Y of hairpin tubes T in order to convey a plurality of (in the first embodiment, three) hairpin tubes T simultaneously in the conveyance direction Y with the hairpin tubes T being disposed in parallel to one another, as shown in FIGS. 1 to 5.

Each of the roller conveyor sections 2 includes a pair of rollers oppositely disposed across a hairpin tube T, specifically, a driving roller 2a and a driven roller 2b disposed above the driving roller 2a.

Figure 4:
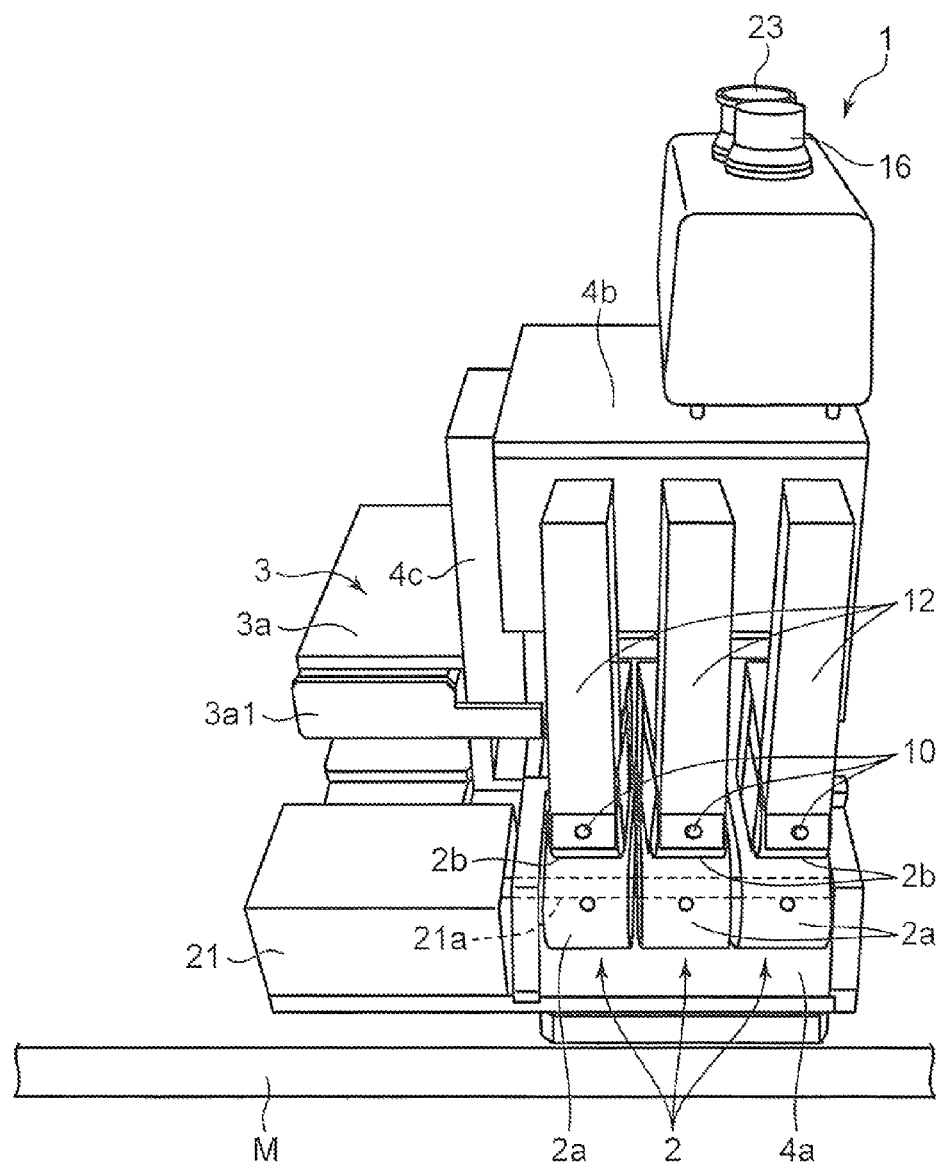
FIG. 4 is a view of the heat exchanger tube inserting apparatus shown in FIG. 1 as seen from the downstream side of roller conveyor sections.

The driving roller 2a advances a hairpin tube T. The driving rollers 2a are driven by the common motor 21 as shown in FIG. 4. The driving rollers 2a are coaxially secured to a rotary shaft 21a of the motor 21. The motor 21 is mounted to the lower mounting board 4a of the main body frame 4.

The driven roller 2b comes into contact with a hairpin tube T to rotate with the advancing movement of the hairpin tube T. The driven rollers 2b are respectively disposed above the driving rollers 2a. Each of the driven rollers 2b is rotatably supported by a support portion 12a of the second vertical mover 12.

The driving roller 2a of each of the roller conveyor sections 2 is driven for rotation by the motor 21 while vertically sandwiching a hairpin tube T with the corresponding driven roller 2b. Thereby, roller the conveyor section 2 makes it possible to simultaneously insert a plurality of hairpin tubes T into insertion holes P of each of fins F and to the predetermined first position I.

The driving roller 2a and the driven roller 2b have respective contact portions 2a1 and 2b1 (see FIG. 1) that make contact with a hairpin tube T, the contact portion including a flat part on a circumferential portion thereof. The contact portions 2a1 and 2b1 are made of an elastic material (for example, a rubber such as urethane rubber or a resin) elastically deformable to allow a hairpin tube T to sink therein by a small amount of depression (for example, about 0.5 to 1 mm) when the respective flat parts come into contact with the hairpin tube T to thereby make surface contact with the hairpin tube T.

Because the driving roller 2a and the driven roller 2b have the respective flat contact portions 2a1 and 2b1 as described, they can convey a hairpin tube T while making contact with the hairpin tube T according to the size (specifically, the tube diameter) of the hairpin tube T. Consequently, it is possible to advance hairpin tubes of various tube diameters. Furthermore, it is possible to advance a hairpin tube T having a form different from the form of a cylinder.

The pushing cylinder 3 is mounted to the lower mounting board 4a of the main body frame 4 and at a side of the roller conveyor sections 2 (specifically, at the upstream side of the roller conveyor sections 2 in the horizontal movement direction X of the main body frame 4 by the horizontal mover 6), as shown in FIG. 2. The roller conveyor sections 2 and the pushing cylinder 3 are disposed side by side. This allows simultaneous performance of the operation of moving hairpin tubes T to the first position I by the roller conveyor sections 2 and the operation of pushing hairpin tubes T located at the first position I to the second position II by the pushing cylinder 3, which results in excellent working efficiency.

Figure 6:
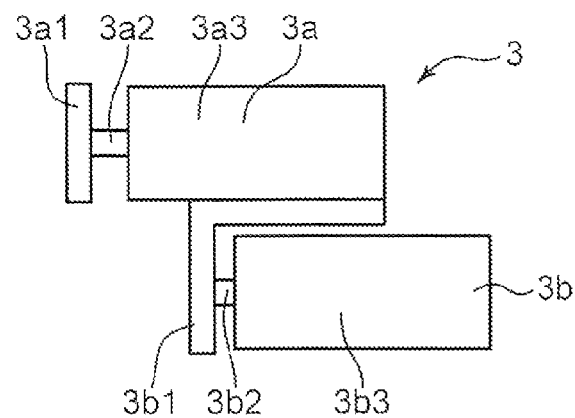
FIG. 6 is a side view of a pushing cylinder shown in FIG. 1.
Figure 7:
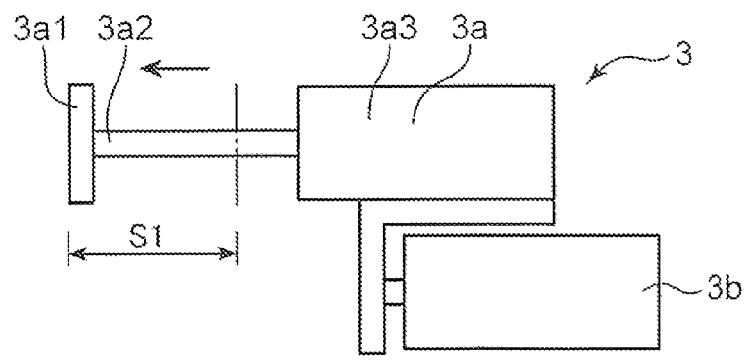
FIG. 7 is a diagram illustrating an operation of a first pushing portion shown in FIG. 6.
Figure 8:
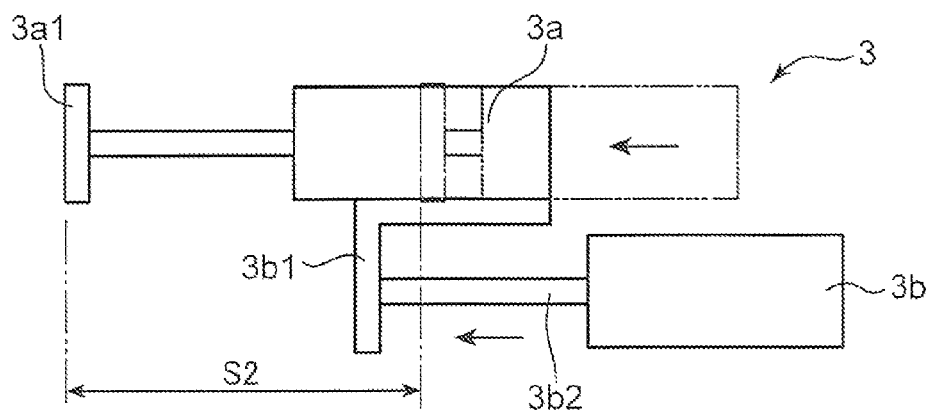
FIG. 8 is a diagram illustrating a simultaneous operation of the first pushing portion and a second pushing portion shown in FIG. 6.

The pushing cylinder 3 includes two pushing portions vertically aligned as shown in FIGS. 6 to 8, specifically, a first pushing portion 3a and a second pushing portion 3b for inserting hairpin tubes T into insertion holes P of each of fins F (see FIG. 1). The pushing cylinder 3 is within the concept of a pushing section of the present invention.

The first pushing portion 3a includes a pushing plate 3a1, a rod 3a2 having a leading end secured to the pushing plate 3a1, and a cylinder 3a3 for driving the rod 3a2 horizontally in opposite directions. The pushing plate 3a1 receives a driving force of the cylinder 3a3 via the rod 3a2 to thereby push hairpin tubes T into insertion holes P of each of fins F by a predetermined first pushing amount while coming into contact with the respective hairpin portions HP (see FIG. 2) of the hairpin tubes T. Specifically, as the first pushing amount, a stroke length S1 (see FIG. 7) over which the pushing plate 3a1 can be moved by the cylinder 3a3 of the first pushing portion 3a is set at, for example, about 150 mm.

The pushing plate 3a1 has a width sufficient to simultaneously push a plurality of (in the first embodiment, three) hairpin tubes T as shown in FIG. 2.

The second pushing portion 3b moves the cylinder 3a3 of the first pushing portion 3a in the direction toward fins F to thereby push hairpin tubes T which has been pushed by the first pushing portion by a predetermined second pushing amount. Similarly to the first pushing portion 3a, the second pushing portion 3b includes a bracket 3b1, a rod 3b2 having a leading end secured to the bracket 3b1, and a cylinder 3b3 for driving the rod 3bs horizontally in opposite directions. The cylinder 3a3 of the first pushing portion 3a is secured to the bracket 3b1. The bracket 3b1 receives a driving force of the cylinder 3b3 via the rod 3b2 to thereby allow the cylinder 3a3 of the first pushing portion 3a secured to the bracket 3b1 to move over a predetermined stroke length (for example, about 90 mm). Therefore, as the second pushing amount, a stroke length S2 (see FIG. 8) over which the pushing plate 3a1 can be moved by simultaneous operation of the first pushing portion 3a and the second pushing portion 3b is set to be longer than the stroke length S1 over which the pushing plate 3a1 is moved only by the first pushing portion 3a. For example, the stroke length S2 is set at about 240 mm.

Figure 9:
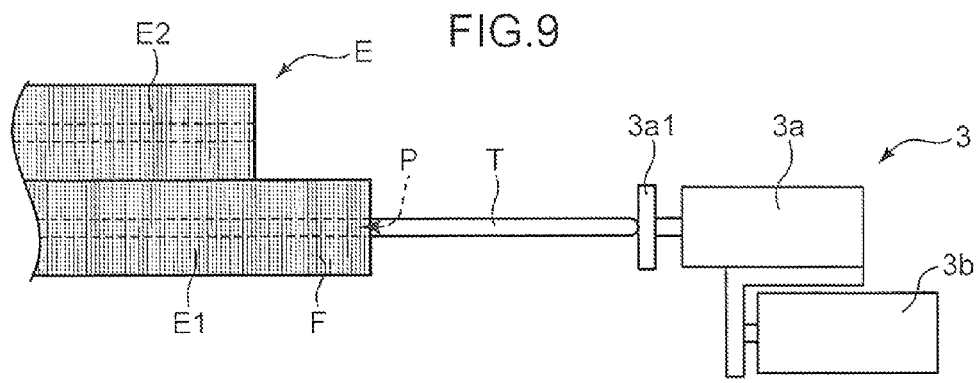
FIG. 9 is a diagram illustrating a state in which the pushing cylinder shown in FIG. 6 is about to push a hairpin tube T into a first tier of a heat exchanger in a process of assembling the heat exchanger including a plurality of tiers each having a row of hairpin tubes.
Figure 10:
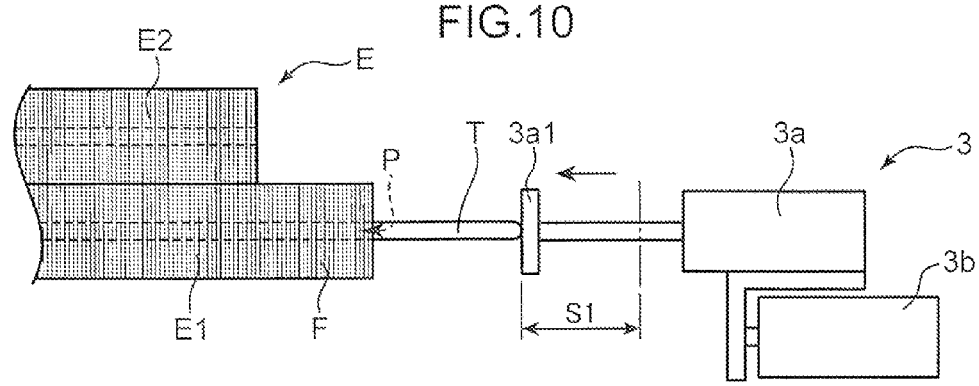
FIG. 10 is a diagram illustrating an operation of pushing a hairpin tube into the first tier of the heat exchanger shown in FIG. 9.
Figure 11:
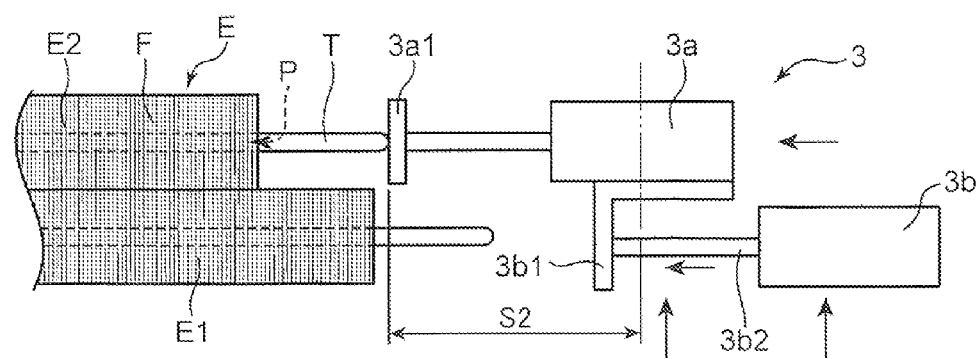
FIG. 11 is a diagram illustrating an operation of pushing a hairpin tube into a second tier of the heat exchanger shown in FIG. 9.

In this manner, the pushing cylinder 3 is allowed to differentiate the stroke of the pushing plate 3a1 between the case of operating only the first pushing portion 3a and the case of operating the first pushing portion 3a and the second pushing portion 3b simultaneously. Therefore, in the assembling of the heat exchanger E including the two or more tiers each having a row of hairpin tubes T as shown in FIGS. 9 to 11, it is possible, even in the case where hairpin tubes T have different effective lengths from one tier to another, to push hairpin tubes T according to the effective length of the hairpin tubes T at each tier. Specifically, in the case of inserting hairpin tubes T into fins F constituting a first tier E1 of the heat exchanger E, it is possible to operate only the first pushing portion 3a of the pushing cylinder 3 to move the pushing plate 3a1 by the first pushing amount, i.e. over the stroke length S1, to thereby insert the hairpin tubes T into the fins F by the pushing plate 3a1. Further, in the case of inserting hairpin tubes T into fins F constituting a second tier E2 of the heat exchanger E, it is possible to raise the pushing cylinder 3 by the first vertical mover 5 for vertically moving the entirety of the main body frame 4, and then operate both of the first pushing portion 3a and the second pushing portion 3b of the pushing cylinder 3 to move the pushing plate 3a1 by the second pushing amount, i.e. over the stroke length S2 longer than the first stroke length S1, to thereby insert the hairpin tubes T into the fins F by the pushing plate 3a also at the second tier E2 of the heat exchanger E.

The first guide members 7 are respectively disposed upstream of the plurality of driven rollers 2b in the conveyance direction Y of hairpin tubes T, as shown in FIGS. 1 to 3 and FIG. 12. Each of the first guide members 7 is supported by a guide support portion 12b (see FIG. 1) of the second vertical mover 12 from above. The first guide member 7 positions a hairpin tube T with respect to the driving roller 2a and the driven roller 2b.

Figure 12:
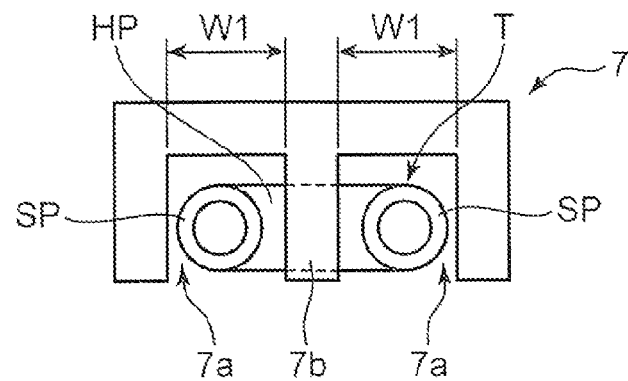
FIG. 12 is a view of a first guide member shown in FIG. 1 as seen from the downstream side thereof in a hairpin tube conveyance direction.

The first guide member 7 includes two grooves 7a opening at a lower end thereof as shown in FIG. 12. Each of the grooves 7a extends in the conveyance direction Y of hairpin tubes T. A rib 7b lies between the two grooves 7a to divide one groove from the other. In other words, the first guide member 7 has an E-shaped cross section. A width W of each of the grooves 7a is set to be equal to or slightly greater than an outer diameter of each of the two straight tube portions SP. This makes it possible to reliably guide a hairpin tube T into a space between the driving roller 2a and the driven roller 2b.

Further, when hairpin tubes T are advanced to the first position I (see FIGS. 2 and 18) by the roller conveyor sections 2, the hairpin portions HP stop in front of the first guide members 7, and thereafter the first guide members 7 and the driven rollers 2b are raised by the vertical mover 12. Therefore, the ribs 7b and the hairpin portions HP do not make contact with each other.

The first guide members 7 are made of a hard resin having a smooth surface, such as MC nylon.

A hairpin tube T is positioned horizontally by the first guide member 7 immediately in front of the driving roller 2a and the driven roller 2b. Therefore, the hairpin tube T can be reliably guided into the gap between the driving roller 2a and the driven roller 2b without buckling between the first guide member 7 and the second guide member 8.

The support board 15 allows hairpin tubes T to be placed thereon. The support board 15 is disposed upstream of the driving rollers 2a in the conveyance direction Y of hairpin tubes T as shown in FIG. 1. The support board 15 is secured to the lower mounting board 4a of the main body frame 4. In the first embodiment, a downstream end 15a (see FIG. 1) of the support board 15 is located upstream of the first guide members 7. However, the downstream end 15a may be located downstream of the first guide members 7.

The second guide member 8 positions respective hairpin tubes T with respect to the first guide members 7 as shown in FIGS. 1 to 3, 13, and 14A and 14B. The second guide member 8 is disposed upstream of the first guide members 7 in the conveyance direction of hairpin tubes T. Further, the second guide member 8 is disposed above the support board 15 where hairpin tubes T are placed so as to be opposite to the support board 15. The second guide member 8 is hanged by a guide support portion 13a (see FIG. 1) of the third vertical mover 13.

Figure 13:
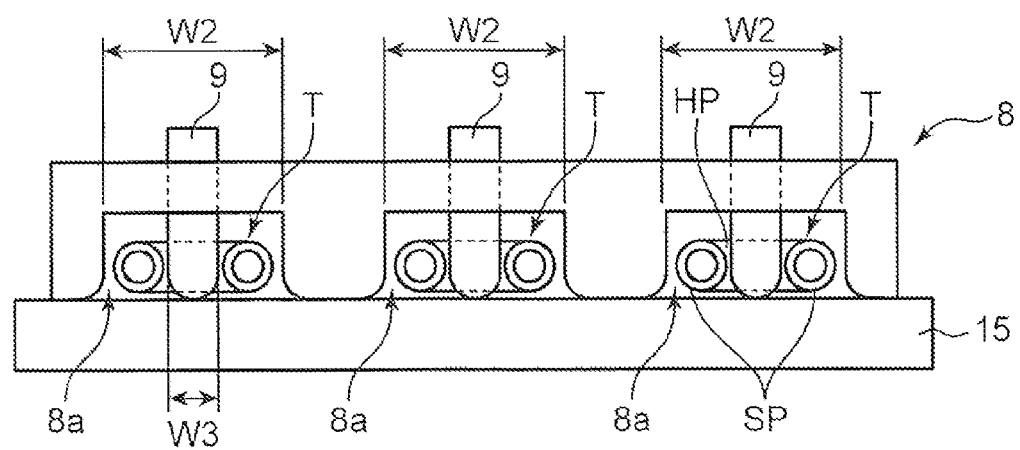
FIG. 13 is a view of a second guide member and entanglement eliminators as seen from the downstream side thereof in the hairpin tube conveyance direction shown in FIG. 1.

The second guide member 8 is generally in the form of a flat plate, and includes three grooves 8a opening at a lower end thereof. A width W2 of each of the grooves 8a is set to be equal to or slightly greater than an outer width of the hairpin tube T (i.e. the distance between respective outer surfaces of the two straight tube portions SP). This allows hairpin tubes T to be easily guided to the first guide members 7. A bottom edge of the groove 8a is curved as shown in FIG. 13. This allows hairpin tubes T placed on the support board 15 to be easily inserted into the grooves 8a when the guide member 8 is lowered.

Figure 14A:
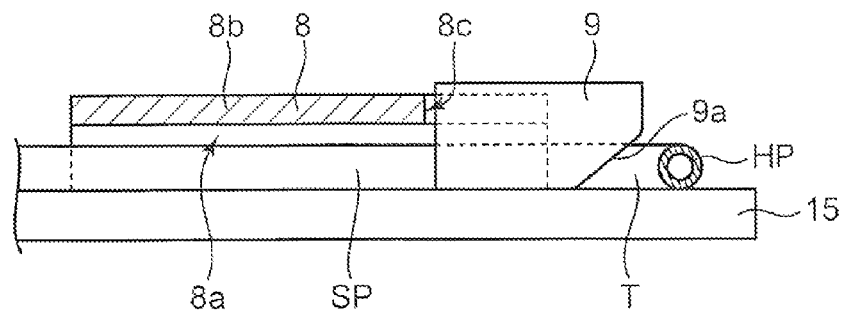
FIGS. 14A and 14B are diagrams showing a disposition of the second guide member and the entanglement eliminators shown in FIG. 3, FIG. 14A being a vertical sectional side view of the second guide member and a hairpin tube shown in FIG. 3 illustrating the disposition of the second guide member and the entanglement eliminators, and FIG. 14B being an enlarged plan view of the entanglement eliminators and the vicinity thereof shown in FIG. 3 illustrating the disposition of the second guide member and the entanglement eliminators.
Figure 14B:
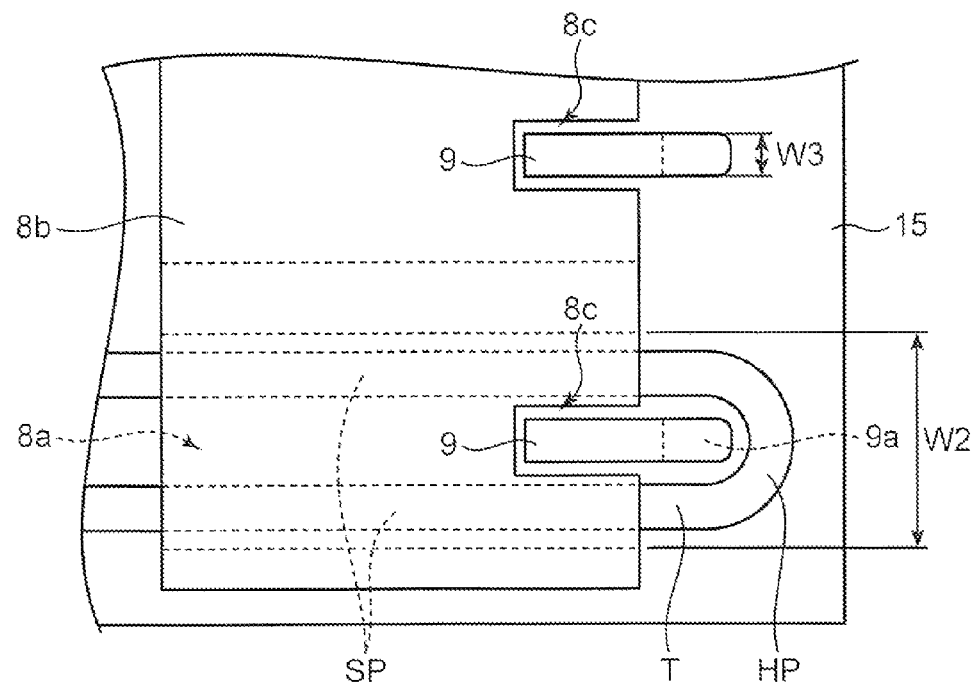

Further, recesses 8c are formed by cutting out a top plate portion 8b of the second guide member 8 in upstream portions of the second guide member 8 respectively corresponding to the grooves 8a, as shown in FIGS. 14A and 14B. A part of each of the entanglement eliminators 9 is inserted in a corresponding one of the recesses 8c.

The second guide member 8 is an integrally molded article, and has a structure capable of simultaneously positioning a plurality of hairpin tubes T. The second guide member 8 is, similarly to the guide members 7, made of a hard resin having a smooth surface, such as MC nylon. The integral formation of the second guide member 8 results in the need for only one third vertical mover 13 for vertically moving the second guide member 8. This allows a simple configuration of the heat exchanger tube inserting apparatus.

The entanglement eliminators 9 are disposed upstream of the driving rollers 2a and the driven rollers 2b in the conveyance direction Y of hairpin tubes T, as shown in FIGS. 1 to 3, 13 and 14A and 14B. Specifically, the entanglement eliminators 9 are respectively partially inserted into the recesses 8c formed in the upstream portions of the second guide member 8 that correspond to the grooves 8a. The entanglement eliminators 9 protrude upstream beyond the second guide member 8.

The entanglement eliminator 9 is configured to eliminate entanglement between the straight tube portions SP of a hairpin tube T to be guided by the driving roller 2a and the driven roller 2b. Specifically, the entanglement eliminator is in the form of a plate. The entanglement eliminator 9 is inserted in the recess 8c of the second guide member 8 vertically movably in a standing state. A width W3 of the entanglement eliminator 9 is set to be equal to or slightly smaller than an inner width of the hairpin tube T (i.e. the distance between respective inner surfaces of the two straight tube portions SP). This allows the entanglement eliminator 9 to move relative to and between the two straight tube portions SP as a hairpin tube T moves in the conveyance direction Y, to thereby correct the two straight tube portions SP so as to extend in the conveyance direction Y. In this manner, entanglement between the straight tube portions SP can be eliminated.

Further, in the first embodiment, the entanglement eliminators 9 protrude upstream beyond the second guide member 8. Therefore, it is possible to eliminate entanglement between the two straight tube portions SP of a hairpin tube T at the upstream side of the second guide member 8, i.e. before the hairpin tube T reaches the second guide member 8.

Further, the entanglement eliminator 9 includes an oblique portion 9a sloping in a direction away from a movement region of hairpin tubes T as proceeding upstream in the conveyance direction Y of hairpin tubes T. The angle of the oblique portion 9a is set at an angle allowing the hairpin portion HP of a hairpin tube T, when it moves to the oblique portion 9a, to come into contact with and slide along a surface of the oblique portion 9a, as shown in FIG. 14A. The entanglement eliminator 9 is inserted in the recess 8c of the second guide member 8 vertically movably. This allows the entanglement eliminator 9 to recede from the hairpin portion HP when the hairpin portion HP comes into contact with the oblique portion 9a.

The oblique portion 9a has a curved edge. Therefore, the hairpin portion HP is less likely to be interrupted by the edge of the oblique portion 9a.

Further, the entanglement eliminators 9 are supported by an entanglement eliminator support portion 13b of the third vertical mover 13 from above, as shown in FIG. 1. Further, the entanglement eliminator 9 is pushed downward by a spring 22 inserted between the entanglement eliminator 9 and a top plate 13b1 of the entanglement eliminator support portion 13b, and is vertically movable.

Figure 5:
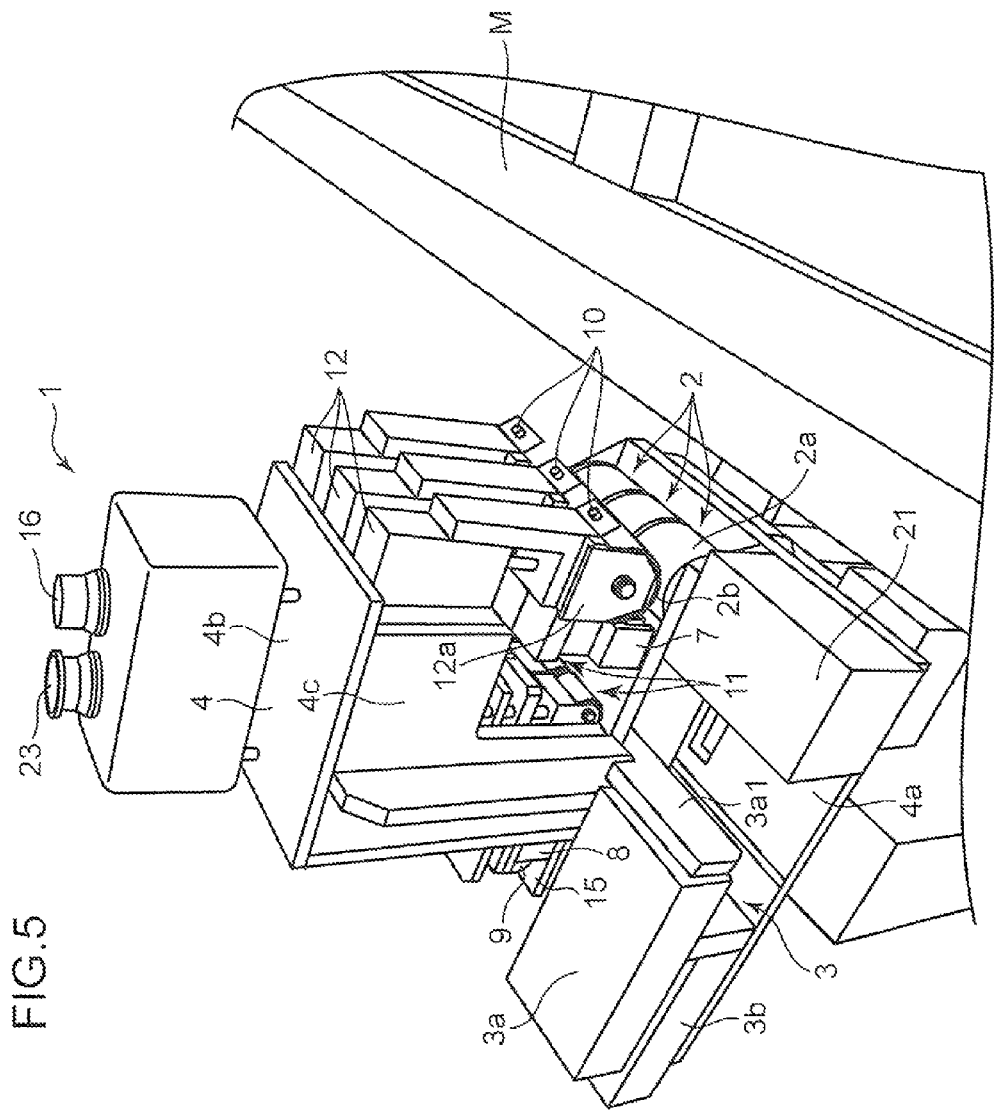
FIG. 5 is a perspective view of the heat exchanger tube inserting apparatus shown in FIG. 1 as seen from right and above obliquely.

The rotation detection sensors 10 respectively detect rotation of the driven rollers 2b. The rotation detection sensors 10 are respectively provided for each driven roller 2b of the roller conveyor section 2, as shown in FIGS. 4 and 5. Each of the rotation detection sensors 10 is attached to a movable plate 12c (see FIG. 1) of the second vertical mover 12 via a bracket or the like.

The rotation detection sensors 10 may be of any type as long as they can detect rotation of the driven rollers 2b. For example, a proximity sensor may be used as the rotation detection sensor 10. In that case, a detection object made of a metal such as iron is embedded in a circumferential portion of the driven roller 2b to be detected by the proximity sensor. This allows the detection object to be detected by the proximity sensor each time it passes in front of the proximity sensor in rotation of the driven roller 2b. Therefore, it is possible for the proximity sensor to detect the rotation of the driven roller 2b.

In the case where the rotation detection sensor 10 detects that the corresponding driven roller 2b is not rotating, the controller 14 controls the motor 21 to stop driving of the driving roller 2a in order to stop conveyance of a hairpin tube T by the roller conveyor section 2. In other words, the driven roller 2b is not rotating when no hairpin tube T is being advanced. Therefore, when the driven roller 2b is detected as not rotating, the conveying operation of a hairpin tube T by the roller conveyor section 2 is stopped. At the same time, the controller 14 controls the relevant second vertical mover 12 so as to recede the driven roller 2b upward, and further controls the horizontal mover 6 so as to move the main body frame 4 in the direction opposite to the horizontal movement direction X in order to return the main body frame 4 to a position prior to the insertion operation.

Figure 16:
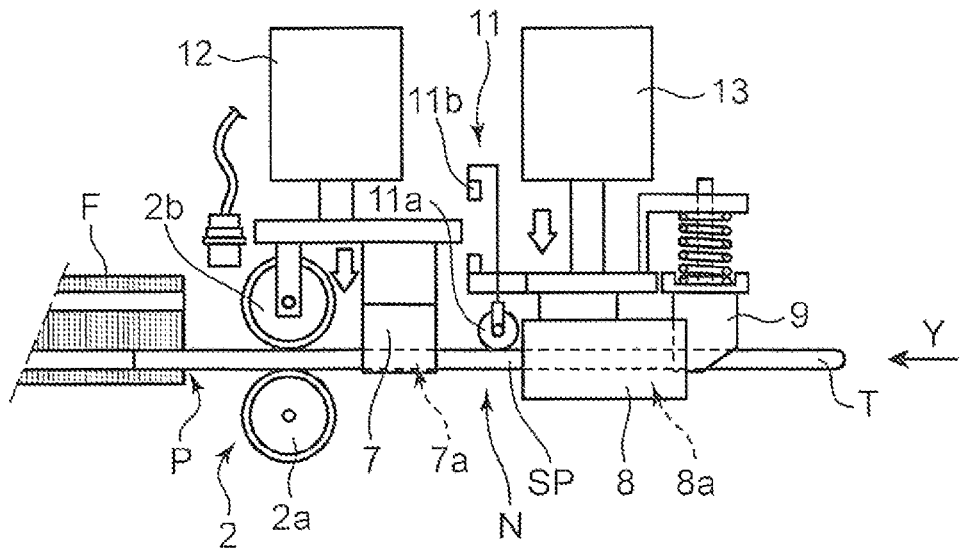
FIG. 16 is a diagram showing a state in which the roller conveyor section is about to move a hairpin tube set at an initial position, in a heat exchanger tube inserting method using the heat exchanger tube inserting apparatus shown in FIG. 1.

The hairpin tube detection sensors 11 are respectively disposed upstream of the plurality of first guide members 7 in the conveyance direction Y of hairpin tubes T, as shown in FIGS. 1 to 3. Each of the hairpin tube detection sensors 11 detects whether a hairpin tube T is at a position between a predetermined initial position N and a position immediately before the first position I. The predetermined initial position N in the first embodiment refers to, for example, a position of a hairpin tube T at which the hairpin tube T is inserted in insertion holes P of a front fin F (on the upstream side in the conveyance direction Y) of the number of fins, as shown in FIG. 16. The initial position N may be a position at which a hairpin tube T is inserted into insertion holes P of a small number of front fins of the number of fins F and can be maintained in that state.

The hairpin tube detection sensor 11 specifically includes a contact roller 11a and a proximity sensor 11b as shown in FIG. 1. The contact roller 11a is rotatably supported on a bracket 11c. Further, the hairpin tube detection sensor 11 is supported vertically movably with respect to a movable plate 13c of the third vertical mover 13 via the bracket 11c. The proximity sensor 11b is disposed at a leading end of the bracket 11c. A detection object 11d to be detected by the proximity sensor 11b is disposed on the movable plate 13c. The proximity sensor 11b and the detection object 11d may be inversely disposed.

Figure 18:
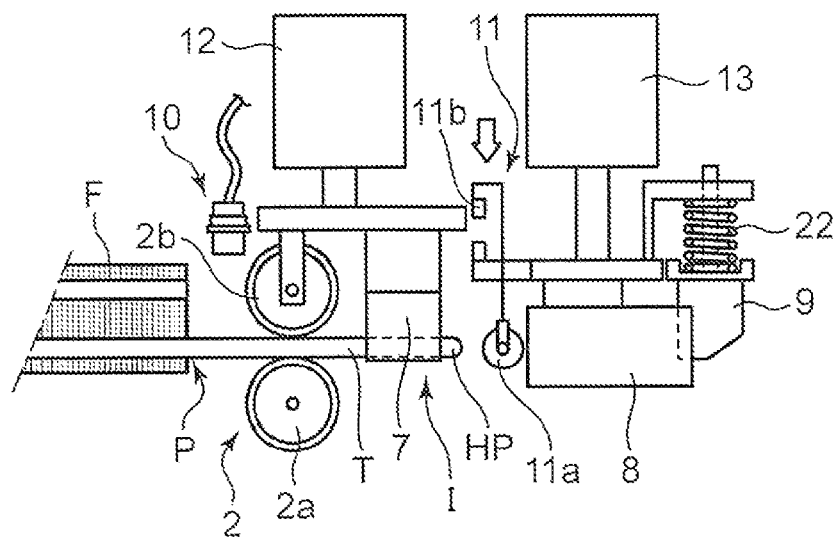
FIG. 18 is a diagram showing a state in which the hairpin tube has moved to a first position in the heat exchanger tube inserting method using the heat exchanger tube inserting apparatus shown in FIG. 1.
Figure 19:
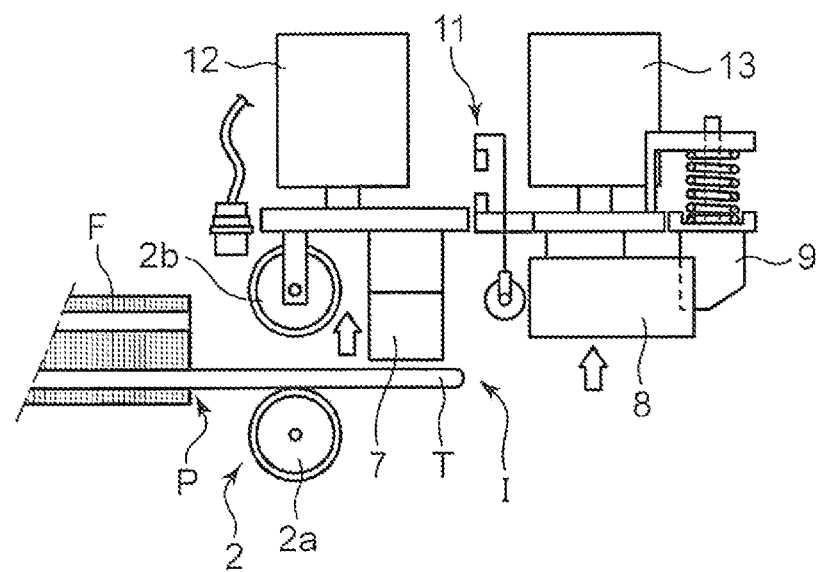
FIG. 19 is a diagram showing a state in which a driven roller, the first guide member, and the second guide member have moved upward in the heat exchanger tube inserting method using the heat exchanger tube inserting apparatus shown in FIG. 1.

When a hairpin tube T is at the predetermined initial position N, the contact roller 11a of the hairpin tube detection sensor 11 is on the hairpin tube T, as shown in FIG. 16. Therefore, the bracket 11c and the proximity sensor 11b disposed at the leading end of the bracket 11c are in a raised state in which the proximity sensor 11b is distant from the detection object 11d. This allows the proximity sensor 11b to detect that the detection object 11d is distant therefrom. Based on this, it is possible to detect that the hairpin tube T is at the predetermined initial position N. On the other hand, when a hairpin tube T is not at the predetermined initial position N, the contact roller 11a, the bracket 11c and the proximity sensor 11b are located at a lower position than the position shown in FIG. 16, as shown in FIG. 18. At this time, the proximity sensor 11b can detect that no hairpin tube T is at the predetermined initial position N by detecting that the detection object 11d is in proximity thereto. When the hairpin tube detection sensor 11 detects that no hairpin tube T is at the predetermined initial position N, the controller 14 controls the second vertical mover 12 that corresponds to the hairpin tube detection sensor 11 having detected no hairpin tube T, so as not to lower the driven roller 2b and the first guide member 7 as described later.

Figure 17:
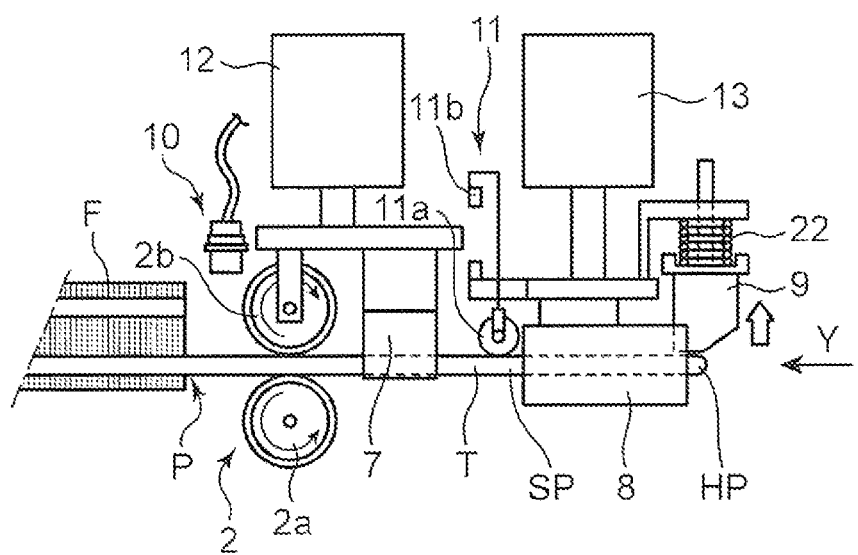
FIG. 17 is a diagram showing a state in which the entanglement eliminator has receded upward in the course of movement of a hairpin tube by the roller conveyor section, in the heat exchanger tube inserting method using the heat exchanger tube inserting apparatus shown in FIG. 1.

Further, the above-described hairpin tube detection sensor 11 detects whether a hairpin tube T is at a position between the predetermined initial position N and the position immediately before the first position I while the hairpin tube T is being conveyed by the driving roller 2a and the driven roller 2b of the roller conveyor section 2, as shown in FIGS. 17 to 18. Specifically, as shown in FIG. 17, while a hairpin tube T moves from the initial position N to the position immediately before the predetermined first position I, the contact roller 11a is on the hairpin tube T and the proximity sensor 11b is distant from the detection object 11d. This allows the proximity sensor 11b to detect that the hairpin portion HP of the hairpin tube T has not passed the contact roller 11a. On the other hand, as shown in FIG. 18, when a hairpin tube T has moved to the predetermined first position I, the contact roller 11a descends, so that the proximity sensor 11b approaches the detection object 11d. This allows the proximity sensor 11b to detect that the hairpin portion HP of the hairpin tube T has passed the contact roller 11a. When the hairpin tube detection sensor 11 detects the passage of the hairpin portion HP, the controller 14 causes the motor 21 to stop in order to stop rotation of the driving roller 2a of the roller conveyor section 2 (see step S9 in FIG. 15).

The contact roller 11a has a width sufficient to be placed on the two straight tube portions SP of a hairpin tube T at once.

The contact roller 11a is made to rotate upon coming into contact with a hairpin tube T to have a reduced friction with the hairpin tube T, thereby reducing rubbing of the hairpin tube T. Further, the contact roller 11a is pressed downward by an unillustrated spring via the bracket 11c. This makes it possible to press the hairpin tube T from above to thereby prevent the hairpin tube T from shaking during the movement.

It may be appreciated to use a resin plate slidable upon coming into contact with a hairpin tube T, in place of the contact roller 11a.

The second vertical movers 12 are respectively disposed at positions corresponding to the roller conveyor sections 2 as shown in FIGS. 1 to 4. For each of the roller conveyor sections 2, the second vertical mover 12 is provided to vertically move the driven roller 2b and the first guide member 7. This makes it possible to vertically move the first guide member 7 and the driven roller 2b for each hairpin tube T. Consequently, the driven roller 2b and the first guide member 7 can be shifted between a position at which they come in contact with a hairpin tube T and a position to which they recede upward from the hairpin tube T. Therefore, while a plurality of hairpin tubes T are advanced to the plurality of roller conveyor sections 2 simultaneously, and when there is an abnormal movement of one of the hairpin tubes T, it is possible to move the driven roller 2b and the first guide member 7 corresponding to that hairpin tube T in a direction of receding upward from that hairpin tube T.

Each of the second vertical movers 12 specifically includes, as shown in FIG. 1, the roller support portion 12a rotatably supporting the driven roller 2b, the guide support portion 12b supporting the first guide member 7, the movable plate 12c connected with the roller support portion 12a and the guide support portion 12b, a rod 12d connected to the movable plate 12c, and a cylinder 12e for driving the rod 12d vertically. The cylinder 12e is secured to the upper mounting board 4b of the main body frame 4.

The third vertical mover 13 is disposed upstream of the second vertical movers 12 in the conveyance direction Y of hairpin tubes T. The third vertical mover 13 can vertically move the second guide member 8 and the entanglement eliminators 9. Specifically, the third vertical mover 13 includes, as shown in FIG. 1, the guide support portion 13a supporting the second guide member 8, the entanglement eliminator support portion 13b supporting the entanglement eliminators 9 vertically movably, the movable plate 13c connected with the guide support portion 13a and the entanglement eliminator support portion 13b, a rod 13d connected to the movable plate 13c, and a cylinder 13e for driving the rod 13d vertically. The cylinder 13e is secured to the upper mounting board 4b of the main body frame 4.

The hand switch 16 can be operated manually such as by being pushed with a hand. The hand switch 16 issues a command to the controller 14 to initially start a series of steps of insertion operation performed by the heat exchanger tube inserting apparatus 1. In this manner, the operation is initially started by manually operating the hand switch 16, which improves the safety. The hand switch 16 is disposed at a position allowing an operator to easily operate the hand switch 16 during his work, for example, on a top surface of the upper mounting board 4b of the main body frame 4. Further, an emergency stop button 23 is disposed at a position adjacent to the hand switch 16 for stopping the heat exchanger tube inserting apparatus 1 in the case of an emergency.

The foot switch 17 can be operated with a foot such as by being pushed with a foot. The foot switch 17 issues a command to the controller 14 to start a subsequent step when the heat exchanger tube inserting apparatus 1 is in a suspended state in the middle of insertion operation of the heat exchanger tube inserting apparatus 1 (specifically, when insertion of hairpin tubes T by the roller conveyor sections 2 is normally completed at step S12 in FIG. 15). The foot switch 17 is disposed at a position allowing an operator to easily operate the foot switch 17 during his work, for example, at a position below the lower mounting board 4a of the main body frame 4 allowing an easy operation with his foot.

Now, an inserting method of hairpin tubes T using the heat exchanger tube inserting apparatus 1 according to the first embodiment will be described with reference to a flowchart of FIG. 15, and FIGS. 16 to 20.

First, as shown in FIG. 16 (and FIGS. 1 and 2), an operator sets a plurality of (in FIG. 2, three) hairpin tubes T at the predetermined initial position N (for example, at a position at which respective leading ends of the hairpin tubes T are inserted in insertion holes P of a front fin F of the number of fins F mounted on the working stand M) in advance. At this time, because the hairpin portions HP of the hairpin tubes T are placed on the receiving table R which is in the form of a corrugated plate, the hairpin tubes T are disposed substantially in parallel to each other, as shown in FIG. 2.

Figure 15:
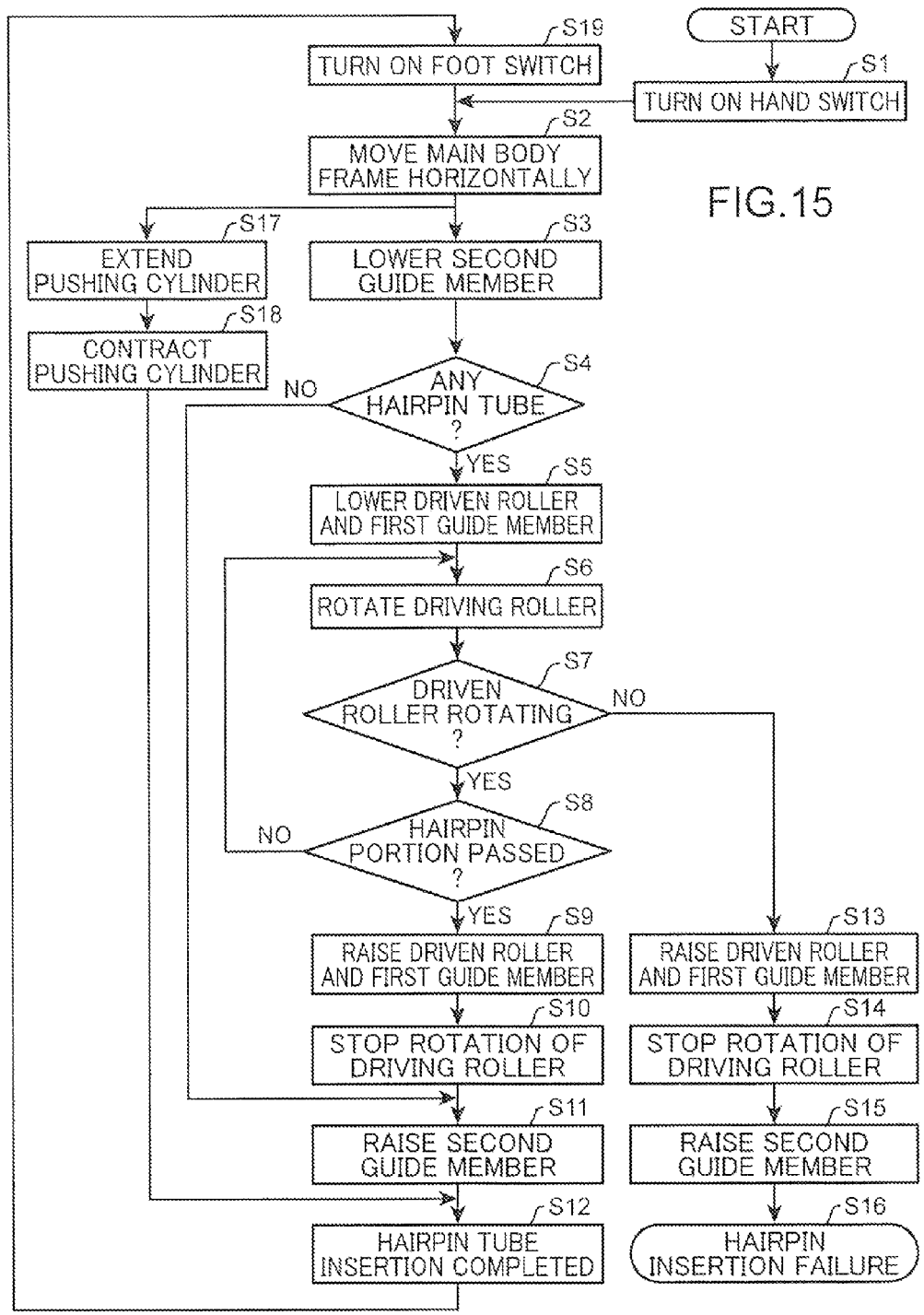
FIG. 15 is a flowchart showing operation steps of the heat exchanger tube inserting apparatus shown in FIG. 1.

After setting the hairpin tubes T at the initial position N, the operator manually operates the hand switch 16 disposed at the upper end of the main body frame 4 as shown in step S1 of the flowchart in FIG. 15, to thereby start a series of steps of operation performed by the heat exchanger tube inserting apparatus 1. It should be noted that, before the start of operation, the driven rollers 2b, the first guide members 7, the second guide member 8, the entanglement eliminators 9, and the hairpin tube detection sensors 11 are at positions apart upward from the hairpin tubes T, as shown in FIG. 1.

First, as shown in step S2 of FIG. 15, the controller 14 controls the horizontal mover 6 so as to move the main body frame 4 in the horizontal movement direction X in order to bring the main body frame 4 close to the plurality of hairpin tubes T set at the initial position N. Completion of the horizontal movement of the main body frame 4 allows each of the hairpin tubes T to be on the driving roller 2a and the support board 15.

Subsequently, the controller 14 controls the third vertical mover 13 so as to lower the second guide member 8 as shown in step S3 of FIG. 15. At this time, the entanglement eliminators 9 and the hairpin tube detection sensors 11 also descend with the second guide member 8. This allows the hairpin tubes T to be respectively inserted into the grooves 8a of the second guide member 8. At the same time, each of the entanglement eliminators 9 is inserted into the space between the two straight tube portions SP of the hairpin tube T.

Subsequently, each of the hairpin tube detection sensors 11 detects whether the corresponding hairpin tube T is at the initial position N as shown in step S4. Specifically, the contact roller 11a of the detection sensor 11 gets on the hairpin tube T, which allows the proximity sensor 11b to detect that the detection object 11d is distant therefrom. Based on this, the hairpin tube T is detected as being at the initial position N.

In the case where the hairpin tube T is at the initial position N, the controller 14 controls the relevant second vertical mover 12 so as to lower the driven roller 2b and the first guide member 7, as show in step S5 of FIG. 15. At the same time, the controller 14 controls the motor 21 so as to rotate the relevant driving roller 2a of the roller conveyor section 2, as shown in step S6 of FIG. 15. Consequently, each of the hairpin tubes T is sandwiched between the driving roller 2a and the driven roller 2b of the roller conveyor section 2, as shown in FIG. 16. At this time, the straight portions SP of the hairpin tube T are inserted into the grooves 7a of the first guide member 7. Each of the hairpin tubes T is advanced in the conveyance direction Y while being sandwiched between the driving roller 2a and the driven roller 2b of the roller conveyor section 2, to be inserted into insertion holes P of each fin F, as shown in FIGS. 16 and 17.

In the movement of the hairpin tube T, the two straight tube portions SP of the hairpin tube T are first guided to extend in the conveyance direction Y with a sufficient degree of accuracy while being inserted in the grooves 8a of the second guide member 8 together, and are then advanced to the first guide member 7. Further, the two straight tube portions SP of the hairpin tube T are guided to extend in the conveyance direction Y with a higher accuracy while respectively being inserted in the grooves 7a of the first guide member 7. Subsequently, the straight tube portions SP are advanced into the space between the driving roller 2a and the driven roller 2b.

While the hairpin tube T is advancing in the manner as described, the entanglement eliminator 9 advances relative to the two straight tube portions SP of the hairpin tube T so as to get into the space between the straight tube portions SP (see FIG. 14B). This allows the entanglement eliminator 9 to eliminate entanglement between the straight tube portions SP. When the hairpin portion HP of the hairpin tube T reaches the entanglement eliminator 9, the entanglement eliminator 9 recedes upward with the oblique portion 9a thereof making contact with the hairpin portion HP (see FIG. 17). The entanglement eliminator 9 returns to the lower position by a restoring force of the spring 22 when the hairpin portion HP passes the entanglement eliminator 9 (see FIG. 18).

Further, while the hairpin tube T is moving, the rotation detection sensor 10 detects whether the corresponding driven roller 2b is rotating with the advancing movement of the hairpin tube T, as shown in step S7 of FIG. 15.

In addition, at this time, the hairpin tube detection sensor 11 detects whether the hairpin portion HP of the corresponding hairpin tube T has passed thereby, as shown in step S8. Specifically, when the hairpin portion HP passes the contact roller 11a of the sensor 11, the contact roller 11a descends as shown in FIG. 18. This allows the proximity sensor 11b to detect that the detection object 11d is in proximity thereto. Based on this, the detection as to whether the hairpin portion HP has passed is performed. When the hairpin portion HP passes, the hairpin tube T has been advanced to the predetermined first position I by the roller conveyor section 2, as shown in FIGS. 2 and 18. In this state, the hairpin portion HP of the hairpin tube T is located at the upstream of the first guide member 7 in the conveyance direction Y.

In the case where the passage of the hairpin portion HP is detected, the controller 14 controls the relevant second vertical mover 12 so as to raise the driven roller 2b and the first guide member 7, as shown in step S9 of FIG. 15. In the case where the passage of the hairpin portion HP is not detected, the operation returns to step S6 to keep the relevant driving roller 2a rotating.

Subsequently, the controller 14 controls the motor 21 so as to stop rotation of the relevant driving miler 2a, as shown in step S10.

Thereafter, as shown in step S11 of FIG. 15, the controller 14 controls the third vertical mover 13 so as to raise the second guide member 8 (with the entanglement eliminators 9 and the hairpin tube detection sensors 11) (see FIG. 19), whereby the series of steps (steps S2 to S12) of inserting the hairpin tubes T to the first position I by the roller conveyor sections 2 is successfully completed (step S12).

During the above-described series of steps (steps S2 to S12) of operation, the operator sets, in advance, hairpin tubes T to be subjected to the second insertion operation at the predetermined initial position N at the downstream side of the hairpin tubes T that have been subjected to the first insertion operation and inserted to the first position I as described above, in the horizontal movement direction X, as shown in FIG. 2.

After setting the second set of hairpin tubes T at the initial position N, the operator operates the foot switch 17 with his foot, the foot switch being located below the main body frame 4, as shown in step S19 of the flowchart in FIG. 15. This allows the heat exchanger tube inserting apparatus 1 to simultaneously start a series of steps of inserting the second set of hairpin tubes T to the first position I by the roller conveyor sections 2, and an operation of pushing the first set of hairpin tubes T to the second position II by the pushing cylinder 3.

Specifically, the controller 14 first controls the horizontal mover 6 so as to move the main body frame 4 in the horizontal movement direction X as shown in step S2 of FIG. 15 in the same manner as described. At this time, when the horizontal movement of the main body frame 4 is completed, the main body frame 4 has moved in the horizontal movement direction X by the width of three hairpin tubes T from the position shown in FIG. 2. As a result, the second set of hairpin tubes T (i.e. the hairpin tubes T set at the initial position N) are placed on the driving rollers 2*a* and the support board 15, and at the same time, the first set of the hairpin tubes T which has been inserted to the first position I are placed in front of the pushing cylinder 3.

Figure 20:
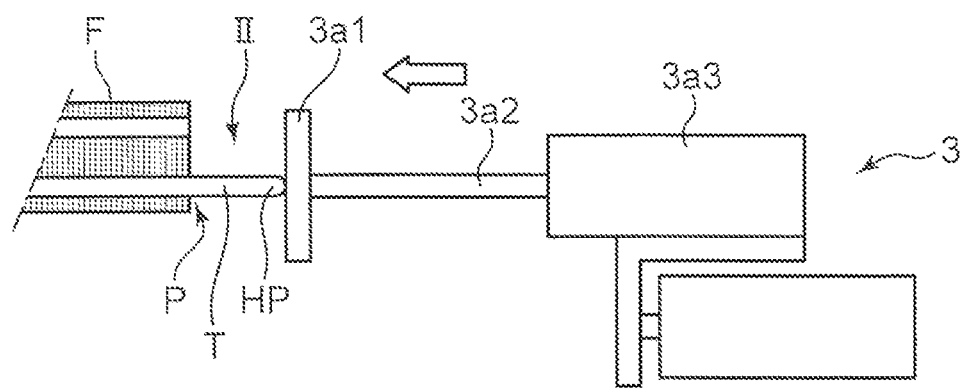
FIG. 20 is a diagram showing a state in which a pushing roller has pushed a hairpin tube to a second position in the heat exchanger tube inserting method using the heat exchanger tube inserting apparatus shown in FIG. 1.

This allows the operation of inserting the second set of hairpin tubes T to the first position I by the roller conveyor sections 2 to proceed through the above-described steps S3 to S12, and at the same time, the pushing cylinder 3 to be extended to push the first set of hairpin tubes T to the second position II as shown in step S17. Specifically, as shown in FIG. 20, the cylinder 3*a*3 of the pushing cylinder 3 is caused to drive the rod 3*a*2 forward to thereby advance the pushing plate 3*a*1 located at the leading end of the rod 3*a*2. This allows the pushing plate 3*a*1 to push the hairpin tubes T to the second position II while making contact with the hairpin portions HP. After the hairpin tubes T are pushed to the predetermined second position II, the pushing cylinder 3 (specifically, the pushing plate 3*a*1) is contracted and returns to the state capable of pushing the second set of hairpin tubes T to the second position II, as shown in step S18.

In the manner as described, it is possible to simultaneously perform the operation of advancing hairpin tubes T to the first position I by the roller conveyor sections 2 and the operation of pushing hairpin tubes T which has been advanced to the first position I to the second position II by the pushing cylinder 3. Repetition of these operations allows hairpin tubes T to pass through all the insertion holes P of the fins F constituting a tier.

When the insertion operation at a tier of the heat exchanger E is completed, the first vertical mover 5 is driven to raise the main body frame 4, to thereby allow insertion of hairpin tubes T into the insertion holes P of fins F constituting an upper tier.

In the case where the hairpin tube detection sensor 11 does not detect that the corresponding hairpin tube T is at the initial position N at the above-described step S4 shown in FIG. 15, the controller 14 controls the second vertical mover 12 that corresponds to the hairpin tube detection sensor 11 having not detected the hairpin tube T, so as not to perform the operation (step S5) of lowering the driven roller 2*b* and the first guide member 7 (i.e. the operation jumps to step 11). Further, the controller 14 controls another second vertical mover 12 that corresponds to the hairpin tube detection sensor 11 having detected the hairpin tube T, so as to lower the driven roller 2*b* and the first guide member 7. In this manner, the operation is controlled through the series of steps from S5 to S10 in order to insert only the detected hairpin tube T to the first position I, and then proceeds to step S11.

Further, in the case where the driven roller 2*b* is not detected as rotating at the above-described step S7, the corresponding hairpin tube T is not being advanced normally because, for example, the hairpin tube T is caught on the edge of insertion holes P of fins F. In such case, an unillustrated alarm device emits an alarm sound to notify the operator of the insertion failure of the hairpin tube T. At the same time, the controller 14 proceeds to step S13 and controls the second vertical mover 12 that corresponds to the hairpin tube T not being advanced normally, so as to raise the driven roller 2*b* and the first guide member 7. Subsequently, the controller 14 controls the motor 21 so as to stop rotation of the relevant driving roller 2*a* (step S14), and then controls the third vertical mover 13 so as to raise the second guide member 8 (step S15). Further, the controller 14 controls the horizontal mover 6 so as to move the main body frame 4 horizontally to the position prior to the operation, to thereby end the operation while leaving the hairpin tube T failed to be successfully inserted to the first position I by the roller conveyor section 2 (step S16). In this case, the operator removes the hairpin tube T having not been advanced normally, and sets a replacement new hairpin tube T at the initial position N properly. Thereafter, the operator pushes the hand switch 16 with a hand (step S1) to thereby restart the insertion operation of the heat exchanger tube inserting apparatus 1 from step S2.

As described above, the heat exchanger tube inserting apparatus 1 according to the first embodiment includes the roller conveyor sections 2 and the pushing cylinder 3 as a mechanism for advancing hairpin tubes T into insertion holes P of fins F in two steps. Therefore, as long as hairpin tubes T are set at the predetermined initial position N at which the hairpin tubes T are inserted in insertion holes P of a front fin F of the number of fins F in advance, it is possible to first insert the hairpin tubes T into insertion holes P of fins F to the predetermined position I by rotating the driving rollers 2*a* and the driven rollers 2*b* of the roller conveyor sections 2, and then further insert the hairpin tubes T to the predetermined second position II by the pushing cylinder 3, thereby inserting the hairpin tubes T to the final position, i.e. the predetermined second position II. Therefore, different from the conventional heat exchanger tube inserting apparatus, it does not require a heat exchanger tube inserting means having such a long stroke length as to fully insert a hairpin tube into insertion holes of a number of fins, nor guide rods being so long as to pass through the number of fins F for supporting the hairpin tube T. Consequently, the heat exchanger tube inserting apparatus 1 can be made small in size.

Further, the above-described heat exchanger tube inserting apparatus 1 requires an operator to set hairpin tubes T at the initial position N in advance. However, because of being a semi-automatic machine, the heat exchanger tube inserting apparatus 1 can be configured extremely simply with the combination of the roller conveyor sections 2 and the pushing cylinder 3. Therefore, it is only necessary for an operator to insert leading ends of hairpin tubes T into insertion holes P of a small number of fins F to thereby set the hairpin tubes T at the initial position N, and thereafter, the above-described heat exchanger tube inserting apparatus 1 automatically and reliably inserts the hairpin tubes T to the final second position II. Therefore, the heat exchanger tube inserting apparatus 1 can perform the insertion operation efficiently with the simple structure. Further, the operation of setting hairpin tubes T at the initial position N by an operator and the subsequent operation of inserting the hairpin tubes T by the heat exchanger tube inserting apparatus 1 are performed individually and in parallel as described, which improves the operation rate of the apparatus.

Further, use of the above-described heat exchanger tube inserting apparatus 1 to insert hairpin tubes T reduces the number and time of handlings of hairpin tubes T, i.e. operator action of pulling in a hairpin tube T and inserting it into fins F with his hands. Therefore, it is possible to reduce deformation of hairpin tubes T during the insertion operation and the number of hairpin tubes T to be thrown away.

Further, use of the heat exchanger tube inserting apparatus 1 according to the first embodiment makes it possible to insert hairpin tubes T at a constant speed, and therefore reduce fluctuations in the insertion time of an operator. Thus, the operation time shortens.

Further, use of the heat exchanger tube inserting apparatus 1 according to the first embodiment allows the heat exchanger tube inserting apparatus 1 to perform most of the insertion operation of hairpin tubes T, which reduces the burden on an operator.

Further, in the heat exchanger tube inserting apparatus 1 according to the first embodiment, hairpin tubes T are advanced to the first position I to complete the insertion of their large portions by driving of the rollers of the roller conveyor sections 2, and then pushed to the final second position II by the pushing cylinder 3. This enables projecting lengths (projecting extent) of the hairpin tubes T beyond the front fin F to be equalized to one another.

Furthermore, the above-described heat exchanger tube inserting apparatus 1 is capable of advancing a hairpin tube T having a desired length, by advancing the hairpin tube T by rotation of the driving roller 2a and the driven roller 2b of the roller conveyor section 2. Therefore, provision of a stroke length can be eliminated, and hairpin tubes T of various lengths can be inserted. Therefore, it is possible to insert even an extremely long hairpin tube T into insertion holes P of fins F. Consequently, the length of usable hairpin tubes T is not limited. Furthermore, the apparatus can be adapted to hairpin tubes T having a different tube diameter by changing to use first guide members 7 and second guide member 8 having a dimension corresponding to the tube diameter.

Furthermore, the heat exchanger tube inserting apparatus 1 according to the first embodiment 1 has an extremely simple and compact configuration with the combination of the roller conveyor sections 2 and the pushing cylinder 3. Therefore, it requires only a small installation space. Therefore, the heat exchanger tube inserting apparatus 1 according to the first embodiment can be mounted on the existing working stand M on which the number of fins F are placed, and furthermore, it can be easily adjusted according to the change of layout in a factory.

Further, the heat exchanger tube inserting apparatus 1 according to the first embodiment 1 has an extremely simple and compact configuration with the combination of the roller conveyor sections 2 and the pushing cylinder 3, which allows an operator to visually check whether hairpin tubes T have been inserted to the final second position II, unlike the fully-automatic inserting apparatus such as one disclosed in Patent Literature 1

Further, in the heat exchanger tube inserting apparatus 1 according to the first embodiment, the entanglement eliminator 9 disposed upstream of the driving roller 2a and the driven roller 2b in the conveyance direction Y of hairpin tubes T eliminates entanglement between the straight tube positions SP of a hairpin tube T before the hairpin tube T is advanced into insertion holes P of fins by rotation of the driving roller 2a and the driven roller 2b. This makes the hairpin tube T more likely to be successfully inserted without being interrupted by the second guide member 8 or the driving roller 2a and the driven roller 2b located downstream thereof.

Further, in the heat exchanger tube inserting apparatus 1 according to the first embodiment, in the course of advancement of a hairpin tube T into insertion holes P of fins F by rotation of the driving roller 2a and the driven roller 2b, the oblique portion 9a of the entanglement eliminator 9 can come into contact with the hairpin portion HP to thereby allow the entanglement eliminator 9 to recede upward from the hairpin portion HP when the hairpin portion HP passes the entanglement eliminator 9. This makes the hairpin portion HP less likely to be interrupted by the entanglement eliminator 9.

Furthermore, in the heat exchanger tube inserting apparatus 1 according to the first embodiment, the entanglement eliminator 9 recedes upward from a hairpin portion HP by the oblique portion 9a coming into contact with the hairpin portion HP, and the entanglement eliminator 9 is pushed downward by a resilient force of the spring 22. Therefore, it is possible to eliminate entanglement occurring in the process of inserting a hairpin tube T to prevent the hairpin tube T from getting abnormally caught in the apparatus (in particular, in the second guide member 8) with a simple configuration without an additional driver component (such as cylinder or sensor) for moving the entanglement eliminator 9.

Further, in the heat exchanger tube inserting apparatus 1 according to the first embodiment, the respective contact portions 2a1 and 2b1 of the driving roller 2a and the driven roller 2b that come into contact with a hairpin tube T each have a flat part elastically deformable to make surface contact with the hairpin tube T when coming into contact with the hairpin tube T. This makes it possible to reliably advance a hairpin tube T into insertion holes of fins F by rotation of the driving roller 2a and the driven roller 2b according to an outer diameter of the hairpin tube T. Furthermore, the use of the above-described rollers 2a and 2b makes it possible to advance a tube having a different cross-section from the circular cross-section. Furthermore, the elastic deformation of the driving roller 2a and the driven roller 2b makes a hairpin tube T less likely to be deformed or damaged.

Furthermore, a marketed rubber-coated flat roller can be used rather than a grooved roller as the driving roller 2a and the driven roller 2b, which allows simplification of the apparatus.

Further, in the heat exchanger tube inserting apparatus 1 according to the first embodiment, the pushing cylinder 3 can push hairpin tubes T over two different distances by use of the first pushing portion 3a and the second pushing portion 3b. Specifically, it is possible to push hairpin tubes T over the predetermined stroke length S1 by use of only the first pushing portion 3a. Further, it is possible to push hairpin tubes T over the stroke length S2 longer than the above-mentioned stroke length S1 by combinational simultaneous operation of the first pushing portion 3a and the second pushing portion 3b. Therefore, even in the case where one tier includes a row of hairpin tubes T having a different effective length from another tier in assembling of a heat exchanger E including the tiers, it is possible to insert one tier of hairpin tubes T in a different stroke length from another tier to thereby accord with the effective length.

Such configuration of the pushing cylinder 3 including the plurality of pushing portions 3a and 3b is adaptable to a heat exchanger E including any number of tiers by providing a necessary number of pushing portions.

Further, in the heat exchanger tube inserting apparatus 1 according to the first embodiment, the first guide member 7 positions a hairpin tube T with respect to the driving roller 2a and the driven roller 2b at the upstream side of the driving roller 2a and the driven roller 2b in the conveyance direction Y of hairpin tubes T. This makes the hairpin tube T less likely to reach the driving roller 2a and the driven roller 2b obliquely to the predetermined conveyance direction Y.

Further, in the heat exchanger tube inserting apparatus 1 according to the first embodiment including the plurality of roller conveyor sections 2, the first guide members 7 are respectively disposed upstream of the roller conveyor sections 2 in the conveyance direction Y of hairpin tubes T. This allows each of the first guide members 7 to accurately position a hairpin tube T which is to be advanced by the corresponding roller conveyor section 2, with respect to the driving roller 2a and the driven roller 2b. This makes, in insertion of a plurality of hairpin tubes T by the plurality of roller conveyor sections 2, each of the hairpin tube T less likely to reach the corresponding driving roller 2a and the driven roller 2b obliquely to the predetermined conveyance direction Y. Further, it is also possible, in insertion of a plurality of hairpin tubes T by the plurality of roller conveyor sections 2, to prevent each of the hairpin tube detection sensors 11 (i.e. heat exchanger tube detection sensors 11) from making an erroneous detection.

Further, in the heat exchanger tube inserting apparatus 1 according to the first embodiment, it is possible to position hairpin tubes T with respect to the first guide members 7 by the second guide member 8 at the upstream side of the first guide members 7 in the conveyance direction Y of hairpin tubes T before the hairpin tubes are advanced to the respective corresponding first guide members 7. This makes each of the hairpin tubes T even less likely to reach the driving roller 2a and the driven roller 2b obliquely to the predetermined conveyance direction Y.

Further, in the heat exchanger tube inserting apparatus 1 according to the first embodiment, it is possible to detect that a hairpin tube T is not at the predetermined initial position N by the hairpin tube detection sensor 11. This makes it possible to promptly inform that the hairpin tube T is not normally set at the initial position N.

Further, in the heat exchanger tube inserting apparatus 1 according to the first embodiment, the hairpin tube detection sensor 11 detects, while a hairpin tube T is being conveyed by the driving roller 2a and the driven roller 2b of the roller conveyor section 2, whether the hairpin tube T is at a position between the initial position N and the position immediately before the first position I. This allows detection of passage of the hairpin portion HP of the hairpin tube T beyond the contact roller 11a of the hairpin tube detection sensor 11 to thereby detect that the hairpin tube T has moved to the first position I. Therefore, when the hairpin tube detection sensor 11 detects passage of a hairpin portion HP, the controller 14 can control the driving roller 2a of the relevant roller conveyor section 2 to stop rotating to thereby stop movement of the hairpin tube T.

Further, in the heat exchanger tube inserting apparatus 1 according to the first embodiment, the pair of driving roller 2a and the driven roller 2b are oppositely disposed across a hairpin tube T in each of the roller conveyor sections 2. This allows the driving roller 2a and the driven roller 2b to reliably advance the hairpin tube T into insertion holes P of fins F while vertically sandwiching the hairpin tube T therebetween.

Further, in the heat exchanger tube inserting apparatus 1 according to the first embodiment, each of the roller conveyor sections 2 include the pair of driving roller 2a and the driven roller 2b. Therefore, the provision of one driving roller 2a allows simplification of the mechanism. Furthermore, the driven roller 2b which is simpler in the mechanism can be moved easily between the position at which the driven roller 2b comes into contact with a hairpin tube T and the position to which the driven roller 2b recedes from the hairpin tube T.

Further, in the heat exchanger tube inserting apparatus 1 according to the first embodiment, in the case where a hairpin tube T is not normally advanced, the corresponding driven roller 2b is in the state of not rotating normally. Therefore, it is possible for the rotation detection sensor 10 to detect an abnormal state in which a hairpin tube T is not normally advanced by detecting rotation of the driven roller 2b.

Further, in the heat exchanger tube inserting apparatus 1 according to the first embodiment, in simultaneous insertion of a plurality of hairpin tubes T by the plurality of roller conveyor sections 2, it is possible, even in the case where an abnormality occurs in the insertion of one of the hairpin tubes T, to detect the abnormality. It is possible to detect an abnormality for each of the roller conveyor sections 2 by the rotation detection sensor 10 provided for each of the driven rollers 2b of the roller conveyor sections 2. Therefore, the driven roller 2b and the first guide member 7 of the roller conveyor section 2 for which an insertion failure of a hairpin tube T has been detected can be raised by the corresponding second vertical mover 12. This allows an operator to easily remove the hairpin tube T having failed to be inserted, and replace it with a new hairpin tube T.

Further, in the heat exchanger tube inserting apparatus 1 according to the first embodiment, in the case where the rotation detection sensor 10 detects an abnormality in rotation of the driven roller 2b, the conveying operation of a hairpin tube T by the relevant roller conveyor section 2 is stopped. Therefore, it is possible to detect an insertion failure of a hairpin tube T for each of the roller conveyor sections 2, and stop only the roller conveyor section 2 which has been detected as abnormal from performing the insertion operation of a hairpin tube T.

(Modifications of First Embodiment)

In the above-described first embodiment, the heat exchanger tube inserting apparatus 1 insert hairpin tubes T. However, the present invention is not limited to the insertion of hairpin tubes T. The heat exchanger tube inserting apparatus 1 can also insert straight tubes having no hairpin portions.

In the above-described first embodiment, the driving roller 2a and the driven roller 2b exemplify the pair of rollers for sandwiching a hairpin tube T. However, the present invention is not limited to this configuration. A pair of driving rollers which are respectively driven by a motor may alternatively be used. Further, the driving roller 2a may be disposed above a hairpin tube T, instead of under the hairpin tube T as shown in FIG. 1.

In the above-described embodiment, the plurality of driving rollers 2a are driven by the common motor 21. However, the present invention is not limited to this configuration. An individual motor may be provided for each of the driving rollers 2a.

In the above-described first embodiment, the roller conveyor section 2 advances a hairpin tube T in the direction of inserting it into insertion holes P of fins F. However, the configuration may be modified to cause the driving roller 2a, in the case where an insertion failure of a hairpin tube T occurs (for example, the case where a hairpin tube T gets caught in insertion holes P and fails to be successfully inserted), to rotate in a reverse direction to allow removal of the hairpin tube T. In that case, the configuration is preferred to allow the driven roller 2b to be pushed a little strongly against the hairpin tube T to remove the hairpin tube T, for example, it is preferred to provide an auxiliary cylinder in addition to the second vertical mover 12 in order to push the driven roller 2b downward.

In the above-described first embodiment, the driving roller 2a and the driven roller 2b have the flat respective contact portions 2a1 and 2b1 which come into contact with a hairpin tube T. However, the present invention is not limited to this configuration. The driving roller 2a and the driven roller 2b each may be in the form of a grooved roller having grooves formed in a circumferential portion thereof. Each of the grooves is only necessary to have a shape allowing a part of the straight portion SP of a hairpin tube T to fit therein, and may have a curved shape or a V-shape. Such grooved rollers will make a great friction with a hairpin tube T, which therefore do not need to have an elastically deformable contact portion made of an urethane rubber or the like. On the other hand, they are less versatile and are applicable to hairpin tubes having limited tube diameters. Therefore, in the case of inserting heat exchanger tubes having different tube diameters, it is preferred that the rollers have a flat contact portion as in the above-described embodiment.

In the above-described first embodiment, the pushing cylinder 3 including vertically aligned two pushing portions 3a and 3b is illustrated. However, the present invention is not limited to this configuration. A pushing cylinder including vertically aligned three or more pushing portions may alternatively be adopted. In that case, it is possible to set three or more levels of depression amounts.

In the above-described first embodiment, the entanglement eliminator 9 recedes upward from a hairpin portion HP by the oblique portion 9a coming into contact with the hairpin portion HP, and the entanglement eliminator 9 is pushed downward by the spring 22. However, the present invention is not limited to this configuration. An alternative configuration may include a mechanism for automatically vertically moving the entanglement eliminator 9. Such a moving mechanism may include, for example, a cylinder for vertically moving the entanglement eliminator 9, and a proximity sensor for detecting the approach of the hairpin portion HP of a hairpin tube T to the entanglement eliminator 9.

The heat exchanger tube inserting apparatus 1 according to the first embodiment includes the three roller conveyor sections 2 and the pushing cylinder 3 having the pushing plate 3a1 having a width sufficient to simultaneously push three hairpin portions HP in order to simultaneously insert three hairpin tubes T. However, the present invention is not limited to this configuration. A heat exchanger tube inserting apparatus of the present invention may be so configured as to insert one hairpin tube T, or to simultaneously insert a plurality of, i.e. two or four or more, hairpin tubes T.

Second Embodiment

In the heat exchanger tube inserting apparatus 1 according to the first embodiment, each of the roller conveyor sections 2 includes the pair of rollers 2a and 2b for vertically sandwiching a hairpin tube T therebetween. However, the present invention is not limited to this configuration. For example, as a second embodiment, each of roller conveyor sections 2 may include a plurality of (two in FIG. 21) driving rollers 2a disposed in an insertion direction Y of hairpin tubes T, and a plurality of driven rollers 2b disposed respectively opposite to the plurality of driving rollers 2a in order to exert a greater propulsive force on hairpin tubes T, as in a heat exchanger tube inserting apparatus 31 shown in FIG. 21.

The plurality of driving rollers 2a are so configured as to rotate at the same rotational speed. For example, each of the driving rollers 2a includes a rotary shaft 2a2 and a pulley 32 secured to the rotary shaft 2a2, and an endless belt (such as timing belt) 33 is wound around two pulleys 32. A motor (not shown) rotates the rotary shaft 2a2 of one of the plurality of driving rollers 2a to thereby transmit a torque to the other driving roller(s) 2a via the endless belt 33. This enables the plurality of driving rollers 2a to rotate at the same rotational speed.

A hairpin tube T is sandwiched by the plurality of driving rollers 2a and the plurality of driven rollers 2b opposed thereto, to thereby come into contact with the plurality of rollers 2a and 2b over a larger area than in the first embodiment. This makes the hairpin tube T less likely to slip on the rollers, and therefore a greater propulsive force can be exerted on the hairpin tube T.

Figure 21:
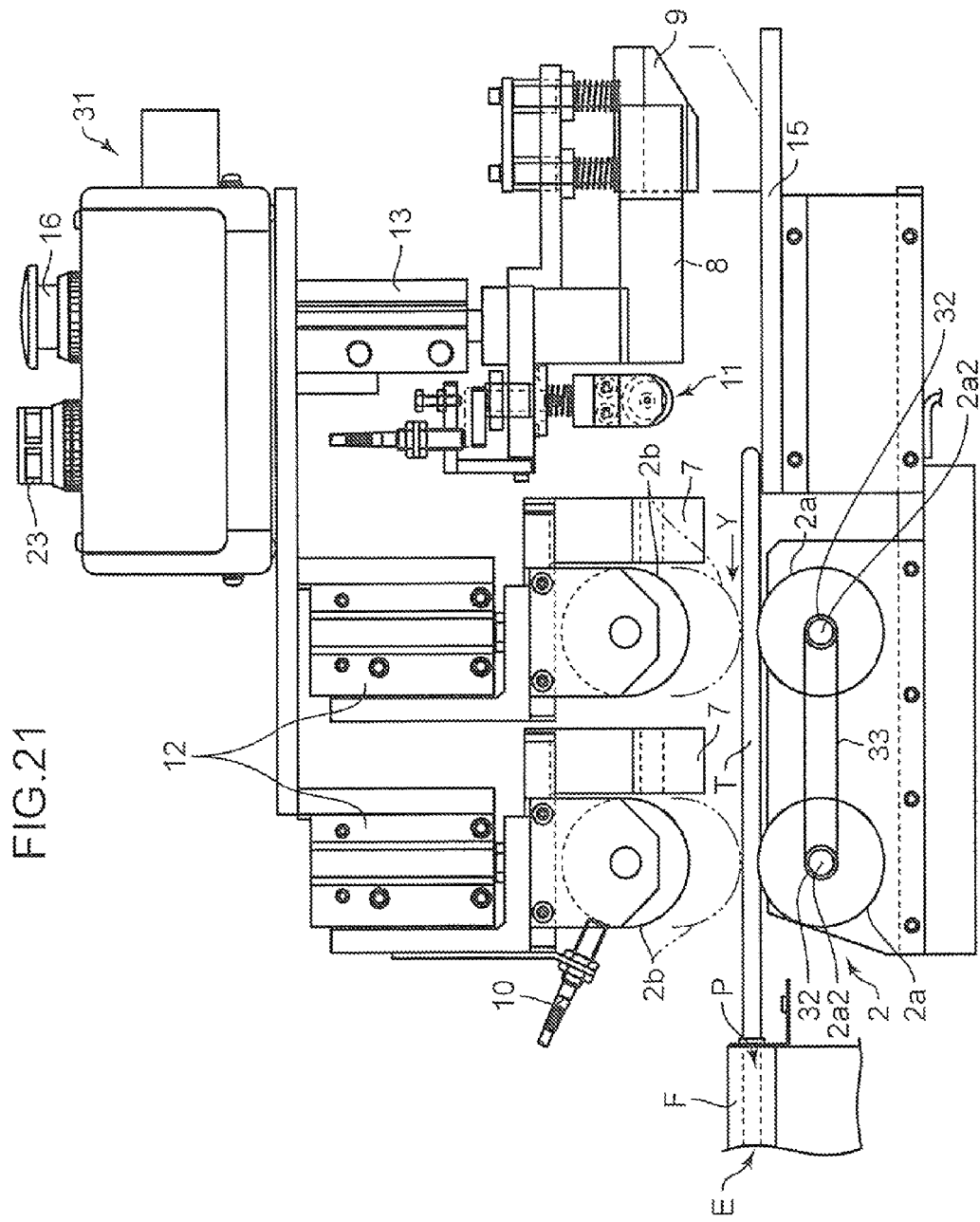
FIG. 21 is a side view of a heat exchanger tube inserting apparatus according to a second embodiment of the present invention.

It should be noted that FIG. 21 shows the roller conveyor section 2 including the two driving rollers 2a. However, a roller conveyor section 2 may include three or more driving rollers 2a and driven rollers 2b. Further, each of the driving rollers 2a may be driven by an individual motor.

Figure 22:
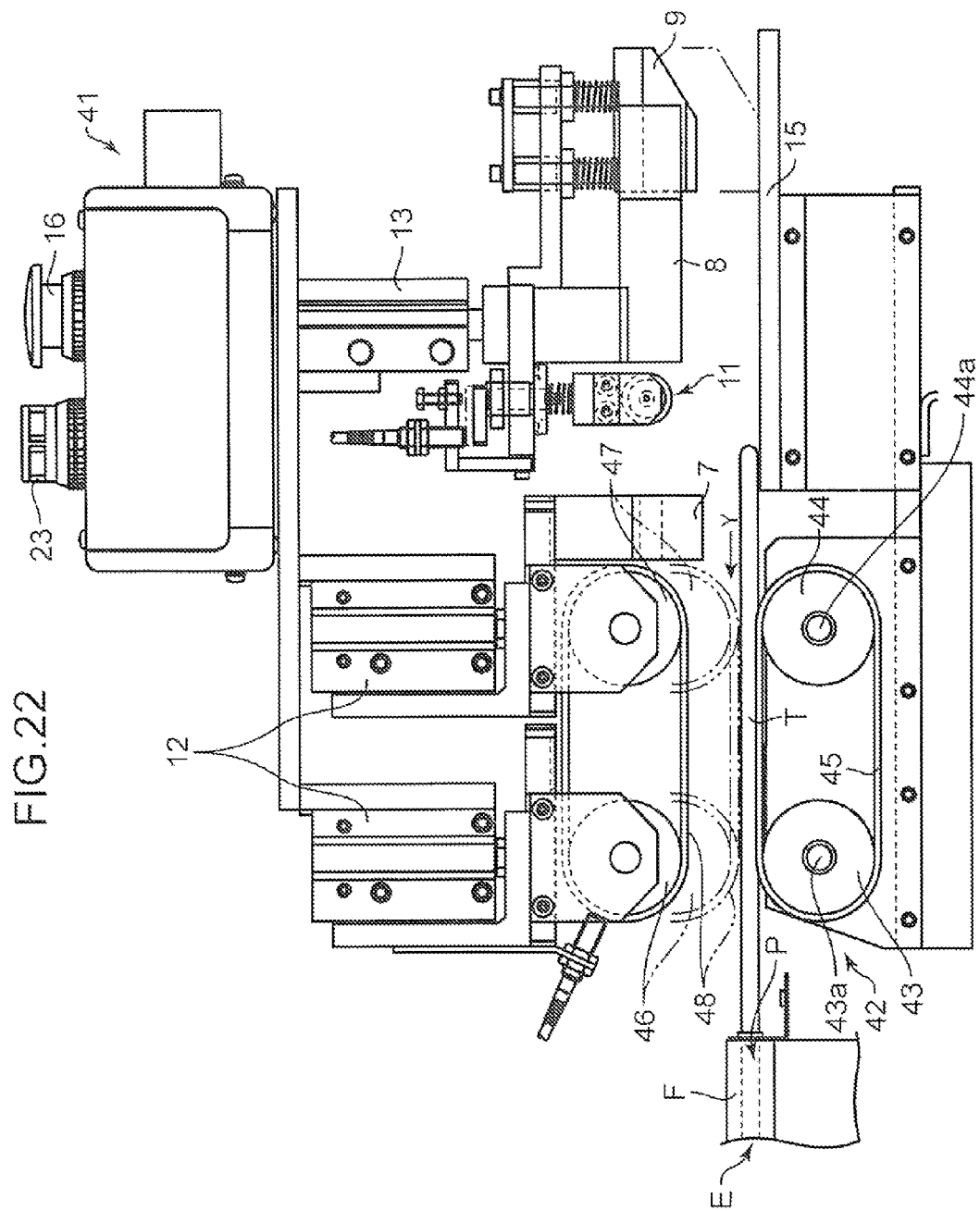
FIG. 22 is a side view of a modified heat exchanger tube inserting apparatus according to the second embodiment of the present invention.

As a modification of the second embodiment, endless belts 45 and 48 may each be wound around rollers in order to allow a roller conveyor section 42 to come into contact with a hairpin tube T over an even larger area, as in a heat exchanger tube inserting apparatus 41 shown in FIG. 22.

Such roller conveyor section 42 includes, for example, a plurality of driving rollers 43 and 44 disposed in an insertion direction Y of hairpin tubes T, the endless belt 45 wound around the driving rollers 43 and 44, a plurality of driven rollers 46 and 47 disposed respectively opposite to the plurality of driving rollers 43 and 44, and the endless belt 48 wound around the driven rollers 46 and 47.

Here, the driving rollers 43 and 44, and the driven rollers 46 and 47 are in the form of a cylinder, for example.

One of the driving rollers 43 and 44 is rotated by a motor (not shown) to thereby cause the endless belt 45 wound around the rollers 43 and 44 to run.

A hairpin tube T is sandwiched between the endless belt 45 wound around the driving rollers 43 and 44 and the endless belt 48 wound around the driven roller 46 and 47. This allows the roller conveyor section 42 to come into contact with the hairpin tube T over a large area as compared to the case without the endless belts 45 and 48. This makes the hairpin tube T even less likely to slip on the rollers, and therefore an even greater propulsive force can be exerted on the hairpin tube T.

Third Embodiment

The above-described first embodiment and second embodiment illustrate examples of so-called parallel insertion in which the straight tube portions SP of a hairpin tube T are inserted into through holes P of each of fins F with the hairpin tube T being in a horizontal state, i.e. the pair of straight tube portions SP of the hairpin tube T being in the state (a horizontal state, see FIG. 32) of extending horizontally side by side. However, the present invention is not limited to this configuration. The scope of the present invention includes a heat exchanger tube inserting apparatus capable of performing not only parallel insertion, but also so-called oblique insertion of hairpin tubes T in which the straight tube portions SP of a hairpin tube T are inserted into through holes P with the hairpin tube T being in an oblique state (see FIG. 29), i.e. the pair of straight tube portions SP being in the state of extending at different vertical positions.

Figure 23:
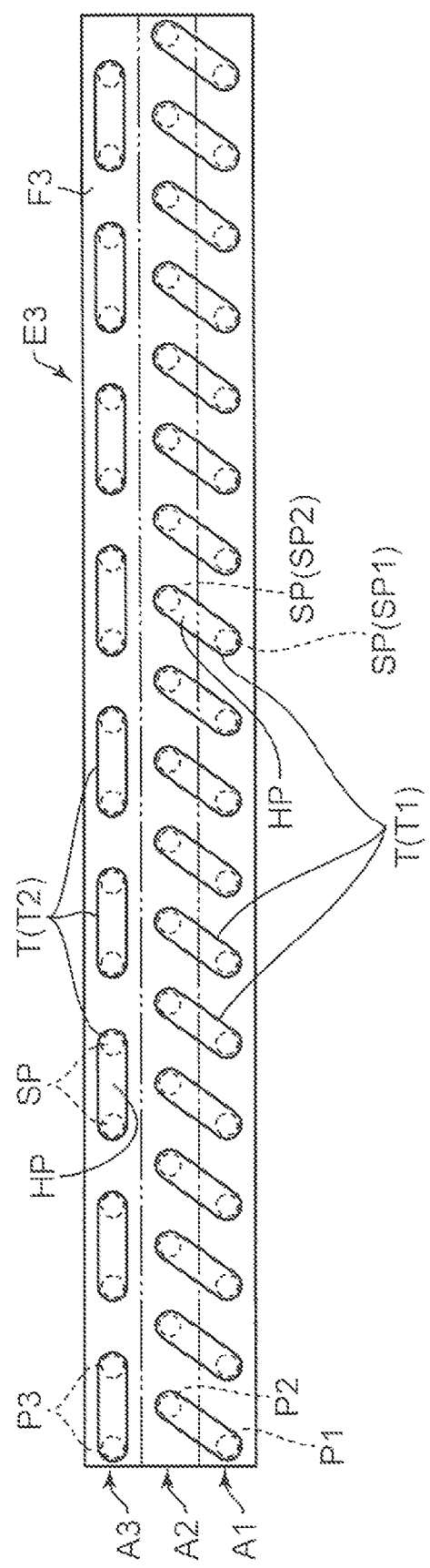
FIG. 23 is a front view of a multi-tiered heat exchanger including hairpin tubes inserted in parallel and hairpin tubes inserted obliquely.

Here, FIG. 23 shows a heat exchanger E3 as an example of a multi-tiered heat exchanger including a tier having a row of hairpin tubes T inserted in parallel and a tier having a row of hairpin tubes T inserted obliquely. The heat exchanger E shown in FIG. 23 includes a number of fins F3, and a plurality of hairpin tubes T passing through the number of fins F3. The numbers of fins F3 are arranged side by side in the direction perpendicularly intersecting the drawing sheet surface of FIG. 23. The hairpin tubes T include a plurality of hairpin tubes T1 which are inserted obliquely and passing through the number of fins F3, and a plurality of hairpin tubes T2 which are inserted in parallel and passing through the number of fins F3.

In a first zone A1 of each of the fins F, through holes P1 are formed at regular intervals in a longitudinal direction of the fins F3. In a second zone A2, through holes P2 are formed at regular intervals at positions respectively spaced apart from the through holes P1 in the longitudinal direction of the fins F3. Thus, a through hole P2 is located in the middle between adjacent through holes P1 in the longitudinal direction of the fins F3. Further, in a third zone A3, through holes P3 are formed at positions respectively immediately above the through holes P1.

The through hole P2 is disposed, for example, at a position shifted from the through hole P1 by 45 degrees upward. In this case, the pitch between a through hole P1 and a through hole P2 is set to half the pitch between adjacent through holes P3 in a horizontal direction.

Each of the hairpin tubes (T1, T2) includes, similarly to the hairpin tube T shown in FIG. 2, a pair of straight tube portions SP extending in parallel to each other, and a hairpin portion HP connecting respective one ends of the straight tube portions SP. Regarding the obliquely inserted hairpin tubes T1, the pair of straight tube portions SP includes a straight tube portion SP disposed at a lower vertical position, and a straight tube portion SP2 disposed at a higher vertical position than the straight tube portion SP1.

In the pair of straight tube portions SP of a hairpin tube T1 for oblique insertion, one straight tube portion SP1 is inserted into a through hole P1 formed in the first zone A1 and the other straight tube portion SP2 is inserted into a through hole P2 formed in the second zone A2 of each of the fins F3. Consequently, the hairpin tube T1 is disposed with the hairpin portion HP being oblique to the longitudinal direction of the fins F3, i.e. the hairpin tube T1 is obliquely inserted in through holes P1 and P2 of each of the fins F3.

On the other hand, a hairpin tube T2 for parallel insertion is inserted into through holes P3 formed in the third zone A3 of each of the fins F3 with the pair of straight tube portions SP extending horizontally side by side. Consequently, the hairpin tube T2 is disposed with the hairpin portion HP extending in the longitudinal direction of the fins F3, i.e. the hairpin tube T2 is inserted in through holes F3 of each of the fins F3 in parallel.

In order to perform insertion operation of hairpin tubes T1 and T2 for the multi-tiered heat exchanger E3 including the tier having a row of hairpin tubes T (T1) which are inserted obliquely and the tier having a row of hairpin tubes T (T2) which are inserted in parallel, a heat exchanger tube inserting apparatus capable of performing both parallel insertion and oblique insertion of hairpin tubes T1 and T2 is shown in the following third embodiment.

Figure 24:
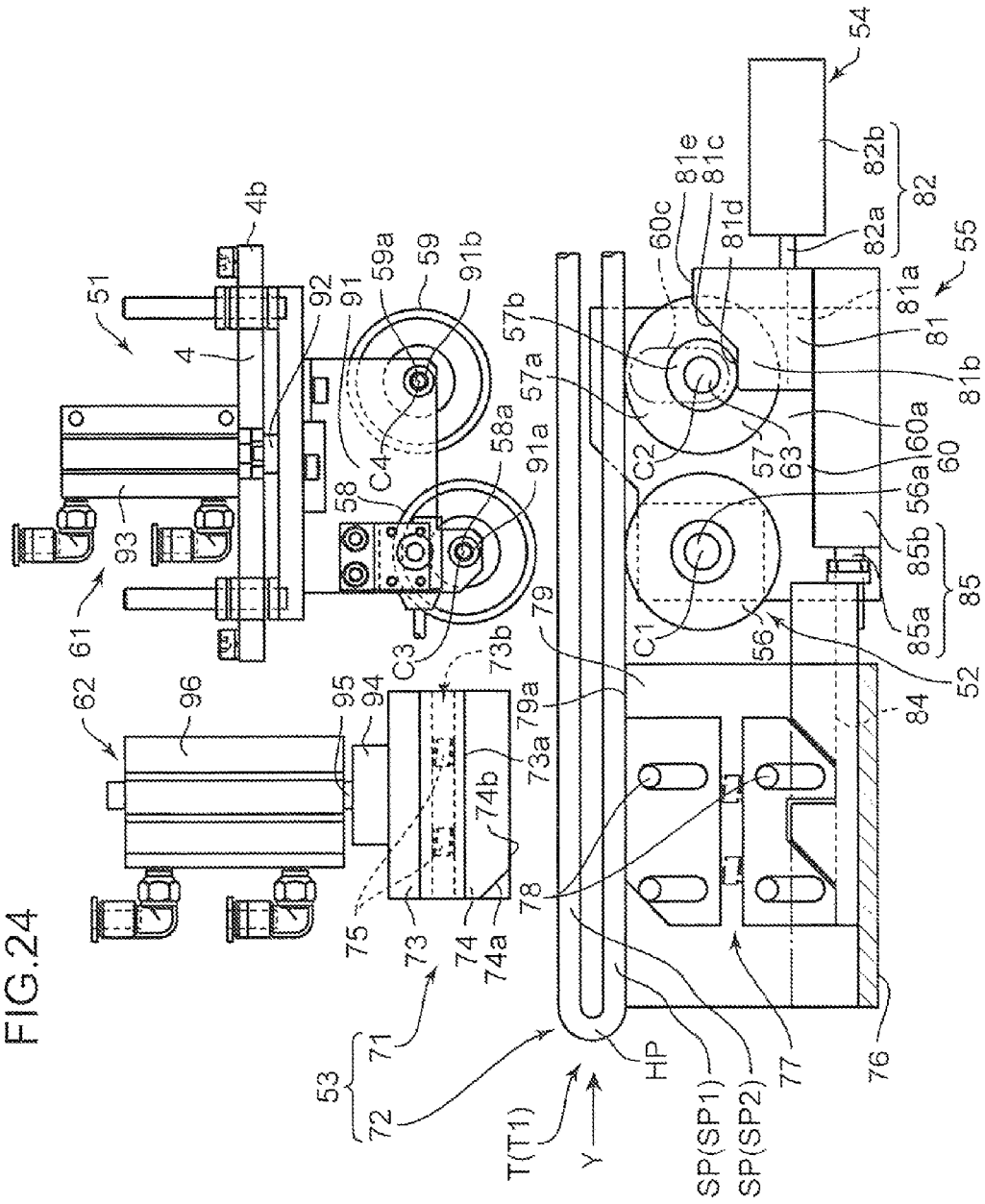
FIG. 24 is a side view of a heat exchanger tube inserting apparatus according to a third embodiment of the present invention, which is in a state before holding a hairpin tube to be obliquely inserted.

A heat exchanger tube inserting apparatus 51 shown in FIG. 24 includes a roller conveyor section 52 for moving hairpin tubes T to a predetermined first position (see the first position I shown in FIG. 2), a guide section 53, a roller mover 54, a second positioner mover 55, a plurality of driven roller vertical movers 61, and an upper unit vertical mover 62.

The heat exchanger tube inserting apparatus 51 further includes a pushing cylinder (not shown) for pushing and inserting hairpin tubes T which has been pushed to the predetermined first position I by the roller conveyor section 2 to a predetermined second position (see the second position II shown in FIG. 20) located further inside than the first position I. The pushing cylinder is, similarly to the pushing cylinder 3 shown in FIG. 2, disposed at a side of the roller conveyor section 52 in a horizontal direction perpendicularly intersecting a conveyance direction Y of hairpin tubes T (in the direction perpendicularly intersecting the drawing sheet surface of FIG. 24). The heat exchanger tube inserting apparatus 51 further includes, similarly to the heat exchanger tube inserting apparatus 1 shown in FIG. 1, a main body frame 4 supporting the roller conveyor section 52 and the pushing cylinder, and a vertical mover (not shown) for vertically moving the entirety of the main body frame 4.

Figure 25:
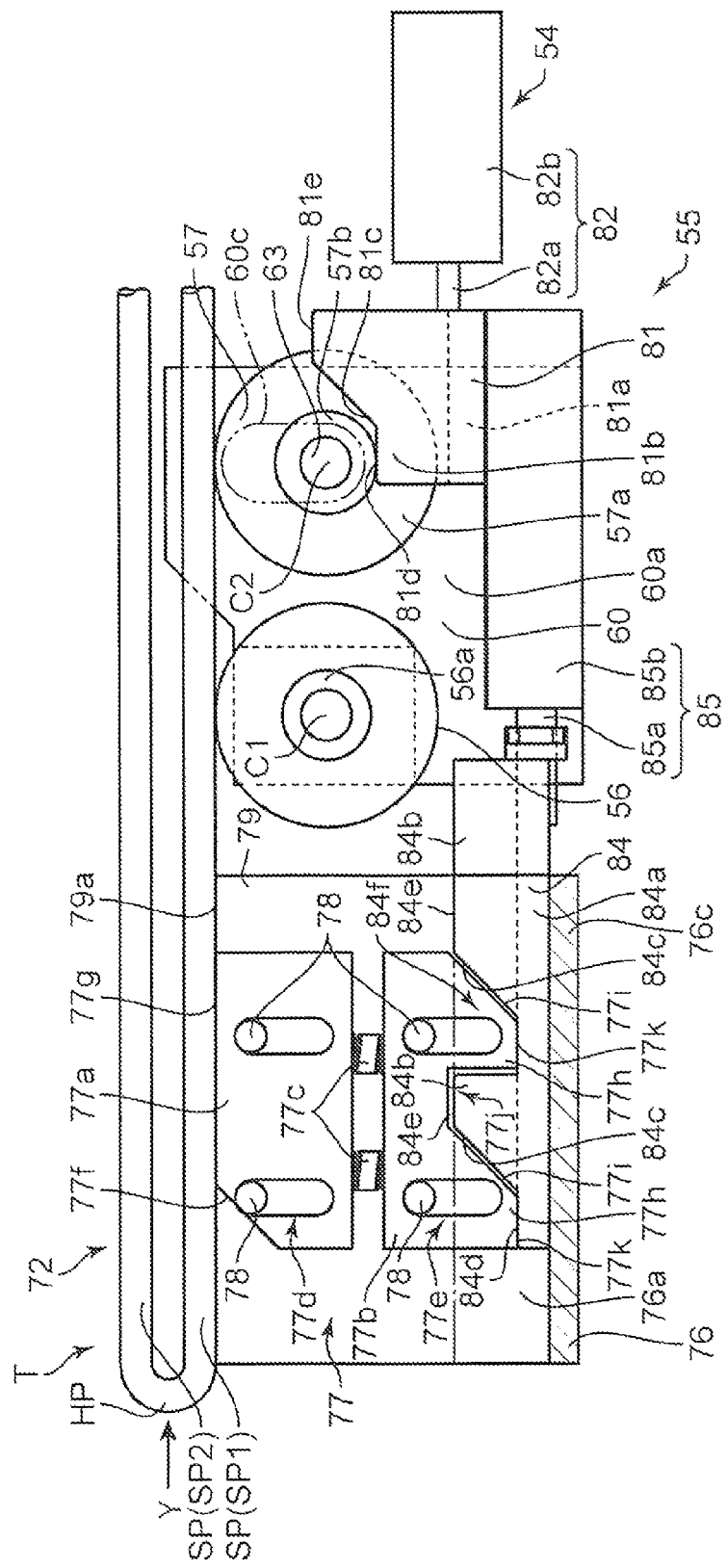
FIG. 25 is an enlarged side view of a portion of the heat exchanger tube inserting apparatus shown in FIG. 24 that is located under a hairpin tube movement region.
Figure 28:
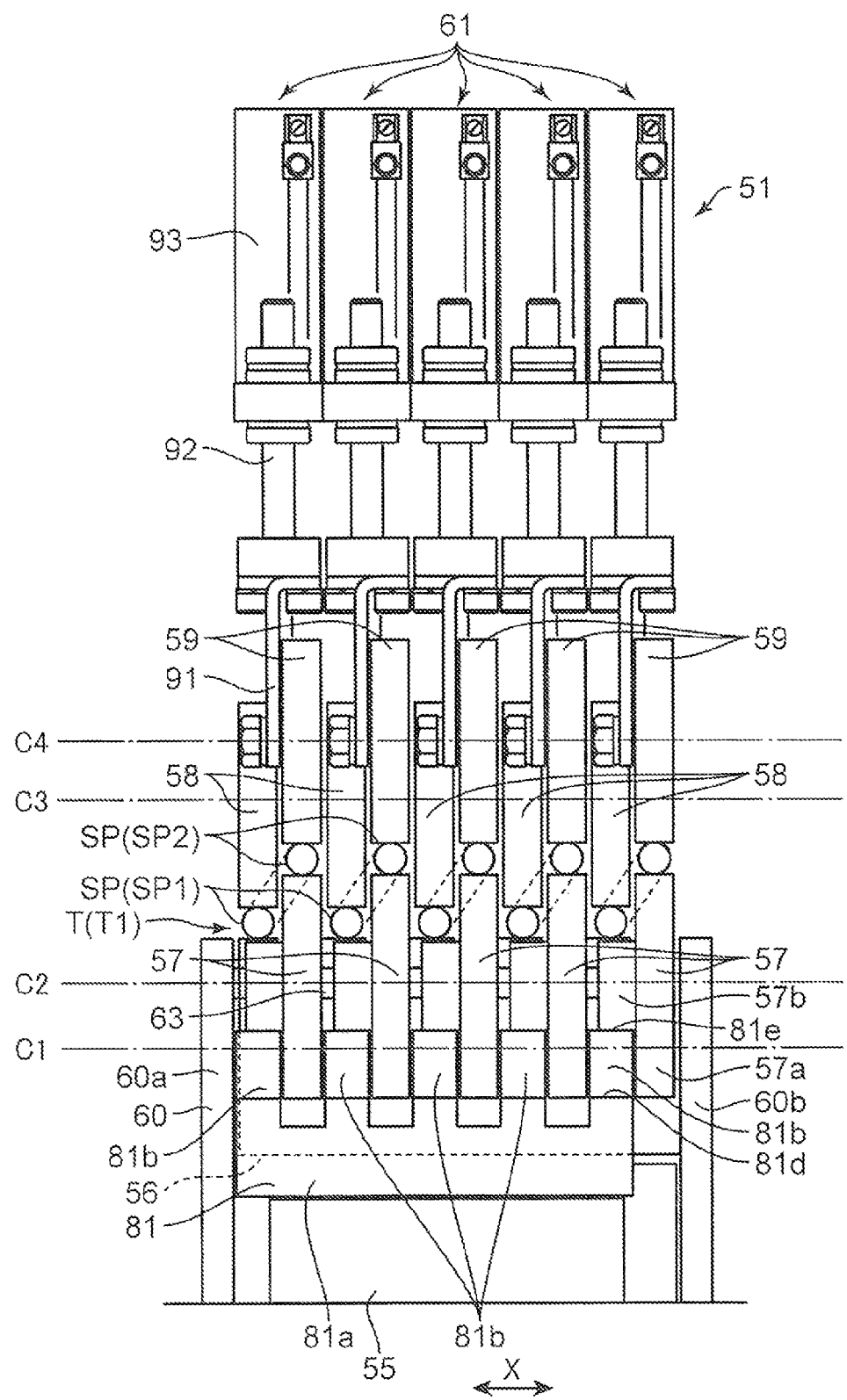
FIG. 28 is a view of the roller conveyor section shown in FIG. 27 as seen from the downstream side thereof in the hairpin tube conveyance direction.

The roller conveyor section 52 includes, as shown in FIGS. 24, 25 and 28, a rear driving roller 56, a plurality of front driving rollers 57, a plurality of rear driven rollers 58, a plurality of front driven rollers 59, and a stand 60 rotatably supporting the rear driving roller 56 and the front driving rollers 57.

The stand 60 includes a pair of vertical plates 60a and 60b. The pair of vertical plates 60a and 60b stand vertically and extend in the conveyance direction Y of hairpin tubes T1. The pair of vertical plates 60a and 60b are horizontally spaced apart from each other in the direction perpendicularly intersecting the conveyance direction Y. The pair of vertical plates 60a and 60b are secured to an unillustrated bottom plate, floor surface or the like.

Each of the vertical plates 60a and 60b is formed with a long hole 60c. The long holes 60c extend vertically.

The rear driving roller 56 is configured by a single cylindrical roller as shown in FIG. 28. The rear driving roller 56 includes a shaft portion 56a extending along its axis C1. The rear driving roller 56 is within the concept of a first roller of the present invention. The rear driving roller 56 may alternatively be configured to include a plurality of disc-shaped rollers and a shaft connecting the rollers. The rear driving roller 56 is rotated by a torque of an unillustrated motor.

The opposite ends of the shaft portion 56a of the rear driving roller 56 are rotatably supported on the pair of vertical plates 60a and 60b of the stand 60 at the upstream side of the long holes 60c in the conveyance direction Y (at the left side in FIG. 24). In this state, the rear driving roller 56 is placed in the stand 60. This allows the rear driving roller 56 to extend horizontally in the direction of X (see FIG. 28) perpendicularly intersecting the conveyance direction Y and along the axis C1.

The rear driving roller 56 is disposed at a position where it comes into contact with both of the pair of straight tube portions SP of a hairpin tube T being conveyed in the horizontal state of extending horizontally side by side, and with the straight tube portion SP1 that is at a lower position in the pair of straight tube portions SP of a hairpin tube T being conveyed in the oblique state of extending side by side at different vertical positions.

Each of the plurality of front driving rollers 57 includes a main body portion 57a configured in the form of a disc, and a contact portion 57b configured in the form of a cylinder and disposed axially adjacent to and coaxially with the main body portion 57a. The plurality of front driving rollers 57 are secured to a common shaft 63. The front driving roller 57 is within the concept of a second roller of the present invention.

The opposite ends of the common shaft 63 allowing the plurality of front driving rollers 57 to be secured thereto are inserted in the long holes 60c formed in the pair of vertical plates 60a and 60b of the stand 60. The common shaft 63 is rotatably supported in the long holes 60c of the vertical plates 60a and 60b. Furthermore, the common shaft 63 is movable in a longitudinal direction of the long holes 60c, i.e. vertically, in the long holes 60c.

The plurality of front driving rollers 57 are disposed at positions spaced apart from the rear driving roller 56 in the conveyance direction Y of hairpin tubes T, i.e. at the downstream side (in front of) the rear driving roller 56 in the conveyance direction Y. Furthermore, the plurality of front driving rollers 57 are disposed at regular intervals along an axis C2 extending in parallel with the axis C1 of the rear driving roller 56.

The gap between adjacent main body portions 57a of the front driving rollers 57 is set to correspond to the gap between one straight tube portion SP2 and another adjacent straight tube portion SP2, each of the straight tube portions SP2 being at a higher position in the pair of straight tube positions SP of a hairpin tube T being conveyed in the oblique state.

The plurality of front driving rollers 57 are rotated by a torque transmitted from the shaft portion 56a of the rear driving roller 56 via an unillustrated transmission mechanism. The transmission mechanism includes, for example, a combination of a timing belt and a pulley or a combination of a plurality of gears.

The rear driven rollers 58 are disposed immediately above and opposite to the rear driving roller 56. Furthermore, the plurality of rear driven rollers 58 are disposed at regular intervals along an axis C3 extending in parallel with the axis C1 of the rear driving roller 56. The gap between adjacent rear driven rollers 58 is set to correspond to the gap between the pair of straight tube portions SP of a hairpin tube T being conveyed in the horizontal state of extending horizontally side by side. Each of the rear driven rollers 58 includes a shaft portion 58a extending along its axis.

The plurality of front driven rollers 59 are disposed respectively immediately above and opposite to the main body portions 57a of the front driving rollers 57. Each of the front driven rollers 59 includes a shaft portion 59a extending along its axis C4.

Figure 32:
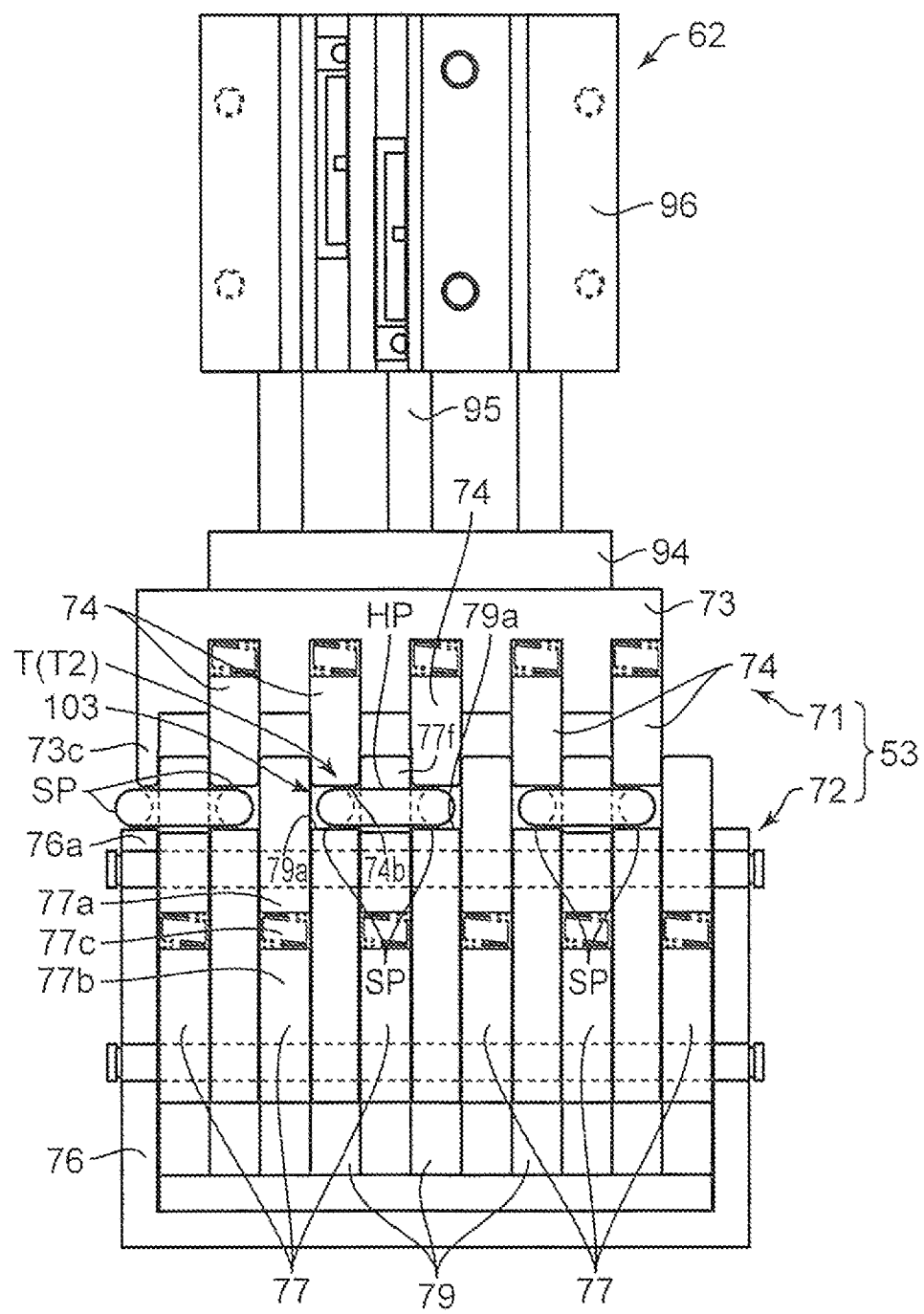
FIG. 32 is a view of the guide section shown in FIG. 30 as seen from the upstream side thereof in the hairpin tube conveyance direction.

The guide section 53 guides a hairpin tube T to the roller conveyor section 52 in the conveyance direction Y, regardless of whether the hairpin tube T is in the oblique state (see FIG. 29) or in the horizontal state (see FIG. 32). The guide section 53 includes an upper unit 71 and a lower unit 72.

Figure 26:
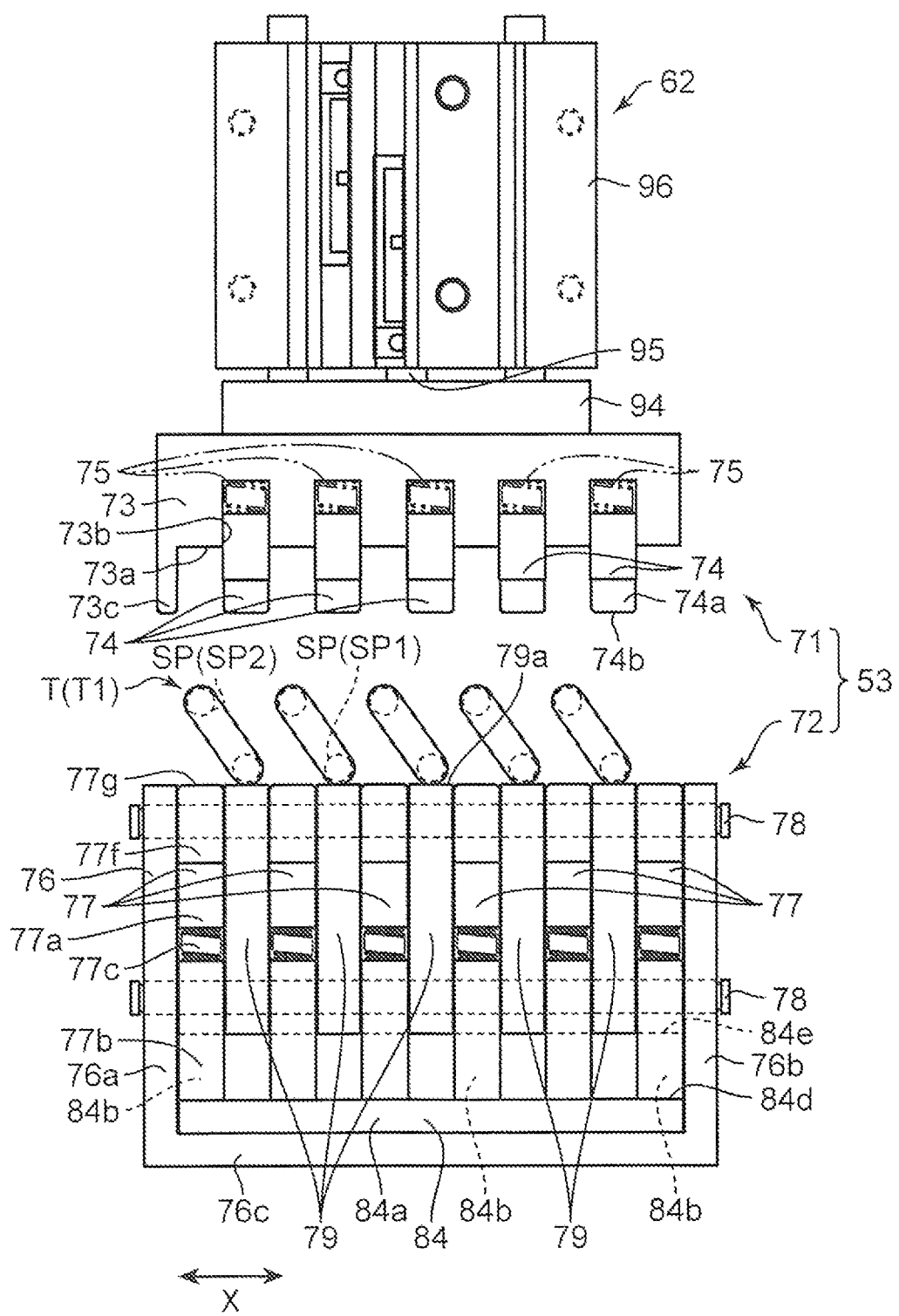
FIG. 26 is a view of a guide section shown in FIG. 24 as seen from the upstream side thereof in a hairpin tube conveyance direction.

The upper unit 71 includes, as shown in FIGS. 24 and 26, a main body portion 73, and a plurality of first positioners 74 provided to the main body portion 73 in a vertically movable manner. Each of the first positioners 74 comes into contact with the pair of straight tube portions SP of a hairpin tube T2 being in the horizontal state from above to thereby position the straight tube portions SP, and comes into contact with the straight tube portion SP1 of the pair of straight tube portions SP1 and SP2 that is at a lower position of a hairpin tube T1 being in the oblique state from above to thereby position the straight tube portion SP1.

The main body portion 73 includes a bottom surface 73a extending horizontally, and is supported by the upper unit vertical mover 62. Further, the main body portion 73 includes a plurality of grooves 73b extending vertically from the bottom surface 73a. The plurality of grooves 73b extend in the conveyance direction Y of hairpin tubes T. Further, the plurality of grooves 73b are disposed at regular intervals in the direction X (see FIG. 26) perpendicularly intersecting the conveyance direction Y.

Each of the plurality of first positioners 74 is in the form of a plate. An upper end of each of the first positioners 74 is inserted in a corresponding one of the grooves 73b of the main body portion 73 and is supported in the groove 73b by springs 75.

Figure 29:
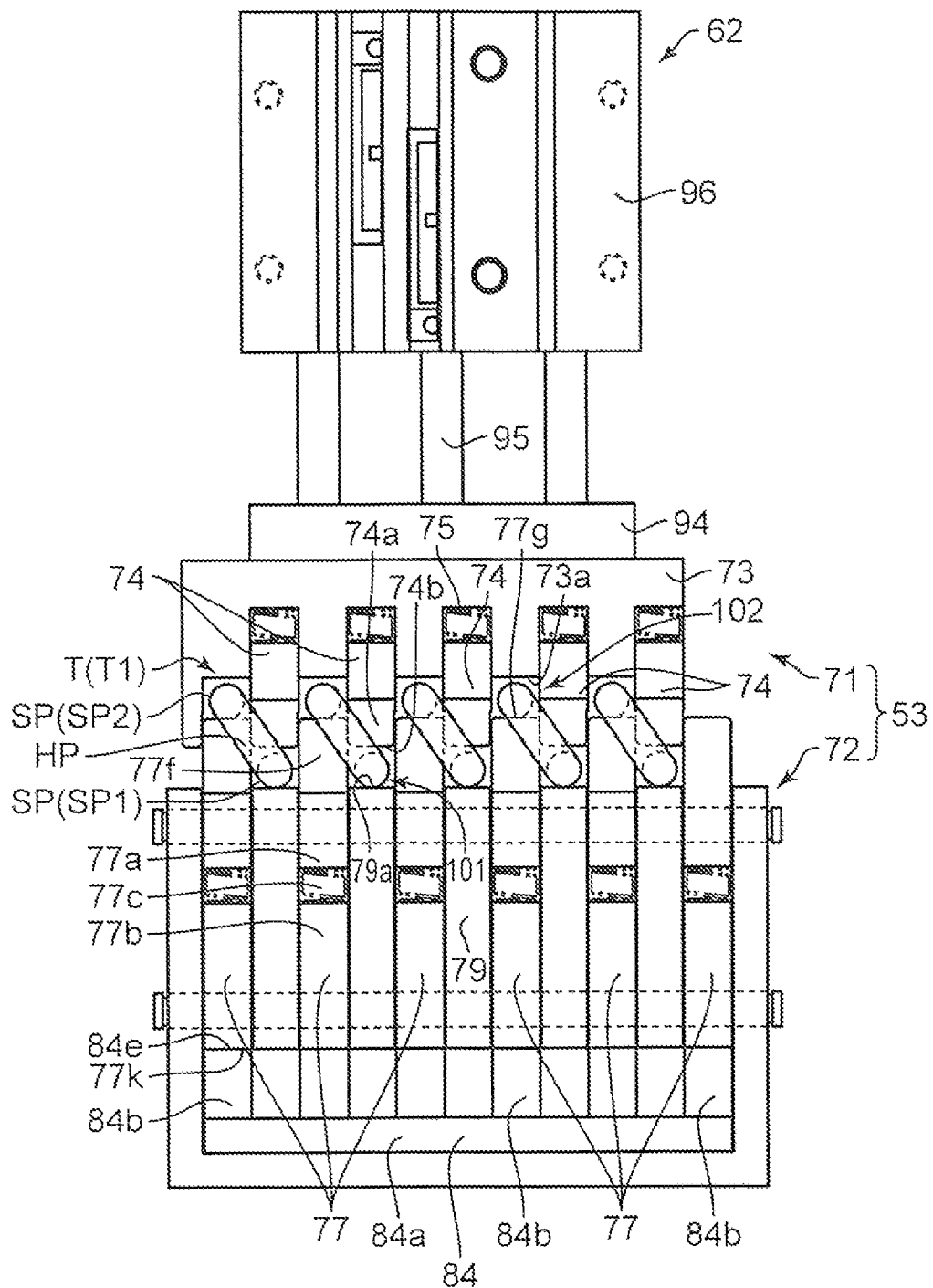
FIG. 29 is a view of the guide section shown in FIG. 27 as seen from the upstream side thereof in the conveyance direction of the hairpin tube.

Further, each of the first positioners 74 includes a bottom surface 74b extending horizontally. As shown in FIGS. 29 and 32, when the upper unit 71 is at a lower position, the bottom surface 74b can come into contact with the straight tube portion SP1 that is at a lower position in a hairpin tube T1 being in the oblique state, or the straight tube portions SP of a hairpin tube T2 being in the horizontal state, from above. Further, an oblique portion 74a is formed in a lower portion of the first positioner 74 at an upstream end thereof in the conveyance direction Y of hairpin tubes T. The oblique portion 74a slopes in the direction away from a movement region of hairpin tubes T, for example, in the direction of rising, as proceeding upstream in the conveyance direction Y.

The lower unit 72 includes, as shown in FIGS. 24 to 26, a case 76, a plurality of second positioners 77, a plurality of pins 78, a plurality of partition plates 79. The second positioner 77 comes into contact with the straight portion SP2 that is at a higher position in a pair of straight tube portions SP1 and SP2 being in the oblique state, from below, to thereby adjust the straight portion SP2 to a predetermined vertical position.

The case 76 includes a pair of vertical plates 76a and 76b, and a bottom plate 76c connecting the pair of vertical plates 76a and 76b. The pair of vertical plates 76a and 76b stand vertically and extend in the conveyance direction Y of hairpin tubes T1. The pair of vertical plates 76a and 76b are horizontally spaced apart from each other in the direction X (see FIG. 26) perpendicularly intersecting the conveyance direction Y.

Each of the second positioners 77 includes an upper member 77a and a lower member 77b configured in the form of a plate, and springs 77c disposed between the upper member 77a and the lower member 77c. The upper member 77a is supported by the springs 77c from below.

The upper member 77a and the lower member 77b are formed with long holes 77d and long holes 77e, respectively, the long holes 77d and 77e extending vertically.

Further, the upper member 77a includes a top surface 77g extending horizontally. As shown in FIG. 29, when the second positioner 77 is at an upper position, the top surface 77g can come into contact with a straight tube portion SP2 that is at a higher position as described above, from below. Further, an oblique portion 77f is formed at an upstream end of the upper member 77a in the conveyance direction Y of hairpin tubes T. The oblique portion 77f slopes in the direction away from the movement region of hairpin tubes T, for example, in the direction of descending, as proceeding upstream in the conveyance direction Y.

Further, the lower member 77b includes two projection portions 77h projecting downward. Each of the projection portions 77h has an oblique surface 77i on a downstream side thereof in the conveyance direction Y (on the right side thereof in FIG. 25). The oblique surfaces 77i slope in the direction of rising as proceeding downstream in the conveyance direction Y. Further, each of the projection portions 77*h* has a bottom surface 77*k* extending horizontally.

The plurality of second positioners 77 are placed in the case 76 with each of the partition plates 79 being disposed between adjacent second positioners 77.

The second positioners 77 and the partition plates 79 are connected by the pair of vertical plates 76*a* and 76*b* of the case 76 and the four pins 78.

The pins 78 are respectively inserted in the long holes 77*d* and 77*e* of each of the second positioners 77. This permits each of the second positioners 77 to move vertically.

A top surface 79*a* of the partition plate 79 is disposed at a position where it comes into contact with one of the pair of straight portions SP of a hairpin tube T being conveyed in the horizontal state of extending horizontally side by side, and with the straight tube portion SP1 that is at a lower position in the pair of straight tube portions SP of a hairpin tube T being conveyed in the oblique state of extending side by side at different vertical positions.

The roller mover 54 serves as a mechanism for vertically moving the front driving rollers 57. The roller mover 54 includes, as shown in FIGS. 24 and 25, a roller guide member 81, and a first guide driver 82 for moving the roller guide member 81 in the conveyance direction Y.

The roller guide member 81 includes, as shown in FIGS. 25 and 28, a bottom plate 81*a*, and a plurality of vertical plates 81*b* disposed on a top surface of the bottom plate 81*a*.

Each of the vertical plates 81*b* is disposed at a position where it comes into contact with a corresponding one of the cylindrical contact portions 57*b* of the front driving rollers 57 from below.

Each of the vertical plates 81*b* has a top surface including a guide surface 81*c* extending obliquely, a lower position determining surface 81*d* for determining a lower position of the corresponding front driving roller 57, and the upper position determining surface 81*e* for determining an upper position of the corresponding front driving roller 57. The guide surface 81*c* slopes in the direction of changing the distance to the movement region of hairpin tubes T1 as proceeding upstream in the conveyance direction Y of hairpin tubes T1, for example, in the direction of rising as proceeding downstream in the conveyance direction Y. The lower position determining surface 81*d* horizontally extends upstream in the conveyance direction Y from a lower end of the guide surface 81*c*. The upper position determining surface 81*e* horizontally extends downstream in the conveyance direction Y from an upper end of the guide surface 81*c*.

The first guide driver 82 moves the roller guide member 81 so as to raise the front driving rollers 57 by the guide surfaces 81*c* of the roller guide member 81. Specifically, the first guide driver 82 includes a rod 82*a* extending in the conveyance direction Y, and a cylinder 82*b* for moving the rod 82*a* forward and backward in the conveyance direction Y. The leading end of the rod 82*a* is connected with the roller guide member 81. The rod 82*a* is moved horizontally by the pressure of working fluid such as compressed air supplied into the cylinder 82*b*. Thus, the roller guide member 81 is moved forward and backward in the conveyance direction Y by the first guide driver 82.

Figure 27:
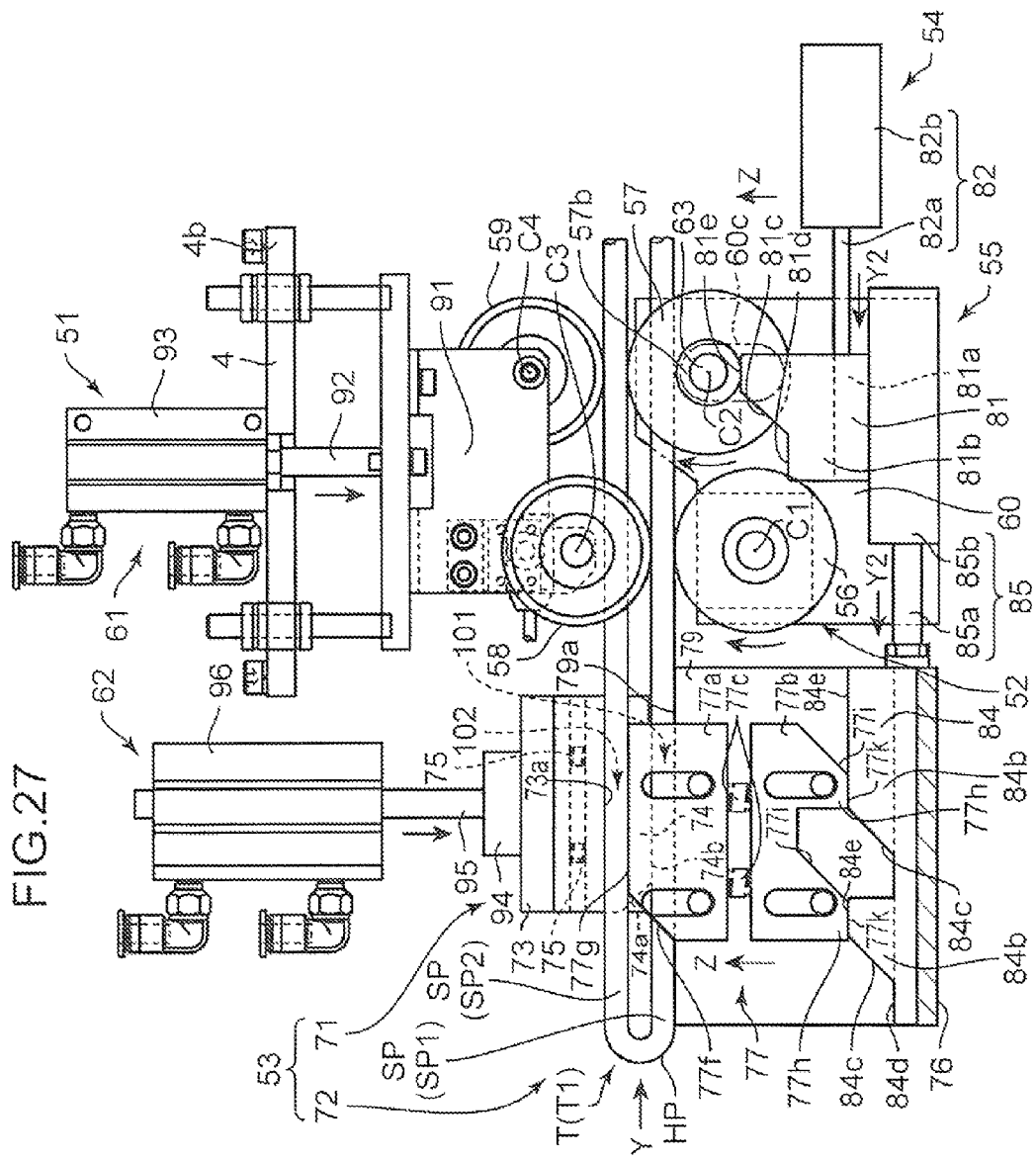
FIG. 27 is a side view showing a state in which the guide section and a roller conveyance section shown in FIG. 24 support a hairpin tube being inclined for oblique insertion.

As shown in FIGS. 24 and 25, the above-described roller mover 54 can move the front driving rollers 57 from the predetermined lower position (see FIG. 24) at which the respective cylindrical contact portions 57*b* come into contact with the corresponding lower position determining surfaces 81*d* of the roller guide member 81, to the predetermined upper position (see FIG. 27). Specifically, when the roller guide member 81 is moved upstream in the conveyance direction Y by the first guide driver 82, the contact portions 57*b* of the front driving rollers 57 are pushed upward by the guide surfaces 81*c* of the roller guide member 81 in an upward direction Z. In this manner, the front driving rollers 57 can be raised. The raised front driving rollers 57 are set at the predetermined upper position shown in FIG. 27 by the respective contact portions 57*b* coming into contact with the upper position determining surfaces 81*e* of the roller guide member 81. On the contrary, when the roller guide member 81 is moved downstream in the conveyance direction Y, the front driving rollers 57 descend to return to the above-mentioned predetermined lower position (see FIG. 24).

As shown in FIGS. 25 and 26, the second positioner mover 55 serves as a mechanism for moving the second positioners 77 between the upper position at which they positions straight tube portions SP and the lower position to which they recede downward from the movement region of hairpin tubes T.

The second positioner mover 55 specifically includes a guide member 84, and a second guide driver 85 for moving the guide member 84 in the conveyance direction Y.

The guide member 84 includes a bottom plate 84*a*, and a plurality of vertical plates 84*b* provided on a top surface of the bottom plate 84*a*.

The bottom plate 84*a* has a top surface including a lower position determining surface 84*d* for determining a lower position of the second positioners 77.

The plurality of vertical plates 84*b* are disposed at positions to come into contact with the lower members 77*b* of the second positioners 77 from below. In other words, the plurality of vertical plates 84*b* are disposed horizontally at regular intervals in the direction X (see FIG. 26) perpendicularly intersecting the conveyance direction Y and respectively lie under the second positioners 77.

Further, two vertical plates 84*b* are aligned in the conveyance direction Y as shown in FIG. 25. As shown in FIG. 25, when the second positioner 77 is at the lower position, the two projection portions 77*h* projecting downward in the second positioner 77 are engaged with the two vertical plates 84*b*.

Each of the plate portions of the vertical plate 84*b* has a guide surface 84*c* on an upstream side thereof in the conveyance direction Y. The guide surface 84*c* slopes in the direction of descending as proceeding upstream in the conveyance direction Y. The oblique angle of the guide surface 84*c* is set so as to agree with the oblique angle of the oblique surface 77*i* of the projection portion 77*h* of the second positioner 77.

Further, each of the plate portions of the vertical plate 84*b* has a top surface including an upper position determining surface 84*e* for determining an upper position of the corresponding second positioner 77. The upper position determining surface 84*e* extends horizontally downstream in the conveyance direction Y from an upper end of the guide surface 84*c*. A lower end of the guide surface 84*c* joins the lower position determining surface 84*d* of the bottom plate 84*a*.

The second guide driver 85 includes a rod 85*a* extending in the conveyance direction Y, and a cylinder 85*b* for moving the rod 85*a* forward and backward in the conveyance direction Y. The guide member 84 is secured to the leading end of the rod 85*a*. The rod 85*a* is moved horizontally by the pressure of working fluid such as compressed air supplied into the cylinder 85*b*. Thus, the roller guide member 84 is moved forward and backward in the conveyance direction Y by the second guide driver 85.

As shown in FIGS. 24 and 25, the above-described second positioner mover 55 can move the second positioners 77 from the predetermined lower position at which the respective projection portions 77h come into contact with the lower position determining surface 84d of the guide member 84, to the predetermined upper position. Specifically, when the guide member 84 is moved upstream in the conveyance direction Y by the second guide driver 85, the oblique surfaces 77i of each of the second positioners 77 come into contact with the guide surfaces 84c of the corresponding one of the vertical plates 84b of the guide member 84. In this manner, the second positioners 77 are pushed upward by the vertical plates 84b of the guide member 84. The second positioners 77 can be thus raised. When the second positioners 77 are raised, the bottom surfaces 77k of the projection portions 77h of each of the second positioners 77 come into contact with the upper position determining surfaces 84e of the corresponding one of the vertical plates 84b of the guide member 84. This allows the second positioners 77 to be set at the predetermined upper position shown in FIG. 27. On the contrary, when the roller guide member 84 is moved downstream in the conveyance direction Y, the second positioners 77 descend to return to the above-mentioned predetermined lower position (see FIGS. 24 and 25).

Each of the plurality of driven roller vertical movers 61 includes, as shown in FIGS. 24 and 28, a roller support portion 91, a rod 92 connected to the roller support portion 91, and a cylinder 93 for moving the rod 92 vertically.

The roller support portion 91 includes a rear bearing 91a and a front bearing 91b. The rear bearing 91a rotatably supports the shaft portion 58a of a corresponding one of the rear driven rollers 58 at a position immediately above the shaft portion 56a of the rear driving roller 56. The front bearing 91b is located at the downstream side of the rear bearing 91a in the conveyance direction Y. The front bearing 91b rotatably supports the shaft portion 59a of a corresponding one of the front driven rollers 59 at a position immediately above the common shaft 63 supporting the front driving rollers 57.

The front bearing 91b is located at a higher position than the rear bearing 91a. The vertical difference between the front bearing 91b and the rear bearing 91a is set to be equal to the vertical difference which occurs between the common shaft 63 supporting the front driving rollers 57 and the shaft portion 56a of the rear driving roller 56 when the front driving rollers 57 are at the upper position (see FIG. 27).

The rod 92 extends vertically. The rod has a bottom end connected to the roller support portion 91. The rod 92 is moved vertically by the pressure of working fluid such as compressed air supplied into the cylinder 93. The cylinder 93 is secured to an upper mounting board 4b of the main body frame 4 of the heat exchanger tube inserting apparatus 51, similarly to the cylinder 13e shown in FIG. 1.

The upper unit vertical mover 62 includes a support portion 94 supporting the main body portion 73 of the upper unit 71 of the guide section 53, a rod 95 connected to the support portion 94, and a cylinder 96 for moving the rod 95 vertically. The rod 95 extends vertically. The rod 95 has a lower end connected to the support portion 73. The rod 95 is moved vertically by the pressure of working fluid such as compressed air supplied into the cylinder 96. The cylinder 96 is secured to, for example, the upper mounting board 4b of the main body frame 4 of the heat exchanger tube inserting apparatus 51.

Now, a method of oblique insertion and parallel insertion of hairpin tubes T using the heat exchanger tube inserting apparatus 51 having the above-described configuration will be described.

(Description of Oblique Insertion)

First, description will be made on a method of obliquely inserting hairpin tubes T1 each into a through hole P1 formed in the first zone A1 and a through hole P2 formed in the second zone A2 of each of the fins F3 of the heat exchanger E3 shown in FIG. 23 (i.e. inserting the pair of straight tube portions SP1 and SP2 of each of hairpin tubes T1 into through holes P1 and P2 at different vertical positions).

In the initial state before oblique insertion of hairpin tubes T1, as shown in FIGS. 24 to 26, the plurality of front driving rollers 57 are at the predetermined lower position to which they recede downward from the movement region of hairpin tubes T1. Further, the second positioners 77 of the guide section 53 are also at the predetermined lower position to which they recede from the movement region of hairpin tubes T1. Further, each of the pluralities of rear driven rollers 58 and front driven rollers 59 is at a predetermined upper position to which they recede upward from the movement region of hairpin tubes T1. Further, the upper unit 71 of the guide section 53 is at a predetermined upper position to which it recedes upward from the movement region of hairpin tubes T1. Further, the entirety of the heat exchanger tube inserting apparatus 51 is at a position to which it recedes horizontally in the direction perpendicularly intersecting the conveyance direction Y of hairpin tubes T1 (for example, the position of the heat exchanger tube inserting apparatus 1 to which it recedes from the hairpin tubes T disposed at the initial position N in the direction perpendicularly intersecting the conveyance direction Y, which is shown in FIG. 2).

In this state, an operator inserts, in advance, respective leading ends of the straight tube portions SP1 and SP2 of each of a plurality of (for example, five) hairpin tubes T1 into through holes P1 and P2 formed in a front fin 3 of the number of fins 3 of the heat exchanger E3, to thereby set the hairpin tubes T1 at an initial position. Consequently, the straight tube portions SP and SP2 of each of the hairpin tubes T1 are temporarily set at the initial position by the through holes P1 and P2 located at different vertical positions.

After the hairpin tubes T1 are set at the initial position, the heat exchanger tube inserting apparatus 51 is moved to approach the hairpin tubes T1 horizontally in the direction perpendicularly intersecting the conveyance direction Y of hairpin tubes T1. Consequently, the hairpin tubes T1 are disposed between the lower rollers 56 and 57 and the upper rollers 58 and 59 of the roller conveyor section 52, as shown in FIGS. 24 to 26. At the same time, the hairpin tubes T1 are disposed between the upper unit 71 and the lower unit 72 of the guide section 53.

In the state shown in FIGS. 24 to 26, the lower straight tube portion SP1 of each of the hairpin tubes T1 is placed on the top surface 79a of a corresponding one of the partition plates 79 of the guide section 53 and, on the other hand, the higher straight tube portion SP2 of each of the hairpin tubes T1 is at a position apart upward from a corresponding one of the second positioners 77.

Thereafter, as shown in FIGS. 27 to 29, the pair of straight tube portions SP1 and SP2 of each of the hairpin tubes T1 are vertically sandwiched by corresponding four rollers 56 to 59 of the roller conveyor section 52, and also vertically sandwiched by the upper unit 71 and the lower unit 72 of the guide section 53.

At this time, the roller guide member 81 of the roller mover 54 is moved upstream in the conveyance direction Y by the first guide driver 82 to push the respective contact portions 57*b* of the front driving rollers 57 in the upward direction Z by the guide surfaces 81*c* of the roller guide member 81. This allows the plurality of front driving rollers 57 to move to the predetermined upper position. Consequently, the front driving rollers 57 support the upper straight portions SP2 from below.

Further, the guide member 84 of the guide driver 55 is moved upstream in the conveyance direction Y by the second guide driver 85 to bring the guide surfaces 84*c* of each of the vertical plates 84*b* of the guide member 84 into contact with the oblique surfaces 77*i* of the corresponding one of the second positioners 77. This allows the vertical plates 84*b* of the guide member 84 to push the second positioners 77 upward. In this manner, the second positioners 77 of the lower unit 72 of the guide section 53 are moved to the predetermined upper position. Consequently, the top surface 77*g* of the upper member 77*a* of each of the second positioners 77 comes into contact with the corresponding upper straight tube portion SP2 and supports it from below.

Further, the plurality of rear driven rollers 58 and the plurality of front driven rollers 59 are lowered by the driven roller vertical mover 61. Consequently, the rear driven rollers 58 respectively sandwich the lower straight tube portions SP1 with the single cylindrical rear driving roller 56. At the same time, the front driven rollers 59 and the front driving rollers 57 opposed thereto sandwich the upper straight tube portions SP2.

Further, the upper unit 71 of the guide section 53 is lowered by the upper unit vertical mover 62. Consequently, the bottom surface 73*a* of the main body portion 73 is disposed at a position where it is in contact with the upper straight tube portions SP2 or a position close thereto. Further, the bottom surface 74*b* of each of the first positioners 74 is disposed at a position where it is in contact with the corresponding lower straight tube portion SP1 or a position close thereto.

Consequently, as shown in FIGS. 27 and 29, in the guide section 53, a guide passage 101 extending in the conveyance direction Y is defined by the top surface 79*a* of a partition plate 79, the bottom surface 74*b* of the corresponding first positioner 74, and adjacent side surfaces of the second positioners 77 located on both sides thereof. Each lower straight tube portion SP1 is guided in the conveyance direction Y by the guide passage 101. Further, a guide passage 102 extending in the conveyance direction Y is defined by the top surface 77*g* of a second positioner 77, the bottom surface 73*a* of the main body portion 73, and adjacent side surfaces of the first positioners 74 located on both sides thereof. Each upper straight tube portion SP2 is guided in the conveyance direction Y by the guide passage 102.

Thereafter, in the above-described state, the rear driving roller 56 and the front driving rollers 57 of the roller conveyor section 52 are driven for rotation by an unillustrated motor to thereby convey the hairpin tubes T1 being in the oblique state in the conveyance direction Y to the predetermined first position, whereby the hairpin tubes T1 are inserted into the middle of the number of fins F3 of the heat exchanger E3.

At this time, in the pair of straight tube portions SP1 and SP2 of each of the hairpin tubes T1, the lower straight tube portion SP1 is conveyed in the conveyance direction Y while being guided by the above-described guide passage 101 in the guide section 53 and sandwiched by the rear driving roller 56 and the rear driven roller 58. On the other hand, the upper straight tube portion SP2 is conveyed in the conveyance direction Y while being guided by the above-described guide passage 102 in the guide section 53 and being sandwiched by the front driving roller 57 and the front driven roller 59. At this time, as shown in FIG. 29, a part of each of the first positioner 74 and the second positioner 77 gets into the space between the straight tube portions SP1 and SP2 to thereby function as an entanglement eliminator for eliminating entanglement between the straight tube portions SP1 and SP2.

When the hairpin portion HP passes the guide section 53, the first positioner 74 and the second positioner 77 recede from the movement region of hairpin tubes T1. Specifically, when the hairpin portion HP moves in the conveyance direction Y and reaches the guide section 53, the hairpin portion HP comes into contact with the oblique portion 74*a* of the first positioner 74 and pushes the first positioner 74 against the restoring force of the springs 75 to cause it to recede upward from the hairpin tube T1. At the same time, the hairpin portion HP comes into contact with the oblique portion 77*f* of the upper member 77*a* of the second positioner 77 and pushes the upper member 77*a* downward against the restoring force of the springs 77*c* to cause it to recede downward from the hairpin tube T1. After the hairpin portion HP passes the first positioner 74 and the upper member 77*a*, the first positioner 74 and the upper member 77*a* return to their initial positions occupied before the passage of the hairpin portion HP.

When movement of the hairpin tubes T1 to the predetermined first position is completed by passage of the hairpin portions HP through the guide section 53, rotation of the rear driving roller 56 and the front driving rollers 57 is stopped.

Thereafter, in the reverse sequence to that described above, the plurality of front driving rollers 57 and the second positioners 77 are caused to recede downward from the movement region of hairpin tubes T1. At the same time, the plurality of rear driven rollers 58 and the plurality of front driven rollers 59 are raised to recede upward from the movement region of hairpin tubes T1. Further, the upper unit 71 of the guide section 53 is raised to recede upward.

Thereafter, the heat exchanger tube inserting apparatus 51 is moved horizontally in the direction perpendicularly intersecting the conveyance direction Y of hairpin tubes T1 to locate the above-mentioned unillustrated pushing cylinder at the upstream side of the hairpin tubes T1 in the conveyance direction Y. Thereafter, the hairpin tubes T1 are inserted into the predetermined second position by the pushing cylinder. In this manner, the hairpin tubes T1 are inserted into the end of the number of fins F3 of the heat exchanger E3, whereby the oblique insertion of the hairpin tubes T1 is completed.

(Description of Parallel Insertion)

Now, description will be made on a method of inserting hairpin tubes T2 in parallel each into through holes P3 formed in the third zone A3 of each of the fins F3 of the heat exchanger E3 shown in FIG. 23 (i.e. inserting each of hairpin tubes T2 into through holes P3 with the pair of straight tube portions SP being in the state of extending horizontally side by side).

In the same manner as in the case of oblique insertion described above, an operator sets, in advance, each of hairpin tubes T2 at an initial position at which respective leading ends of the pair of straight tube portions SP are inserted in through holes P3 formed in a front sheet of the number of fins 3. In the case of parallel insertion, the pair of straight tube portions SP is temporarily set at the initial position by the through holes P3 which are adjacent at the same vertical position.

After the hairpin tubes T2 are set at the initial position, the heat exchanger tube inserting apparatus 51 is moved to approach the hairpin tubes T2 horizontally in the direction perpendicularly intersecting the conveyance direction Y of hairpin tubes T2.

Figure 30:
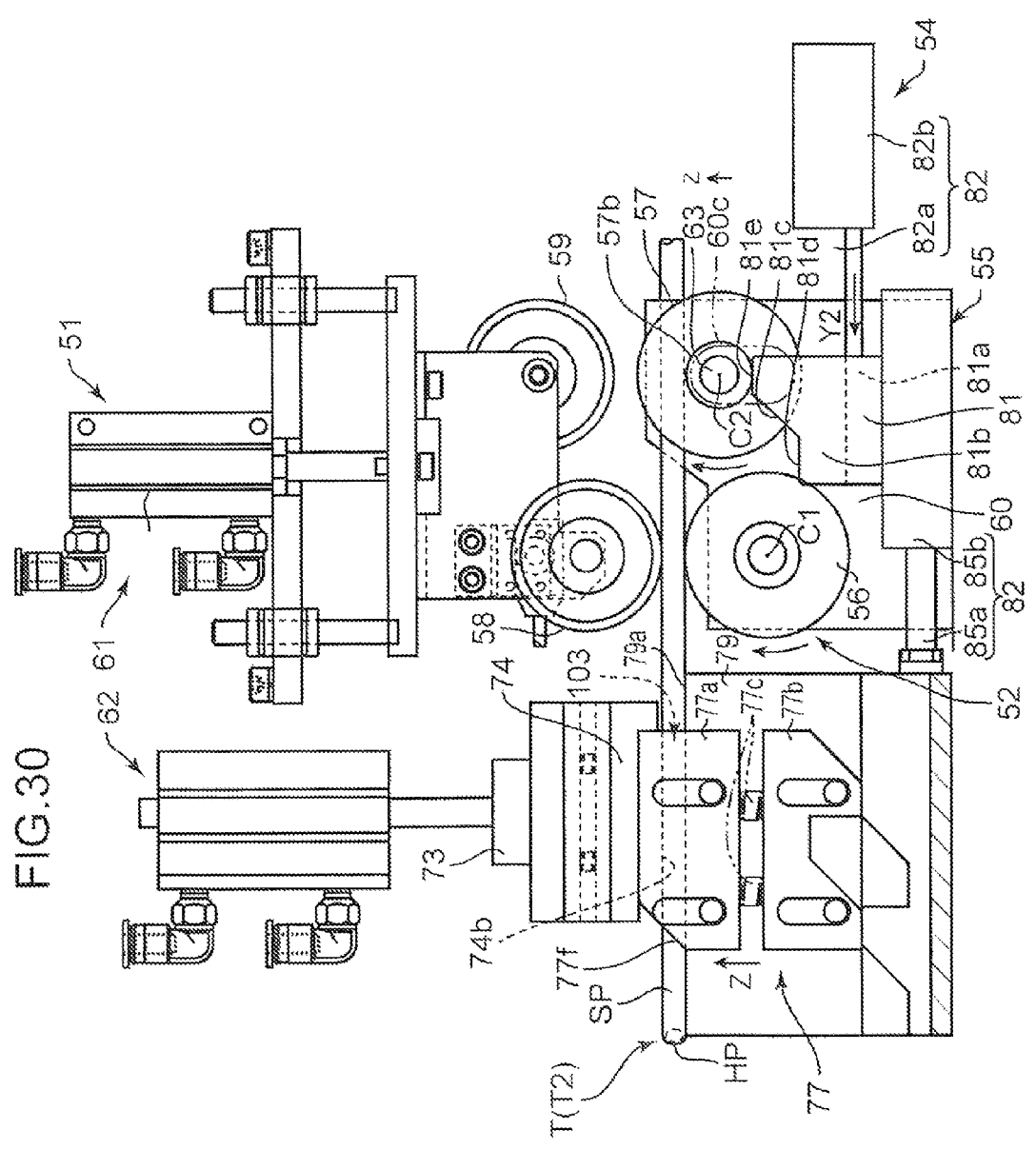
Figure 31:
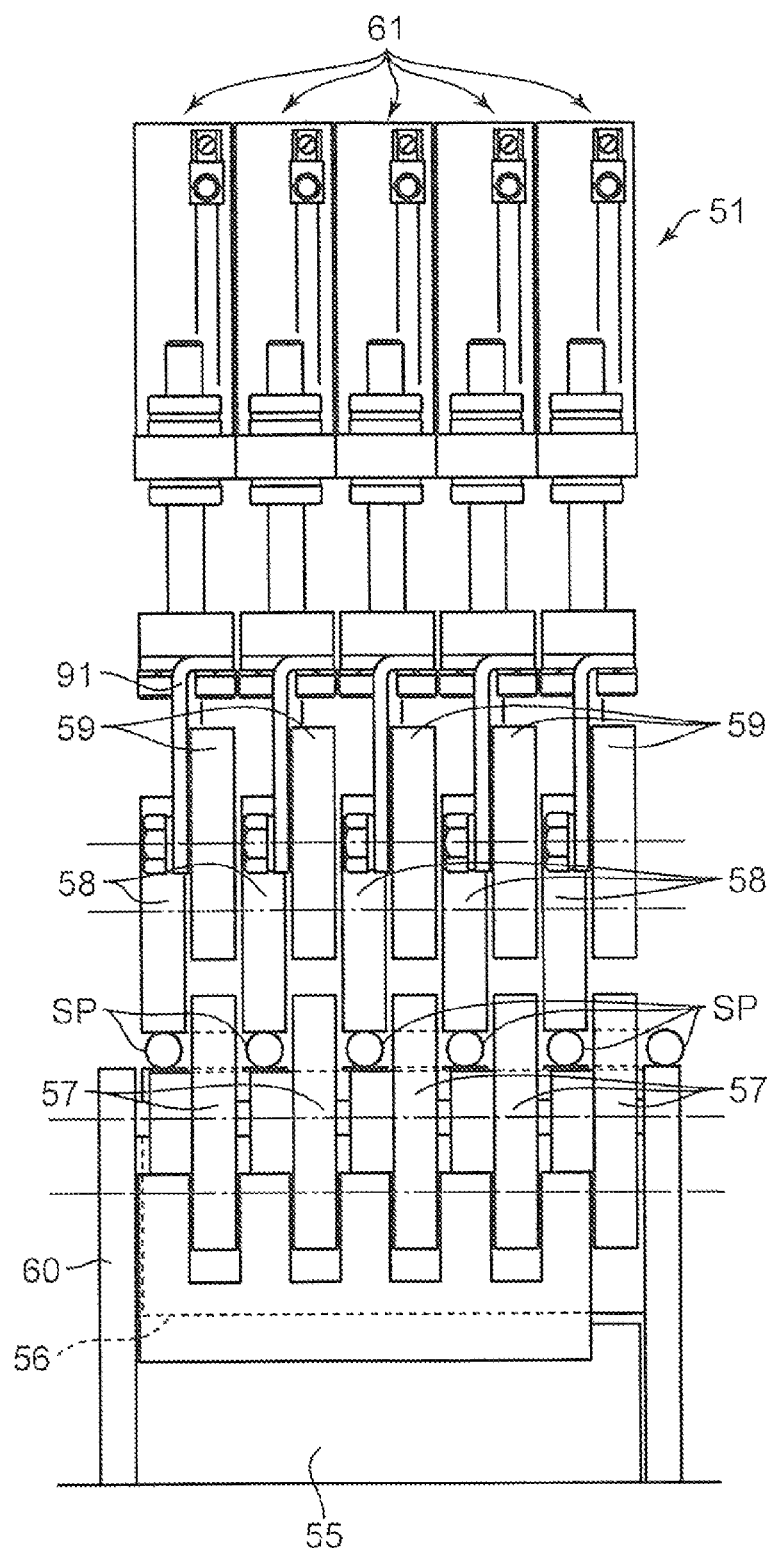
FIG. 31 is a view of the roller conveyor section shown in FIG. 30 as seen from the downstream side thereof in the hairpin tube conveyance direction.

Thereafter, in the same manner as in the case of oblique insertion, as shown in FIGS. 30 to 32, the pairs of straight tube portions SP of the hairpin tubes T2 are vertically sandwiched by rollers of the roller conveyor section 52 (in the parallel insertion, only by the rear driving roller 56 and the rear driven rollers 58). Further the pairs of straight tube portions SP are vertically sandwiched by the upper unit 71 and the lower unit 72 of the guide section 53.

Specifically, the plurality of rear driven rollers 58 are lowered with the plurality of front driven rollers 59 by the driven roller vertical mover 61. Consequently, the rear driven rollers 58 respectively sandwich the pairs of straight tube portions SP with the single cylindrical rear driving roller 56.

At this time, the front driving rollers 57 have moved to the predetermined upper position by the roller mover 54 in the same manner as in the case of oblique insertion. However, the front driving rollers 57 and the front driven rollers 59 do not contribute to supporting the straight tube portions SP. In addition, each of the raised front driving rollers 57 is located at the gap between the pair of straight tube portions SP, and therefore does not come into contact with the straight tube portions SP.

In the case of parallel insertion, the front driving rollers 57 may be made to remain at the lower position without being moved to the upper position.

Further, the upper unit 71 of the guide section 53 is lowered by the upper unit vertical mover 62. Consequently, the bottom surface 74b of each of the first positioners 74 is disposed at a position where it is in contact with a corresponding one of the straight tube portions SP or a position close thereto.

Consequently, as shown in FIGS. 30 and 32, in the guide section 53, a guide passage 103 extending in the conveyance direction Y is defined by the top surface 79a of a partition plate 79, the bottom surface 74b of the corresponding first positioner 74, and adjacent side surfaces of the second positioners 77 located on both sides thereof. Each straight tube portion SP is guided in the conveyance direction Y by the guide passage 103. It should be noted that, as shown in FIG. 32, among the pairs of straight tube portions SP, the straight tube portion SP located above the vertical plate 76a of the case 76 of the lower unit 72 of the guide section 53 is restrained from upward movement by the vertical plate 76a and a downward projection 73c of the main body portion 73 of the upper unit 71.

Thereafter, in the above-described state, the rear driving roller 56 and the front driving rollers 57 of the roller conveyor section 52 are driven for rotation by the unillustrated motor to convey the hairpin tubes T2 in the horizontal state in the conveyance direction Y to the predetermined first position, for example, a position at which the respective hairpin portions HP of the hairpin tubes T2 are between the guide section 53 and the roller conveyor section 52, whereby the hairpin tubes T2 are inserted into the middle of the number of fins F3 of the heat exchanger E3.

At this time, the pair of straight tube portions SP of each of the hairpin tubes T2 is conveyed in the conveyance direction Y while each being guided by the above-described guide passages 103 in the guide section 53 and sandwiched by the rear driving roller 56 and the rear driven roller 58. At this time, as shown in FIG. 32, a part of each of the second positioners 77 gets into the space between a corresponding one of the pairs of straight tube portions SP to thereby function as an entanglement eliminator for eliminating entanglement between the straight tube portions SP.

When the hairpin portion HP passes the guide section 53, the second positioner 77 recedes from the movement region of hairpin tubes T2. Specifically, when the hairpin portion HP moves in the conveyance direction Y and reaches the guide section 53, the hairpin portion HP comes into contact with the oblique portion 77f of the upper member 77a of the second positioner 77 and pushes the upper member 77a downward against the restoring force of the springs 77c to cause it to recede downward from the hairpin tube T2. After the hairpin portion HP passes the upper member 77a, the upper member 77a returns to its initial position occupied before the passage of the hairpin portion HP.

When movement of the hairpin tubes T2 to the predetermined first position is completed by passage of the hairpin portions HP through the guide section 53, rotation of the rear driving roller 56 and the front driving rollers 57 is stopped.

Thereafter, in the same manner as in the case of oblique insertion, the hairpin tubes T2 are inserted into the predetermined second position by the pushing cylinder. In this manner, the hairpin tubes T2 are inserted into the end of the number of fins F3 of the heat exchanger E3, whereby the parallel insertion of the hairpin tubes T2 is completed.

In the heat exchanger tube inserting apparatus 51 according to the third embodiment, the roller conveyor section 52 includes the rear driving roller 56 and the front driving rollers 57. In the case where the straight tube portions SP in each pair are in the horizontal state of extending horizontally side by side as in hairpin tubes T2 for parallel insertion, the rear driving roller 56 comes into contact with the straight tube portions SP in the pairs. Further, in the case where the straight tube portions SP and SP2 in each pair are in the oblique state of extending side by side at different vertical positions as in hairpin tubes T1 for oblique insertion, the rear driving roller 56 comes into contact with the straight tube portions SP1 that are at lower positions. In the case where the straight tube portions SP and SP2 in each pair are in the oblique state as in hairpin tubes T1 for oblique insertion, the front driving rollers 57 respectively come into contact with the straight tube portions SP2 that are at higher positions. This makes it possible to convey the straight tube portions SP (SP1 and SP2) of each of hairpin tubes T (T1, T2) in the conveyance direction Y, by bringing only the rear driving roller 56 or both of the rear driving roller 56 and the front driving rollers 57 into contact with the straight tube portions SP (SP1 and SP2) depending on whether the hairpin tubes T (T1, T2) are inserted in parallel or obliquely. In this manner, the single heat exchanger tube inserting apparatus 51 is capable of performing both parallel insertion and oblique insertion of hairpin tubes T (T1, T2).

In the heat exchanger tube inserting apparatus 51 according to the third embodiment, the rear driving roller 56 and the front driving rollers 57 are disposed at different positions in the conveyance direction Y of hairpin tubes T1. This can prevent the rear driving roller 56 and the front driving rollers 57 from coming into contact with each other.

The heat exchanger tube inserting apparatus 51 according to the third embodiment includes the roller mover 54 for vertically moving the front driving rollers 57. Therefore, the front driving rollers 57 can be made to recede from the movement region of hairpin tubes T (T1, T2) each time an insertion operation of hairpin tubes T (T1, T2) is completed.

In the heat exchanger tube inserting apparatus 51 according to the third embodiment, the roller mover 54 includes the roller guide member 81 having the guide surfaces 81c sloping in the direction of changing the distance to the movement region of hairpin tubes T (T1, T2) as proceeding upstream in the conveyance direction Y of hairpin tubes T, and the first guide driver 82 for moving the roller guide member 81 in the conveyance direction Y. The first guide driver 82 moves the roller guide member 81 so as to raise the front driving rollers 57 by the guide surfaces 81c of the roller guide member 81. This allows the common shaft 63, which serves as a rotary axis of the front driving rollers 57 and comes into contact with the guide surfaces 81c, to be reliably moved vertically according to horizontal movement of the roller guide member 81. Furthermore, the roller mover 54 can be configured to have a relatively low height.

The heat exchanger tube inserting apparatus 51 according to the third embodiment includes the first positioners 74 and the second positioners 77. Each of the first positioners 74 positions, in the case where a pair of straight tube portions SP are in the horizontal state as in a hairpin tube T2 for parallel insertion, the straight tube portions SP, and in the case where a pair of straight tube portions SP1 and SP2 are in the oblique state as in a hairpin tube T1 for oblique insertion, the straight tube portion SP1 that is at a lower position. Each of the second positioners 77 positions, in the case where a pair of straight tube portions SP1 and SP2 are in the oblique state as in a hairpin tube T1 for oblique insertion, the straight tube portion SP2 that is at a higher position. This makes it possible to position the pairs of straight tube portions SP only by the first positioners 74 in the case of parallel insertion of hairpin tubes T2 and position the pairs of straight tube portions SP1 and SP2 by the first positioners 74 and the second positioners 77 in the case of oblique insertion of hairpin tubes T1.

In the heat exchanger tube inserting apparatus 51 according to the third embodiment, in the case where a pair of straight tube portions SP are in the horizontal state as in a hairpin tube T2 for parallel insertion, the second positioner 77 functions as an entanglement eliminator for eliminating entanglement between the straight tube portions SP. Thus, it is possible to eliminate entanglement between straight tube portions SP being in the horizontal state.

In the heat exchanger tube inserting apparatus 51 according to the third embodiment, in the case where a pair of straight tube portions SP1 and SP2 are in the oblique state as in a hairpin tube T1 for oblique insertion, a part of each of the first positioner 74 and the second positioner 77 functions as an entanglement eliminator for eliminating entanglement between the straight tube portions SP1 and SP2. Thus, it is possible to eliminate entanglement between straight tube portions SP1 and SP2 being in the oblique state.

In the heat exchanger tube inserting apparatus 51 according to the third embodiment, the first positioner 74 and the second positioner 77 include the oblique portions 74a and 77f, respectively, the oblique portions sloping in the direction away from the movement region of hairpin tubes as proceeding upstream in the conveyance direction Y. The oblique portions 74a and 77f come into contact with the hairpin portion HP of a hairpin tube T (T1, T2) being conveyed in the conveyance direction Y to thereby allow the first positioner 74 and the second positioner 77 to recede from the hairpin portion HP. This makes the hairpin portion HP less likely to be interrupted by the first positioner 74 and the second positioner 77 when it passes by the first positioner 74 and the second positioner 77.

The heat exchanger tube inserting apparatus 51 according to the third embodiment further includes the second positioner mover 55 for moving the second positioners 77 between the upper position at which they position the straight tube portions SP2 each being at a higher position in a hairpin tube T for oblique insertion, and the lower position to which they recede from the movement region of hairpin tubes T (T1, T2). Therefore, the second positioners 77 can be made to recede from the movement region of hairpin tubes T (T1 and T2) each time an insertion operation of hairpin tubes T (T1 and T2) is completed.

(Modification of Third Embodiment)

In the third embodiment, the first guide driver 82 for moving the roller guide member 81 and the second guide driver 85 for moving the guide member 84 are included independently of each other. However, the present invention is not limited to this configuration. For example, one of the two guide drivers 82 and 84 may be omitted to configure the remaining other driver to move the roller guide member 81 and the guide member 84 simultaneously in the conveyance direction Y.

The above-described specific embodiments mainly include the invention configured as follows.

A heat exchanger tube inserting apparatus 1 or 51 according to one of the first to third embodiments is configured to insert, in a process of assembling a heat exchanger including a number of fins and heat exchanger tubes passing through the number of fins, a heat exchanger tube into insertion holes formed in the fins, the heat exchanger tube inserting apparatus 1 or 51 comprising: a roller conveyor section 2 or 52 including rollers 2a and 2b or 56 and 57 for advancing the heat exchanger tube to thereby insert the heat exchanger tube into the insertion holes of the fins and to a first position by rotation of the rollers 2a and 2b or 56 and 57; and a pushing section 3 for pushing the heat exchanger tube which has been moved to the first position by the roller conveyor section 2 or 52 to a second position located further inside than the first position.

The heat exchanger tube inserting apparatus 1 or 51 according to one of the first to third embodiments includes the roller conveyor section 2 or 52 and the pushing section 3, as a mechanism for advancing a heat exchanger tube into insertion holes of fins in two steps. Therefore, as long as an operator sets, in advance, a heat exchanger tube at a predetermined initial position, for example, an initial position at which a leading end of the heat exchanger tube is inserted in an insertion hole of a front fin of the number of fins, it is possible to advance the heat exchanger tube to thereby insert it into insertion holes of the number of fins to the first position by rotation of the rollers 2a and 2b or 56 and 57 of the roller conveyor section 2 or 52, and subsequently push the heat exchanger tube to thereby insert it to the second position by the pushing section 3. Therefore, different from the conventional heat exchanger tube inserting apparatus, it does not require a heat exchanger tube inserting means having such a long stroke length as to fully insert a heat exchanger tube into insertion holes of a number of fins, nor guide rods being so long as to pass through the number of fins for supporting the heat exchanger tube. Consequently, the heat exchanger tube inserting apparatus 1 or 51 can be made small in size.

Further, the heat exchanger tube inserting apparatus 1 or 51 of the present invention requires an operator to set a heat exchanger tube at the initial position in advance. However, because of being a semi-automatic machine, the heat exchanger tube inserting apparatus 1 or 51 can be configured extremely simply with the combination of the roller conveyor section 2 or 52 and the pushing section 3.

Furthermore, the above-described configuration makes it possible to advance a heat exchanger tube having a desired length, by advancing the heat exchanger tube by rotation of the rollers 2a and 2b or 56 and 57 of the roller conveyor section 2 or 52. Therefore, provision of a stroke length can be eliminated, and heat exchanger tubes of various lengths and various tube diameters (outer diameters) can be inserted. Therefore, it is possible to insert even an extremely long heat exchanger tube into insertion holes of fins.

It is preferred that the heat exchanger tube is in the form of a hairpin tube including a pair of straight tube portions extending in parallel to each other and a hairpin portion connecting respective one ends of the straight tube portions, and it is preferred that the heat exchanger tube inserting apparatus further comprises an entanglement eliminator 9 disposed upstream of the rollers 2a and 2b in a heat exchanger tube conveyance direction for eliminating entanglement between the straight tube portions conveyed by the rollers 2a and 2b.

According to such configuration, the entanglement eliminator 9 disposed upstream of the rollers 2a and 2b in the conveyance direction of a hairpin tube eliminates entanglement between the straight tube positions of a hairpin tube before the hairpin tube is inserted into insertion holes of fins by rotation of the rollers 2a and 2b, the hairpin tube being to serve as a heat exchanger tube. This makes the hairpin tube more likely to be successfully inserted without being interrupted by the rollers 2a and 2b.

It is preferred that the entanglement eliminator 9 includes an oblique portion 9a sloping in a direction away from a hairpin tube movement region as proceeding upstream in the conveyance direction and the entanglement eliminator 9 is configured to recede from a hairpin portion when the hairpin portion comes into contact with the oblique portion 9a.

According to such configuration, in the course of advancement of a hairpin tube into insertion holes of fins by rotation of the rollers 2a and 2b, the oblique portion 9a of the entanglement eliminator 9 can come into contact with the hairpin portion to thereby allow the entanglement eliminator 9 to recede upward from the hairpin portion when the hairpin portion passes the entanglement eliminator 9. This makes the hairpin portion less likely to be interrupted by the entanglement eliminator 9.

It is preferred that the rollers 2a and 2b include respective contact portions 2a1 and 2b1 able to come into contact with a heat exchanger tube, the contact portions each having a flat part made of an elastic material elastically deformable to make surface contact with the heat exchanger tube when coming into contact with the heat exchanger tube.

According to such configuration, the respective contact portions 2a1 and 2b1 of the rollers 2a and 2b that come into contact with a heat exchanger tube each have a flat part elastically deformable to make surface contact with the heat exchanger tube when coming into contact with the heat exchanger tube. This makes it possible to reliably advance a heat exchanger tube into insertion holes of fins by rotation of the rollers 2a and 2b according to an outer diameter of the heat exchanger tube. Furthermore, the elastic deformation of the rollers 2a and 2b makes the heat exchanger tube less likely to be deformed or damaged.

It is preferred that the pushing section 3 includes a plurality of pushing portions 3a and 3b and differentiates a pushing amount of heat exchanger tube into insertion holes of fins by the plurality of pushing portions from a pushing amount of heat exchanger tube by one of the plurality of pushing portions.

According to such configuration, the pushing section 3 can push a heat exchanger tube over different distances by use of the plurality of pushing portions 3a and 3b. Specifically, it is possible to push a heat exchanger tube over a predetermined distance by use of the pushing portion 3a. Further, it is possible to push a heat exchanger tube over a distance longer than the above-mentioned predetermined distance by simultaneous operation of the pushing portions 3a and 3b. Therefore, even in the case where one tier includes a row of heat exchanger tubes having a different effective length from another tier in assembling of a heat exchanger including the tiers, it is possible to insert one tier of heat exchanger tubes in a different stroke length from another tier to thereby accord with the effective length.

It is preferred to further comprise a first guide member 7 disposed upstream of the rollers 2a and 2b in the heat exchanger tube conveyance direction for positioning a heat exchanger tube with respect to the rollers 2a and 2b.

According to such configuration, the first guide member 7 positions a heat exchanger tube with respect to the rollers 2a and 2b at the upstream side of the rollers 2a and 2b in the heat exchanger tube conveyance direction. This makes the heat exchanger tube less likely to reach the rollers 2a and 2b obliquely to the predetermined conveyance direction.

It is preferred that a plurality of roller conveyor sections 2 are disposed in parallel to each other in the heat exchanger tube conveyance direction, and that a plurality of first guide members 7 are respectively disposed upstream of the roller conveyor sections 2.

According to such configuration including the plurality of roller conveyor sections, the first guide members 7 are respectively disposed upstream of the roller conveyor sections 2 in the heat exchanger tube conveyance direction. This allows each of the first guide members 7 to accurately position a heat exchanger tube which is to be advanced by the corresponding roller conveyor section 2, with respect to the rollers 2a and 2b. This makes, in insertion of a plurality of heat exchanger tubes by the plurality of roller conveyor sections 2, each of the heat exchanger tubes less likely to reach the corresponding driving rollers 2a and 2b obliquely to the predetermined conveyance direction.

It is preferred to further comprise a second guide member 8 disposed upstream of the first guide member 7 in the heat exchanger tube conveyance direction for positioning a heat exchanger tube with respect to the first guide member 7.

According to such configuration, it is possible to position a heat exchanger tube with respect to the first guide member 7 by the second guide member 8 at the upstream side of the first guide member 7 in the heat exchanger tube conveyance direction before the heat exchanger tube is advanced to the first guide member 7. This makes the heat exchanger tube even less likely to reach the rollers 2a and 2b obliquely to the predetermined conveyance direction.

It is preferred that the roller conveyor section 2 includes a pair of rollers 2a and 2b which are oppositely disposed across a heat exchanger tube.

Such configuration allows the pair of rollers 2a and 2b to reliably advance a heat exchanger tube into insertion holes of fins while vertically sandwiching the heat exchanger tube therebetween.

It is preferred that the pair of rollers includes the driving roller 2a for advancing a heat exchanger tube, and the driven roller 2b able to come into contact with the heat exchanger tube and rotate with the advancing movement of the heat exchanger tube.

According to such configuration, the provision of one driving roller 2a allows simplification of the mechanism. Furthermore, the driven roller 2b which is simpler in the mechanism can be moved easily between a position at which the driven roller 2b comes into contact with a heat exchanger tube and a position to which the driven roller 2b recedes from the heat exchanger tube.

It is preferred that the roller conveyor section 52 includes two rollers 56 and 57, that the heat exchanger tube is in the form of a hairpin tube including a pair of straight tube portions extending in parallel to each other and a hairpin portion connecting respective one ends of the straight tube portions, and that the two rollers include the first roller 56 configured to come into contact with the pair of straight tube portions in a case where the pair of straight tube portions are in a horizontal state of extending horizontally side by side, and come into contact with one of the pair of straight tube portions that is at a lower position in a case where the pair of straight tube portions are in an oblique state of extending side by side at different vertical positions, and the second roller 57 configured to come into contact with the other of the pair of straight tube portions that is at a higher position in the case where the pair of straight portions are in the oblique state.

According to such configuration, it is possible to convey the straight tube portions of a hairpin tube in the conveyance direction by bringing only the first roller 56 or both of the first roller 56 and the second roller 57 into contact with the straight tube portions, depending on whether the straight tube portions are inserted in the horizontal state of extending horizontally side by side (in so-called parallel insertion) or in the oblique state of extending side by side at different vertical positions (in so-called oblique insertion). In this manner, the single heat exchanger tube inserting apparatus 51 is capable of performing both parallel insertion and oblique insertion of a hairpin tube.

It is preferred that the first roller 56 and the second roller 57 are disposed at different positions in the heat exchanger tube conveyance direction. This disposition can prevent the rear driving roller 56 and the front driving roller 57 from coming into contact with each other.

It is preferred to further comprise a roller mover 54 for moving the second roller 57 vertically.

According to such configuration, with the roller mover 54, the front driving roller 57 can be made to recede from the hairpin tube movement region each time an insertion operation of a hairpin tube is completed.

It is preferred that the roller mover 54 includes a roller guide member 81 having a guide surface 81c sloping in a direction of changing a distance relative to the hairpin tube movement region as proceeding upstream in the heat exchanger tube conveyance direction, and a guide mover 82 for moving the roller guide member 81 in the conveyance direction, and the guide mover 82 is configured to move the roller guide member 81 so as to raise the second roller 57 by the guide surface 81c of the roller guide member 81.

According to such configuration, it is possible to reliably vertically move a rotary axis of the second roller 57 which comes into contact with the guide surface 81c according to horizontal movement of the roller guide member 81. Furthermore, the roller mover 54 can be configured to have a relatively low height.

It is preferred to further comprise a first positioner 74 for positioning a pair of straight tube portions in the case where the pair of straight tube portions are in the horizontal state and positioning one of a pair of straight tube portions that is at a lower position in the case where the pair of straight tube portions are in the oblique state, and a second positioner 77 for positioning the other of the pair of straight tube portions that is at a higher position in the case where the pair of straight tube portions are in the oblique state.

According to such configuration, in the case of parallel insertion of a hairpin tube, it is possible to position the pair of straight tube portions only by the first positioner 74. On the other hand, in the case of oblique insertion of a hairpin tube, it is possible to position the pair of straight tube portions by the first positioner 74 and the second positioner 77.

It is preferred to configure the second positioner 77 to function as, in the case where a pair of straight tube portions are in the horizontal state, an entanglement eliminator of eliminating entanglement between the straight tube portions.

According to such configuration, it is possible to eliminate entanglement between straight tube portions being in the horizontal state.

It is preferred to configure a part of the first positioner 74 and a part of the second positioner 77 to function as, in the case where a pair of straight tube portions are in the oblique state, an entanglement eliminator of eliminating entanglement between the straight tube portions.

According to such configuration, it is possible to eliminate entanglement between straight tube portions being in the oblique state.

It is preferred that the first positioner 74 and the second positioner 77 include oblique portions 74a and 77f, respectively, the oblique portion sloping in a direction away from the hairpin tube movement region as proceeding upstream in the conveyance direction, and the first positioner 74 and the second positioner 77 are configured to recede from the hairpin portion of a hairpin tube being conveyed in the conveyance direction by the respective oblique portions 74a and 74f coming into contact with the hairpin portion.

Such configuration allows the hairpin portion less likely to be interrupted by the first positioner 74 and the second positioner 77 when it passes by the first positioner 74 and the second positioner 77.

It is preferred to further comprise a second positioner mover 55 for moving the second positioner 77 between an upper position where a straight tube portion is positioned and a lower position below the hairpin tube movement region.

According to such configuration, the second positioner 77 can be made to recede from the hairpin tube movement region each time an insertion operation of a hairpin tube is completed.

It is preferred to further comprise a main body frame 4 supporting the roller conveyor section 2 and the pushing section 3, and a vertical mover 5 for moving the entirety of the main body frame 4 vertically.

According to such configuration, it is possible to vertically move the main body frame 4 supporting the roller conveyor section 2 and the pushing section 3 by the vertical mover 5. This makes it possible, in the case of assembling a heat exchanger including tiers each having a row of heat exchanger tubes, to vertically move the main body frame 4 by the vertical mover 5 to thereby adjust its vertical position to correspond to each of the tiers. This makes it possible to insert a heat exchanger tube at each of the tiers.

What is claimed is:

1. A heat exchanger tube inserting apparatus adapted to insert, in a process of assembling a heat exchanger including a number of fins and heat exchanger tubes passing through the number of fins, a heat exchanger tube into insertion holes formed in the fins, the heat exchanger tube inserting apparatus comprising:
- a roller conveyor section including a roller configured to advance the heat exchanger tube in an insertion direction to thereby insert the heat exchanger tube into the insertion holes of the fins and to a first position by rotation of the roller;
- a pushing section configured to push the heat exchanger tube, which has been moved to the first position by the roller conveyor section along the insertion direction, to a second position located further inside than the first position; and
- a main body frame supporting the roller conveyor section and the pushing section,
- the roller conveyor section and the pushing section being spaced from each other along a direction horizontally transverse to the insertion direction to allow simultaneous insertion of a tube into the first position and another tube into the second position, and
- the main body being movable parallel to the extending direction of the fins.

2. A heat exchanger tube inserting apparatus according to claim 1, wherein
- the heat exchanger tube is a hairpin tube including a pair of straight tube portions extending in parallel to each other and a hairpin portion connecting respective ends of the straight tube portions, and
- the heat exchanger tube inserting apparatus further comprises:
- an entanglement eliminator disposed upstream of the roller in a heat exchanger tube conveyance direction, the entanglement eliminator being configured to eliminate entanglement between the straight tube portions conveyed by the roller.

3. A heat exchanger tube inserting apparatus according to claim 2, wherein
- the entanglement eliminator includes an oblique portion sloping in a direction away from a hairpin tube movement region as proceeding upstream in the conveyance direction, and
- the entanglement eliminator is configured to recede from the hairpin portion when the hairpin portion comes into contact with the oblique portion.

4. A heat exchanger tube inserting apparatus according to claim 1, wherein
- a contact portion of the roller which comes into contact with the heat exchanger tube includes a flat part, the flat part being made of an elastic material elastically deformable to make surface contact with the heat exchanger tube when coming into contact with the heat exchanger tube.

5. The heat exchanger tube inserting apparatus according to claim 1, wherein
- the pushing section includes a first pushing portion configured to directly push the heat exchanger tube and a second pushing portion configured to push the heat exchanger tube by pushing the first pushing section.

6. A heat exchanger tube inserting apparatus according to claim 5, further comprising:
- a main body frame supporting the roller conveyor section and the pushing section; and
- a vertical mover configured to move an entirety of the main body frame vertically.

7. A heat exchanger tube inserting apparatus according to claim 1, further comprising
- a first guide member disposed upstream of the roller in a heat exchanger tube conveyance direction, the first guide member being configured to position the heat exchanger tube with respect to the roller.

8. A heat exchanger tube inserting apparatus according to claim 7, wherein
- a plurality of roller conveyor sections are disposed in parallel to each other in the heat exchanger tube conveyance direction, and
- a plurality of first guide members are respectively disposed upstream of the roller conveyor sections.

9. A heat exchanger tube inserting apparatus according to claim 7, further comprising
- a second guide member disposed upstream of the first guide member in the heat exchanger tube conveyance direction, the second guide member being configured to position the heat exchanger tube with respect to the first guide member.

10. A heat exchanger tube inserting apparatus according to claim 1, wherein
- the roller of the roller conveyor section includes a pair of rollers, the pair of rollers being oppositely disposed across the heat exchanger tube.

11. A heat exchanger tube inserting apparatus according to claim 10, wherein
- the pair of rollers includes a driving roller configured to advance the heat exchanger tube, and a driven roller able to come into contact with the heat exchanger tube and rotate with advancing movement of the heat exchanger tube.

12. A heat exchanger tube inserting apparatus according to claim 1, further comprising:
- a vertical mover configured to move an entirety of the main body frame vertically.

13. A heat exchanger tube inserting apparatus adapted to insert, in a process of assembling a heat exchanger including a number of fins and heat exchanger tubes passing through the number of fins, a heat exchanger tube into insertion holes formed in the fins, the heat exchanger tube inserting apparatus comprising:
- a roller conveyor section including a first roller and a second roller configured to advance the heat exchanger tube to thereby insert the heat exchanger tube into the insertion holes of the fins and to a first position by rotation of the first roller and the second roller; and
- a pushing section configured to push the heat exchanger tube, which has been moved to the first position by the roller conveyor section, to a second position located further inside than the first position,
- the heat exchanger tube being a hairpin tube including a pair of straight tube portions extending in parallel to each other and a hairpin portion connecting respective ends of the straight tube portions,
- the first roller
  - coming into contact with the pair of straight tube portions in a case when the pair of straight tube portions are in a horizontal state of extending horizontally side by side, and
  - coming into contact with one of the pair of straight tube portions that is at a lower position in a case when the pair of straight tube portions are in an oblique state of extending side by side at different vertical positions, and
- the second roller coming into contact with the other of the pair of straight tube portions that is at a higher position in the case when the pair of straight portions are in the oblique state.

14. A heat exchanger tube inserting apparatus according to claim 13, wherein
the first roller and the second roller are disposed at different positions in a heat exchanger tube conveyance direction.

15. A heat exchanger tube inserting apparatus according to claim 13, further comprising
a roller mover configured to move the second roller vertically.

16. A heat exchanger tube inserting apparatus according to claim 15, wherein
the roller mover includes a roller guide member having a guide surface sloping in a direction of changing distance relative to a hairpin tube movement region as the guide surface proceeds upstream in a heat exchanger tube conveyance direction, and a guide mover configured to move the roller guide member in the conveyance direction, and
the guide mover is configured to move the roller guide member so as to raise the second roller by the guide surface of the roller guide member.

17. A heat exchanger tube inserting apparatus according to claim 13, further comprising:
a first positioner configured to position the pair of straight tube portions in the case when the pair of straight tube portions are in the horizontal state and to position one of the pair of straight tube portions that is at the lower position in the case when the pair of straight tube portions are in the oblique state; and
a second positioner configured to position the other of the pair of straight tube portions that is at the higher position in the case when the pair of straight tube portions are in the oblique state.

18. A heat exchanger tube inserting apparatus according to claim 17, wherein
in the case when the pair of straight tube portions are in the horizontal state, the second positioner functions as an entanglement eliminator configured to eliminate entanglement between the straight tube portions.

19. A heat exchanger tube inserting apparatus according to claim 17, wherein
in the case when the pair of straight tube portions are in the oblique state, a part of the first positioner and a part of the second positioner function as an entanglement eliminator configured to eliminate entanglement between the straight tube portions.

20. A heat exchanger tube inserting apparatus according to claim 17, wherein
each of the first positioner and the second positioner includes an oblique portion sloping in a direction away from a hairpin tube movement region as the oblique portion proceeds upstream in the conveyance direction, and
each of the first positioner and the second positioner is configured to recede from the hairpin portion of the hairpin tube being conveyed in the conveyance direction by the respective oblique portion coming into contact with the hairpin portion.

21. A heat exchanger tube inserting apparatus according to claim 17, further comprising
a second positioner mover configured to move the second positioner between an upper position where the straight tube portion is positioned and a lower position below a hairpin tube movement region.

22. A heat exchanger tube inserting apparatus according to claim 13, further comprising:
a main body frame supporting the roller conveyor section and the pushing section; and
a vertical mover configured to move an entirety of the main body frame vertically.

\* \* \* \* \*